(12) United States Patent
Maertens et al.

(10) Patent No.: US 10,570,938 B2
(45) Date of Patent: Feb. 25, 2020

(54) COMPOSED ELEMENT AND REAR WALL CONSTRUCTION APPLIED HEREWITH

(71) Applicant: UNILIN, BVBA, Wielsbeke (BE)

(72) Inventors: Luc Maertens, Lichtervelde (BE); Luc Deman, Izegem (BE); Mark Cappelle, Staden (BE); Luc Vanhastel, Tielt (BE); Maarten Marres, Ghent (BE); Jan Van Troys, Kachtem (BE)

(73) Assignee: UNILIN, BVBA, Wielsbeke (BE)

( * ) Notice: Subject to any disclaimer, the term of this patent is extended or adjusted under 35 U.S.C. 154(b) by 0 days.

(21) Appl. No.: 15/710,161

(22) Filed: Sep. 20, 2017

(65) Prior Publication Data
US 2018/0008038 A1    Jan. 11, 2018

Related U.S. Application Data

(62) Division of application No. 14/007,766, filed as application No. PCT/IB2012/051496 on Mar. 28, 2012, now Pat. No. 9,781,997.
(Continued)

(30) Foreign Application Priority Data

Mar. 28, 2011    (BE) .................................. 2011/0189

(51) Int. Cl.
*F16B 5/00*    (2006.01)
*F16B 12/44*    (2006.01)
(Continued)

(52) U.S. Cl.
CPC .......... *F16B 5/0012* (2013.01); *A47B 47/042* (2013.01); *A47B 96/201* (2013.01);
(Continued)

(58) Field of Classification Search
CPC ..................................................... F16B 12/125
(Continued)

(56) References Cited

U.S. PATENT DOCUMENTS

| 242,319 A | 5/1881 | Hershey |
| 1,954,242 A * | 4/1934 | Heppenstall ......... A47B 47/042 403/381 |

(Continued)

FOREIGN PATENT DOCUMENTS

| CA | 2796588 A1 * | 12/2011 |
| CA | 2921719 A1 * | 3/2015 |

(Continued)

OTHER PUBLICATIONS

Search Report From BE Application No. 201100189, dated Dec. 15, 2011.
(Continued)

*Primary Examiner* — Robert Canfield
(74) *Attorney, Agent, or Firm* — Workman Nydegger

(57) ABSTRACT

A composed element, such as a piece of furniture, wherein the composed element comprises at least a rear wall, as well as a number of constructional parts forming a whole in which the rear wall has to be provided. The rear wall forms the rear side of the composed element and includes one or more rear wall parts. The composed element comprises seats for installing at least one of the rear wall parts, which are configured such that the rear wall part can be slid into the seats starting from the rear side of the composed element from a position differing from the final plane in which the rear wall part will be situated in the final condition.

9 Claims, 43 Drawing Sheets

Related U.S. Application Data

(60) Provisional application No. 61/542,562, filed on Oct. 3, 2011.

(51) Int. Cl.

| | | |
|---|---|---|
| *E04F 15/02* | (2006.01) | |
| *A47B 47/04* | (2006.01) | |
| *A47B 96/20* | (2006.01) | |
| *F16B 12/20* | (2006.01) | |
| *A47B 88/95* | (2017.01) | |
| *F16B 12/46* | (2006.01) | |

(52) U.S. Cl.
CPC ...... *E04F 15/02038* (2013.01); *F16B 5/0016* (2013.01); *F16B 12/2027* (2013.01); *A47B 2088/951* (2017.01); *A47B 2230/0081* (2013.01); *A47B 2230/06* (2013.01); *E04F 2201/023* (2013.01); *E04F 2201/04* (2013.01); *E04F 2201/041* (2013.01); *F16B 2012/463* (2013.01); *F16B 2012/466* (2013.01); *Y10T 403/4602* (2015.01); *Y10T 403/555* (2015.01); *Y10T 403/70* (2015.01); *Y10T 403/7075* (2015.01)

(58) Field of Classification Search
USPC .......................... 52/591.1, 592.1; 403/DIG. 11
See application file for complete search history.

(56) References Cited

U.S. PATENT DOCUMENTS

| | | | |
|---|---|---|---|
| 2,670,507 A | 3/1954 | Daitch et al. | |
| 2,811,799 A | 11/1957 | Clark | |
| 3,145,435 A | 8/1964 | Loetscher | |
| 3,664,011 A * | 5/1972 | Labastrou | B27F 1/00 144/347 |
| 3,712,697 A | 1/1973 | Kelley et al. | |
| 3,731,413 A | 5/1973 | Hooper, Jr. | |
| 3,791,002 A | 2/1974 | Lampe et al. | |
| 3,960,270 A | 6/1976 | May | |
| 4,110,946 A | 9/1978 | Louther, Jr. | |
| 4,657,318 A | 4/1987 | Strange | |
| 4,888,933 A * | 12/1989 | Guomundsson | E04B 2/707 52/779 |
| 5,255,970 A | 10/1993 | Theosabrata | |
| 5,475,960 A * | 12/1995 | Lindal | E04B 1/0007 52/222 |
| 5,803,563 A | 9/1998 | Woodward | |
| 6,216,409 B1 * | 4/2001 | Roy | E04F 13/08 52/588.1 |
| 6,413,007 B1 * | 7/2002 | Lambright | A47B 13/003 403/353 |
| 6,560,847 B2 | 5/2003 | Ohlsson | |
| 6,591,555 B2 | 7/2003 | King et al. | |
| 6,722,068 B2 | 4/2004 | Ohlsson | |
| 6,817,153 B2 * | 11/2004 | Steinberg | E04F 13/0864 403/231 |
| 7,641,414 B1 | 1/2010 | Joyce | |
| 7,661,227 B2 | 2/2010 | Dudley et al. | |
| 7,784,889 B2 | 8/2010 | Benner et al. | |
| 7,836,832 B2 | 11/2010 | Boyd et al. | |
| 8,621,814 B2 * | 1/2014 | Cappelle | E04F 15/02 52/582.1 |
| 9,051,752 B1 | 6/2015 | Muthusami | |
| 9,149,113 B2 | 10/2015 | Andersson | |
| 9,175,703 B2 * | 11/2015 | Maertens | A47B 47/042 |
| 9,347,470 B2 | 5/2016 | Maertens et al. | |
| 9,598,856 B2 * | 3/2017 | Schulte | E04B 1/54 |
| 2002/0002769 A1 | 1/2002 | Ohlsson | |
| 2002/0020127 A1 * | 2/2002 | Thiers | E04F 15/02 52/403.1 |
| 2002/0170258 A1 * | 11/2002 | Schwitte | E04F 15/02 52/592.1 |
| 2004/0168392 A1 * | 9/2004 | Konzelmann | E04F 15/04 52/589.1 |
| 2005/0066582 A1 | 3/2005 | Silverman | |
| 2005/0225216 A1 | 10/2005 | Kim | |
| 2006/0010820 A1 * | 1/2006 | Schwitte | E04F 13/0826 52/592.1 |
| 2006/0101769 A1 * | 5/2006 | Pervan | E04F 15/02 52/591.1 |
| 2006/0112603 A1 | 6/2006 | Caveney et al. | |
| 2006/0236642 A1 * | 10/2006 | Pervan | E04F 15/02 52/578 |
| 2006/0260254 A1 * | 11/2006 | Pervan | E04F 15/02 52/592.1 |
| 2009/0249731 A1 * | 10/2009 | Cappelle | B27M 3/04 52/588.1 |
| 2011/0011026 A1 * | 1/2011 | Cappelle | E04F 15/02 52/588.1 |
| 2011/0280655 A1 | 11/2011 | Maertens et al. | |
| 2011/0296774 A1 | 12/2011 | Tremaine, III et al. | |
| 2012/0027967 A1 | 2/2012 | Maertens et al. | |
| 2012/0266555 A1 * | 10/2012 | Cappelle | E04F 15/02194 52/309.1 |
| 2013/0170904 A1 | 7/2013 | Cappelle et al. | |
| 2014/0239785 A1 | 8/2014 | Andersson | |
| 2017/0089379 A1 * | 3/2017 | Pervan | F16B 12/46 |

FOREIGN PATENT DOCUMENTS

| | | | | |
|---|---|---|---|---|
| DE | 102006022313 A1 | 11/2007 | | |
| DE | 202008004148 U1 | 8/2009 | | |
| DE | 202012012659 U1 * | 8/2013 | | |
| EP | 1338721 A2 * | 8/2003 | | |
| EP | 2105063 A1 | 9/2009 | | |
| EP | 2366909 A1 * | 9/2011 | | |
| JP | S61270511 A | 11/1986 | | |
| JP | 3129896 U | 3/2007 | | |
| NL | 8502524 | 4/1987 | | |
| WO | WO-0226086 A1 * | 4/2002 | ............. A47F 3/004 | |
| WO | 2010070472 A2 | 6/2010 | | |
| WO | 2010070605 A2 | 6/2010 | | |
| WO | WO-2010070472 A2 * | 6/2010 | ........... A47B 47/042 | |
| WO | WO-2011151737 A2 * | 12/2011 | | |
| WO | WO-2013118075 A1 * | 8/2013 | | |

OTHER PUBLICATIONS

International Search Report From PCT Application No. PCT/IB2012/051496, dated Nov. 19, 2012.

Office Action from corresponding Korean Application No. 10-2019-7021980, dated Oct. 23, 2019.

* cited by examiner

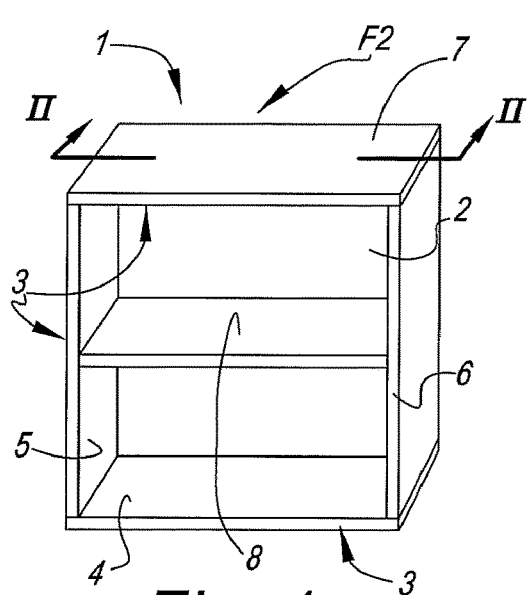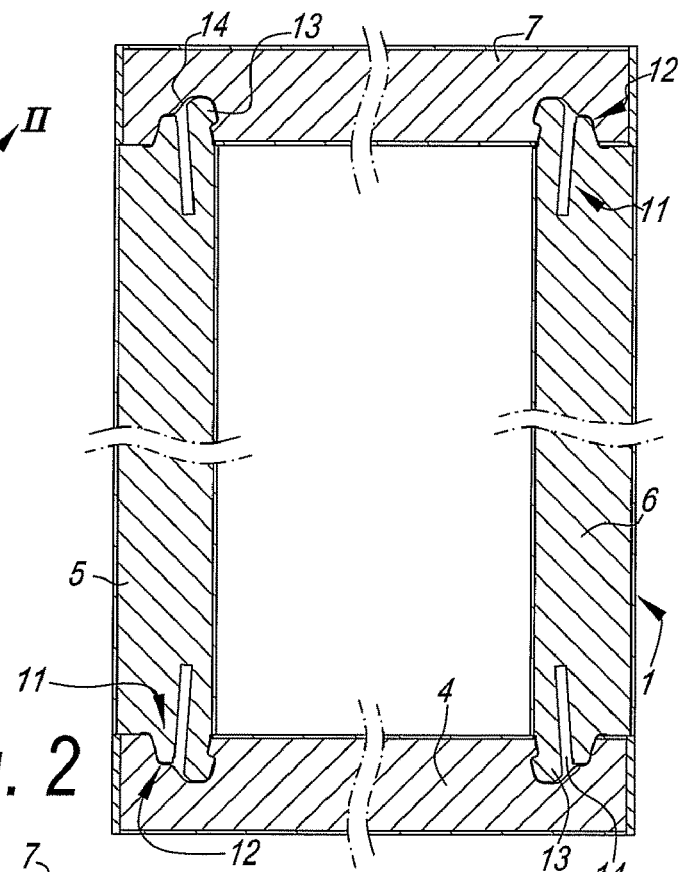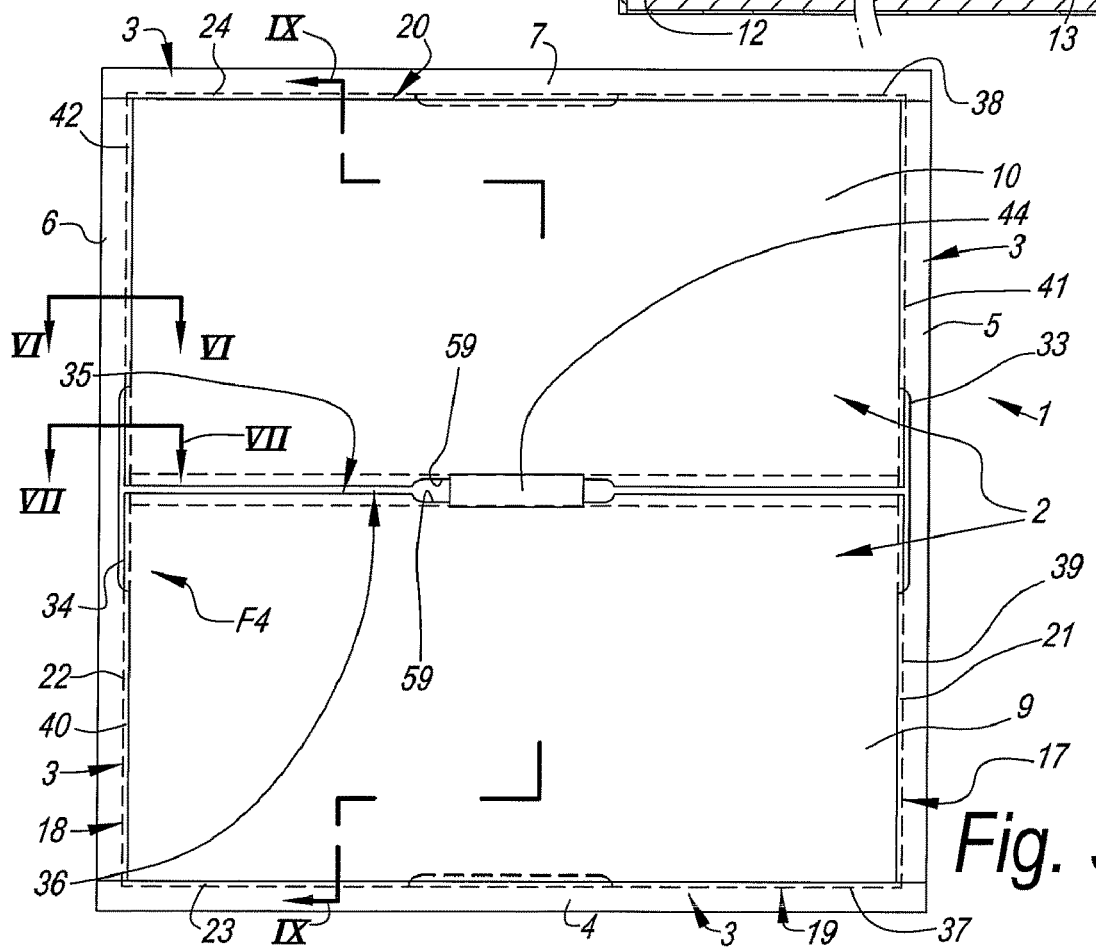

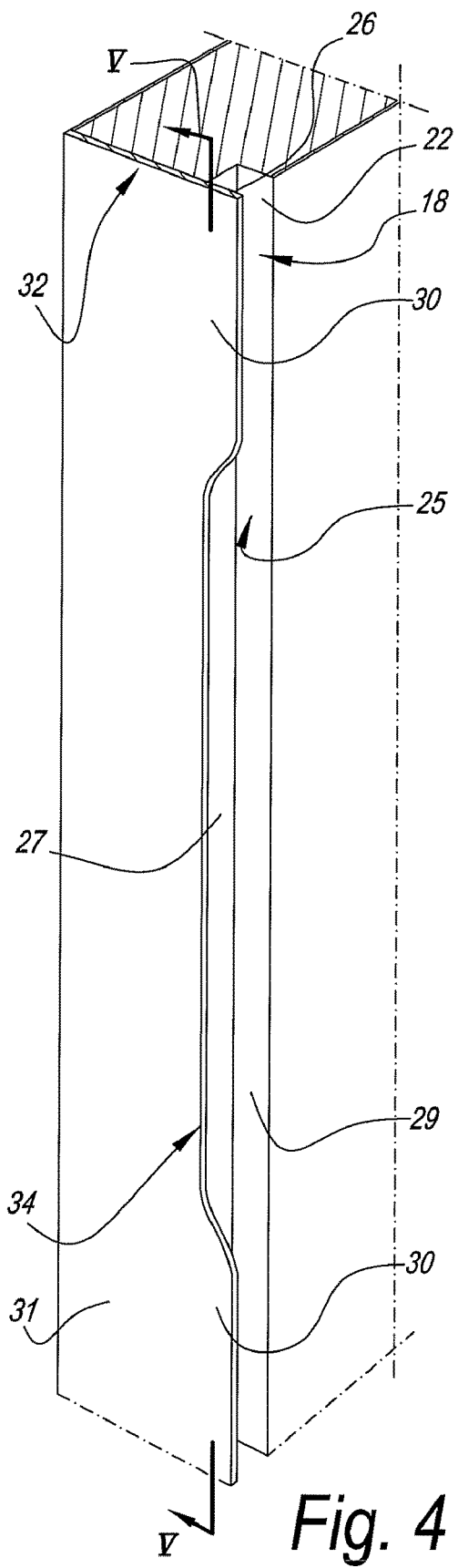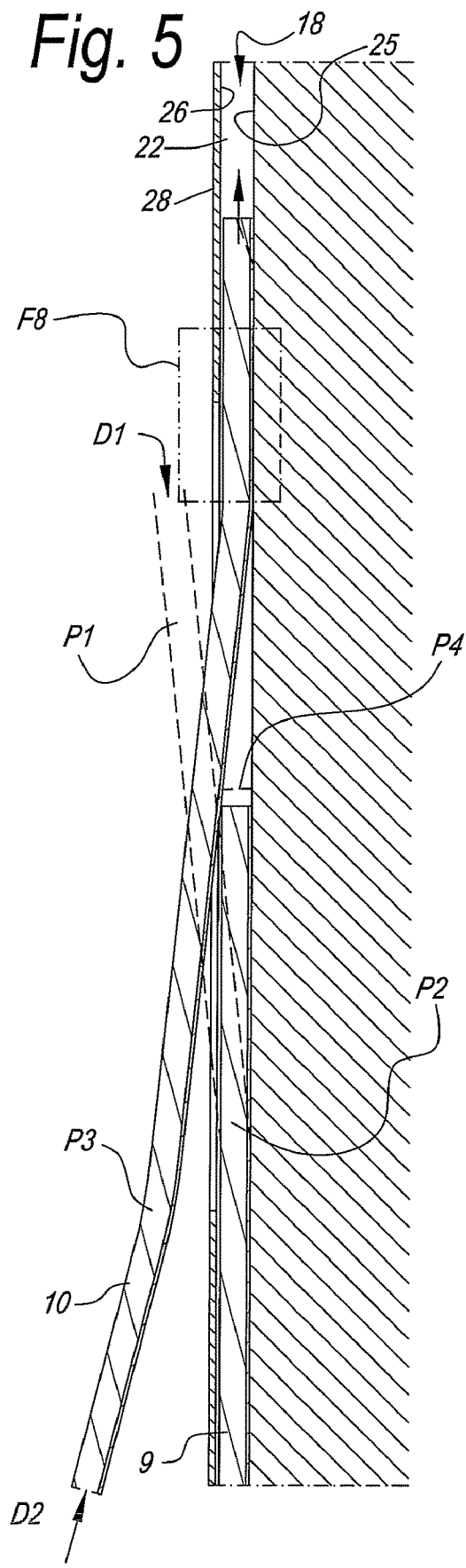

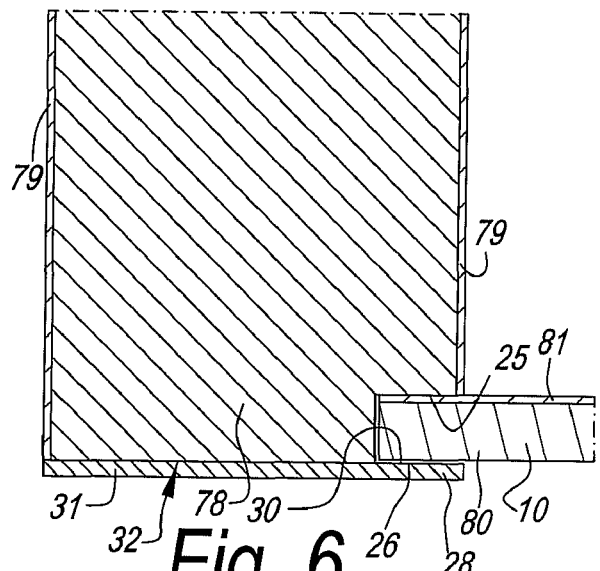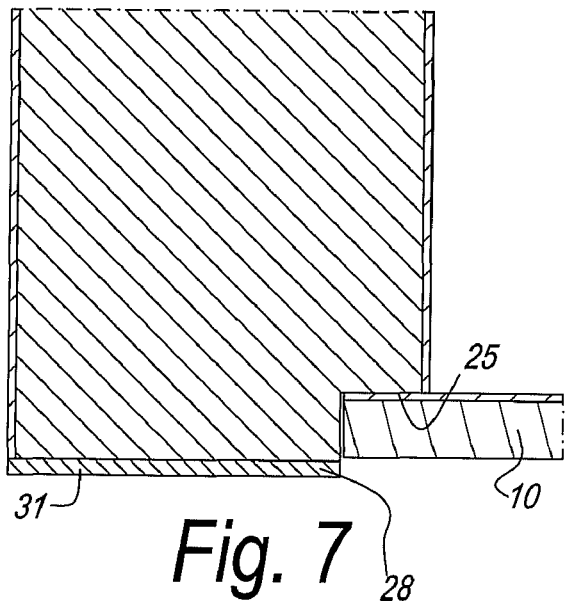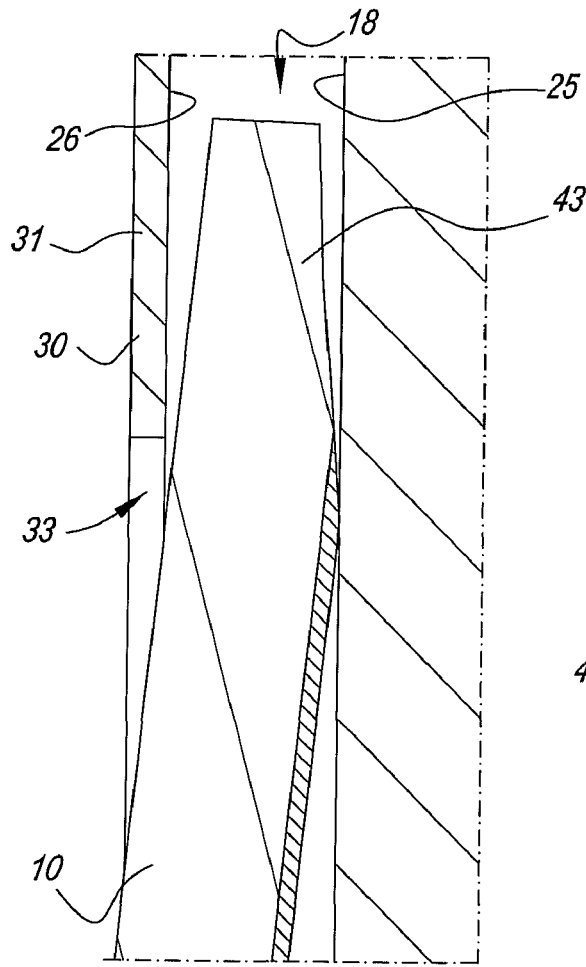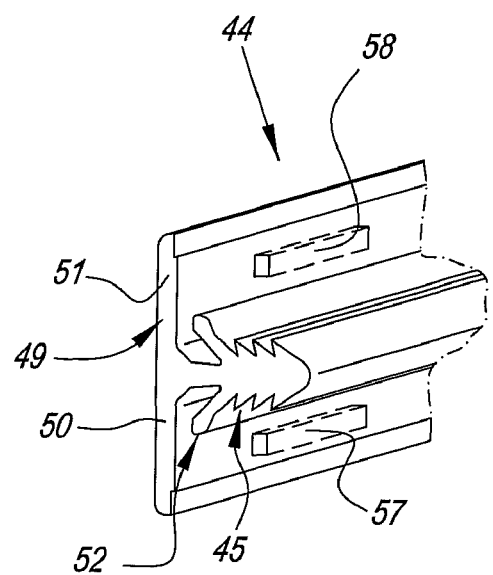

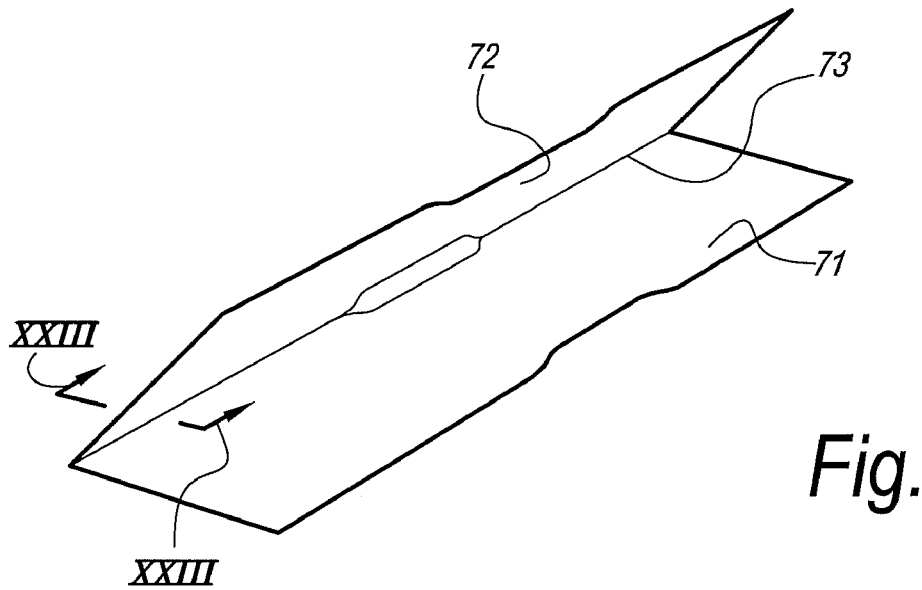
Fig. 22
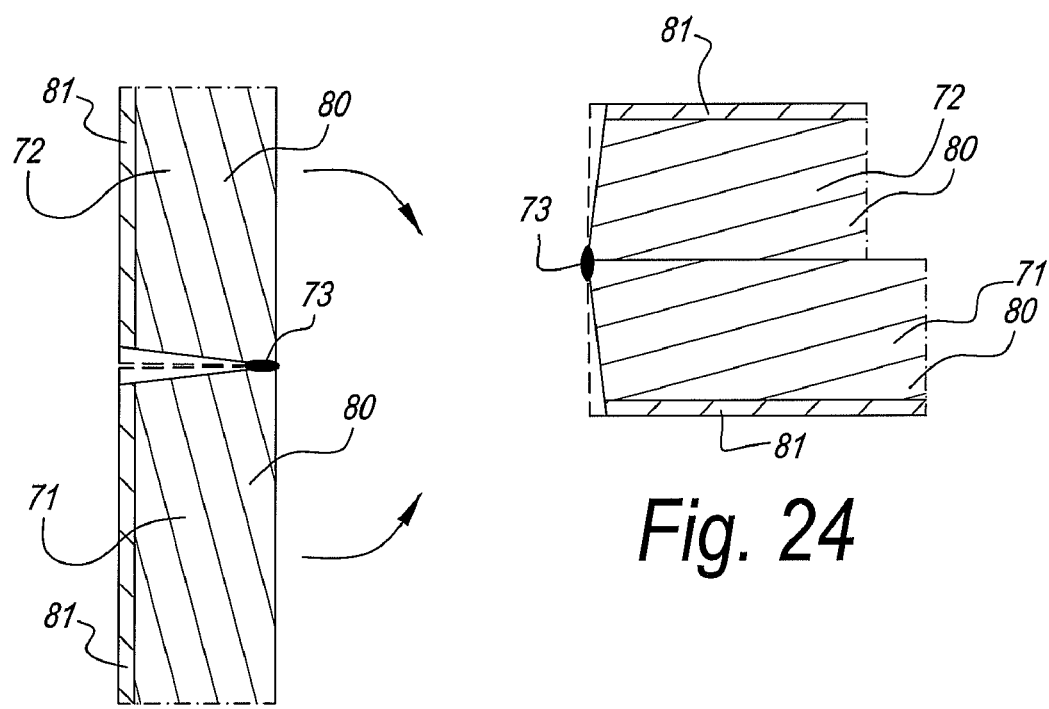
Fig. 23
Fig. 24

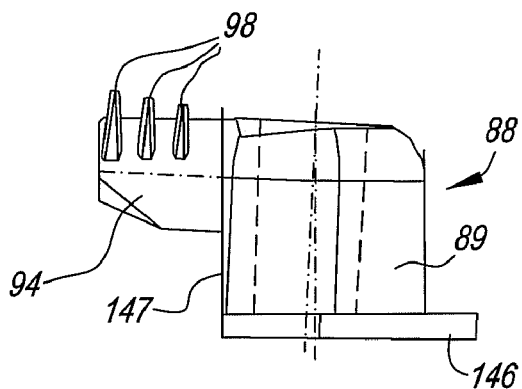
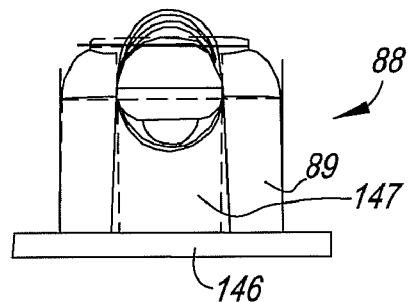
Fig. 60
Fig. 61
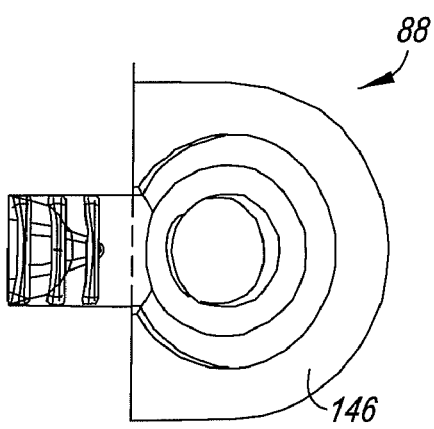
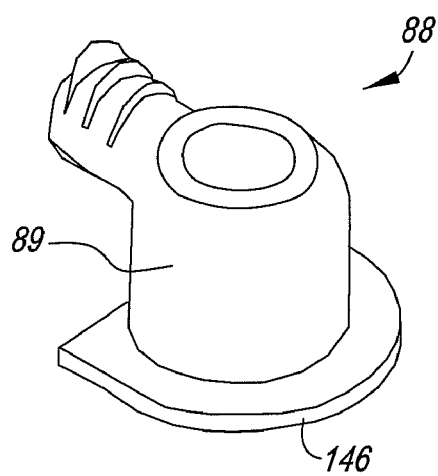
Fig. 62
Fig. 63

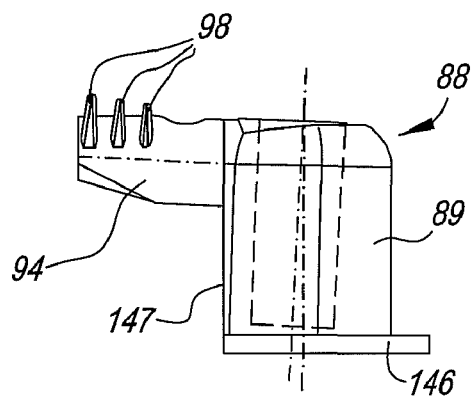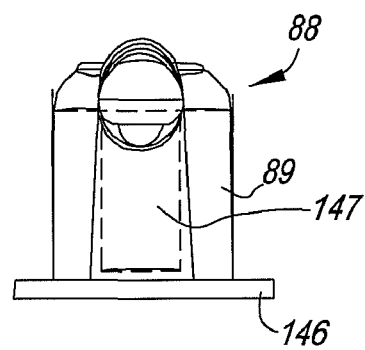
Fig. 64    Fig. 65
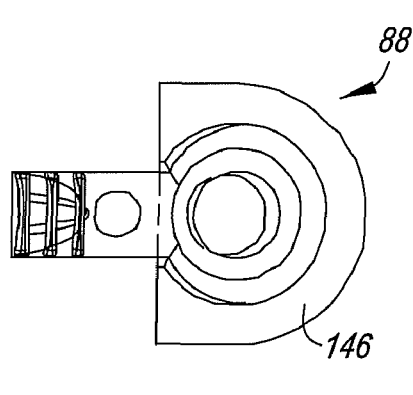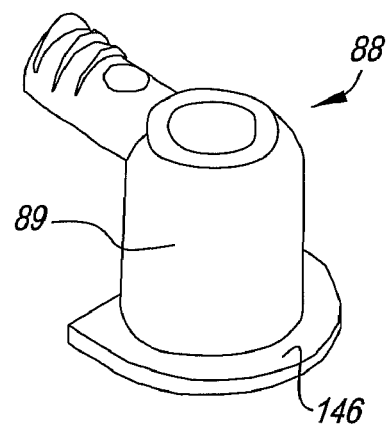
Fig. 66    Fig. 67

COMPOSED ELEMENT AND REAR WALL CONSTRUCTION APPLIED HEREWITH

CROSS-REFERENCE TO RELATED APPLICATIONS

This application is a divisional application claiming the benefit of priority from U.S. utility application No. 14,007,766 filed on Sep. 26, 2013, which claims the benefit under 35 U.S.C. 119 (e) to the U.S. provisional application No. 61/542,562 filed on Oct. 3, 2011.

BACKGROUND

1. Field of the Disclosure

This invention relates to a composed element, and more particularly to furniture.

The invention aims at various improvements which can be applied in such composed element, wherein several thereof relate to rear wall constructions which can be applied therewith.

More particularly, the invention aims at various inventive ideas which are suitable for being applied with furniture which is sold in disassembled condition and has to be assembled by the buyer himself. Herein, this relates first of all to so-called flat-pack furniture.

2. Related Art

Still more particularly, the invention therein relates to composed elements comprising structures which, by means of suitable profiles, can be coupled to each other in a locking manner, for example, of the type known from WO 2010/070472 and WO 2010/070605.

The use of such profiles, which are provided in the constructional parts themselves and are made entirely or for the major part in one piece therewith, offers the advantage that no separate elements for interconnecting the panel-shaped elements at an angle are required, such as, for example, connection elements consisting of metal; or at least the application of such separate elements can be restricted to a minimum. Another advantage thereof consists in that such profiles simply can be milled into the panel-shaped elements and a continuous locking coupling can be realized along the entire corner connection.

SUMMARY

The present invention aims at various aspects with which composed elements, more particularly furniture, and in particular furniture of the aforementioned type, can be optimized even further. Herein, the general purpose is to arrive at furniture of which at least a number of the component parts, and preferably all parts, can be easily manufactured at low cost and can built together in an easy manner as well, whereas finally still a stable piece of furniture is obtained; such preferably with a minimum of accessories, more particularly with a minimum of attachment elements, screws and the like.

According to a number of the hereinafter described aspects, the invention also aims at providing a composed element wherein the rear wall thereof still can be provided therein after said element has been composed. In this manner, it is always possible to provide the rear wall afterwards, even when it should be intended to provide it already earlier and the assembling person, for example, did forget to provide it in the usual manner.

According to a first aspect, the invention relates to a composed element, more particularly a piece of furniture, wherein this composed element comprises at least a rear wall, as well as a number of constructional parts forming a whole in which the rear wall has to be provided, wherein the rear wall forms the rear side of the composed element and consists of one or more rear wall parts, characterized in that the composed element comprises seats for installing at least one of the rear wall parts and preferably all rear wall parts, which are configured such that said rear wall part can be slid into the seats starting from the rear side of the composed element, more particularly from a position which differs from the final plane in which the rear wall part will be situated in the final condition. It is clear that, by providing for that the rear wall can be slid into the seats starting from another plane, a whole is created which allows providing the rear wall smoothly in the composed element.

Preferably, the composed element is configured such that, when all constructional parts to which the rear wall must be attached, are mounted to each other, the rear wall still, as aforementioned, can be slid into the seats.

Still preferably, the composed element is characterized in that the constructional parts consist of panel-shaped elements and that the seats comprise grooves for the one or more rear wall parts which are integrated into the respective panel-shaped elements, wherein one or more, preferably local, passages are present between the grooves and the rear side of the composed element, which allow that said rear wall part can be slid up into the grooves, starting from the rear side, through the one or more passages. In this manner, the rear wall parts can be brought into the composed element in a smooth manner without having to put a heavy load on said rear wall parts.

In a practical view, it is preferred herein that the rear wall part concerned, the rear wall parts concerned, respectively, can be slid up into the seats by means of bending.

According to a number of possibilities, the seats consist of grooves, wherein such grooves are provided at the composed element according to any of the following possibilities:

- The grooves are located on at least two opposite edges of the rear side of the composed element;
- The grooves are located on at least two opposite edges of the rear side of the composed element, as well as on a third edge transverse to said two opposite edges;
- The grooves are located on a first pair of opposite edges of the rear side of the composed element, as well as on a second pair of opposite edges, oriented transverse to the first pair of opposite edges.

In the most preferred embodiment, such composed element is characterized in that one or more of said rear wall parts on a first pair of opposite edges can be shifted in said grooves until said parts finally are positioned in the grooves present on a second pair of opposite edges as well. In this manner, it is obtained that a rear panel can be attached onto practically all edges in a smooth manner.

According to a possibility, the whole is configured such that the rear wall part concerned, the rear wall parts concerned, respectively, can be slid into the first pair of grooves starting from the rear side of the composed element in order to be subsequently slid further up into a first groove of the second pair of grooves, after which the rear wall part concerned, the rear wall parts concerned, respectively, are slid back until the rear wall also is seated in the second groove of the second pair of grooves.

According to a possibility, such rear wall part, such rear wall parts, respectively, are provided in the respective seats starting from one edge of the rear side.

According to an alternative, the composed element comprises at least two rear wall parts, which, starting from one passage, can be slid into the respective grooves in opposite directions.

According to a particular embodiment, the composed element is characterized in that the rear wall comprises a plurality of rear wall parts and/or a number of multiple rear wall parts, which, in mounted condition, substantially are adjacent to each other, wherein one or more of the hereby formed transitions, and preferably all transitions, are located behind shelves or partition walls which are present on the composed element. In this manner, such transitions are hidden from view in an efficient manner.

In a particularly practical embodiment, one or more of the seats are formed by a recess in the respective constructional part, which recess is closed off towards the rear by means of a finishing tape, wherein the aforementioned passages are realized as local recesses in the finishing tape.

According to a second aspect, the invention relates to a composed element, more particularly a piece of furniture, wherein this composed element comprises at least a rear wall, as well as a number of constructional parts forming a whole in which the rear wall has to be provided, wherein the rear wall forms the rear side of the composed element and consists of one or more rear wall parts, characterized in that the constructional parts consist of board-shaped elements and that the attachment parts comprise grooves for the one or more rear wall parts, which grooves are integrated into the board-shaped elements, wherein one or more passages are present between the grooves and the rear side of the composed element, which allow that said rear wall part can be slid from the rear side through the one or more of these passages up into the grooves. By working with integrated grooves, there is the advantage that they can be provided in a smooth manner and that, apart from a possible masking tape, no additional accessories will have to be provided.

According to a third independent aspect, the invention relates to a composed element, more particularly a piece of furniture, which comprises at least a rear wall, as well as a number of constructional parts forming a whole in which the rear wall has to be provided, wherein the rear wall forms the rear side of the composed element and consists of one or more rear wall parts, and wherein the constructional parts comprise, on the one hand, exterior panels as well as, on the other hand, one or more intermediate pieces, more particularly intermediate panels, such as one or more shelves and/or one or more partition walls, with the characteristic that it comprises at least one attachment piece for one or more of the rear wall parts, which cooperates with an intermediate panel. Due to such cooperation, various effects can be created, amongst which the tensioning of the rear wall against the intermediate panels, such that the formation of openings in between them is avoided, the restriction of the mutual movability between rear wall parts and other parts, by which the rigidity of the piece of furniture is enhanced, and so on.

Such attachment piece preferably comprises an attachment part, which engages on one of the intermediate pieces, more particularly on the narrow edge of an intermediate panel. Herein, this attachment piece may consist, amongst others, of a clamping part, which can be pressed down in an opening which for this purpose is provided in the respective intermediate piece, more particularly a clamping part with barbs.

Further, it is preferred that the attachment piece comprises a stop-forming part, more particularly a flange or the like, which cooperates with the rear side of one or more rear wall parts.

Apart therefrom, the attachment piece preferably also comprises a support part, which laterally cooperates with the narrow edge of one or more rear wall parts in order to restrain those as such and keep them at the opposite edges in the corresponding seats.

In a practical embodiment, the support part is made as a tensioning part, which presses the respective rear wall part in at least one direction into its seat, respectively presses the respective rear wall part into their seats. In this manner, it is sought to minimize plays and to reduce the movability between rear wall parts and furniture carcass, which promotes the stability of the composed element.

Preferably, the tensioning part is operative in two directions, such that it can cooperate with two rear wall parts.

According to a practical embodiment, the attachment piece is performed in the form of a small profile, by which also a strip, whether or not supple, can be understood.

In order to increase the stability of the mounted composed element, the attachment piece and at least one of the rear wall parts will be provided with locking parts, which counteract a mutual lateral shifting.

According to still another practical embodiment, the attachment piece consists of an element which can be tensioned by means of rotating, which offers a user-friendly and reliable solution for providing a clamping force.

A number of other possible embodiments of attachment pieces will also be explained in the detailed description.

According to a particular embodiment of the third aspect, this is further characterized in that the rear wall comprises at least two rear wall parts situated on top of each other, between which at least one attachment piece is provided, wherein one or more spacers are provided for initially keeping the rear wall parts, at least at certain places, at a distance from each other, in order to allow that one or more attachment pieces can be provided there between, wherein these spacers consist of one or a combination of the following possibilities:

Spacers which are different from the rear wall parts, in other words, which do not form part of the rear wall parts themselves, and preferably are made as protrusions;

Spacers which are formed by parts of the rear wall parts themselves, in that the initial distance is created via recesses in the respective edge of one or more of the rear wall parts.

According to an independent fourth aspect, the invention relates to a composed element, more particularly a piece of furniture, which comprises at least one mountable rear wall part, as well as at least one constructional part, more particularly a wall part, which comprises a panel-shaped basic body which, on one narrow edge, is provided with a fixedly attached thereto finishing tape for mounting the rear wall, wherein laterally next to the narrow side, a seat for the rear wall part is present in the form of a groove, characterized in that the groove is formed by a recess at the edge of the basic body which, at said narrow side, is covered by said finishing tape, wherein one sidewall of the groove is formed by the wall of the recess in the basic body, whereas the other side is formed by the finishing tape. According to this aspect, a particularly simple technique is offered for technically realizing a seat for a rear wall part. Also, in this manner the rear wall can be situated very close to the rear side, by which space is gained within the piece of furniture. Still another advantage is that passages in the finishing tape can be realized very easily in order to be able to apply, for example, the first aspect of the invention.

Preferably, the finishing tape is a flat tape, such that for this purpose a tape can be applied which can be realized according to a standard technique.

Still preferably, the recess is a machine-made recess which is formed by means of a cutting treatment performed in the basic body.

Practically seen, the finishing tape has a thickness of 0.5 to 2 mm, and preferably of 0.8 to 1.2 mm, such that classical edge covering techniques can be applied, wherein the tape is supplied from a roll. However, other thicknesses are not excluded.

According to a particular embodiment, use is made of a finishing tape comprising a formed therein hook-shaped locking part, which is intended for engaging in a recess provided in the rear wall part. In this manner, an additional locking is obtained.

Preferably, the finishing tape consists of synthetic material, preferably ABS or PP.

It is clear that the finishing tape preferably is applied by gluing, with the result that classical edge finishing machines can be applied.

It is noted that with one and the same finishing tape, as aforementioned, the edge of a seat can be formed, as well as an extremity of a coupling groove can be hidden from view.

In a particular application of the fourth aspect, the finishing tape is elastically bendable, in such a manner that the rear wall part can be pressed down frontally in the pertaining groove or grooves, starting from the rear side of the composed element. In this manner, also a possibility is offered for attaching a rear wall even after the assembly of a furniture carcass to said carcass.

According to a fifth aspect, the invention relates to a composed element, more particularly a piece of furniture, wherein this composed element comprises at least a rear wall, as well as a number of constructional parts which form a whole in which the rear wall has to be provided, wherein the rear wall forms the rear side of the composed element and consists of one or more rear wall parts, characterized in that the constructional parts are provided with attachment parts realized in one piece therewith, behind which attachment parts the rear wall, usually with a certain deformation, for example, bending, can be pressed down. Due to the fact of being in one piece, particular accessories, such as the use of screws, nails, attachment clips and the like, can be excluded. Practically seen, the attachment parts herein consist of cam-shaped portions which border the seat for the rear wall. Moreover, preferably they are combined with a seat in the form of a groove.

According to a sixth aspect, the invention relates to a composed element, more particularly a piece of furniture, wherein this composed element comprises at least a rear wall, as well as a number of constructional parts which form a whole in which the rear wall has to be provided, wherein the rear wall forms the rear side of the composed element and consists of one or more rear wall parts, characterized in that the composed element is of the type wherein at least a number of the constructional parts, at corners formed for this purpose, can be joined together by means of locking profiles to form a furniture carcass, wherein the whole comprises attachment parts for the rear wall allowing that the rear wall, at least afterwards after assembly of the carcass, still can be inserted into said carcass into seats provided for this purpose, preferably without additional attachment elements. In this manner, a piece of furniture is obtained which, without many additional accessories, can be commercialized as flat-pack furniture. According to a possible embodiment hereof, the rear wall can be slid into the whole via seats and is it retained at its place by means of at least one stop.

Also, the invention, according to an independent seventh aspect, relates to a composed element, of the type comprising a number of constructional parts which are interconnected at an angle by means of locking profiles, wherein a tongue and groove coupling with locking parts is applied, wherein said locking parts substantially are located on one side of the tongue, wherein at both sides of the tongue, portions positioned opposite to each other are present, namely first portions on the side where the locking parts are present, and second portions on the other side, characterized in that, when the second portions theoretically are positioned against each other, there is a slight spacing between the first portions. As explained in more detail in the detailed description, hereby a particularly stable piece of furniture can be realized.

Further independent aspects of the invention will become clear from the further detailed description. These further aspects are of different nature, and not all of them are connected to rear wall constructions. Various aspects are connected to accessories which can be applied in furniture in general.

It is noted that the invention also relates to all possible combinations of any two or more of the aforementioned aspects, inasmuch as such combinations do not imply any contradictory characteristics.

Finally, the invention also relates to methods for applying the rear wall parts, the characteristics of which will become clear from the detailed description.

BRIEF DESCRIPTION OF THE DRAWINGS

With the intention of better showing the characteristics of the invention, hereinafter, as an example without any limitative character, some preferred embodiments of the invention are described, with reference to the accompanying drawings, wherein:

FIG. 1 in perspective represents a composed element according to the invention;

FIG. 2, at a larger scale, represents a section according to line II-II in FIG. 1, wherein exclusively the exterior walls and corner connections are represented;

FIG. 3 represents a rear view of the composed element of FIG. 1;

FIG. 4, at a larger scale, represents a view according to arrow F4 in FIG. 3;

FIG. 5 represents a section according to line V-V in FIG. 4;

FIGS. 6 and 7, at a larger scale, represent sections according to lines VI-VI and VII-VII in FIG. 3;

FIG. 8, at a larger scale and for a variant, represents a view of the portion indicated by F8 in FIG. 5;

FIG. 10 in perspective represents the attachment piece indicated by F10 in FIG. 9, however, for a slightly altered variant thereof;

FIG. 22 represents a foldable rear portion of the composed element of FIGS. 20-21;

FIG. 23, at a larger scale, represents a section according to line XXIII-XVIII in FIG. 22, however, for a folded-open condition of the rear wall part;

FIG. 24 represents a view of the portion of FIG. 23, however in a completely folded-back closed condition;

FIGS. 39 to 45 represent another particular embodiment of the invention, wherein FIGS. 41 and 42 are sections according to lines XLI-XLI and XLII-XLII in FIG. 40, respectively, and FIGS. 44 and 45 are sections according to lines XLIV-XLIV and XLV-XLV in FIG. 43, respectively;

FIGS. 52 to 84 represent further different accessories which can be applied in furniture;

DETAILED DESCRIPTION OF VARIOUS EMBODIMENTS

Figure 9:
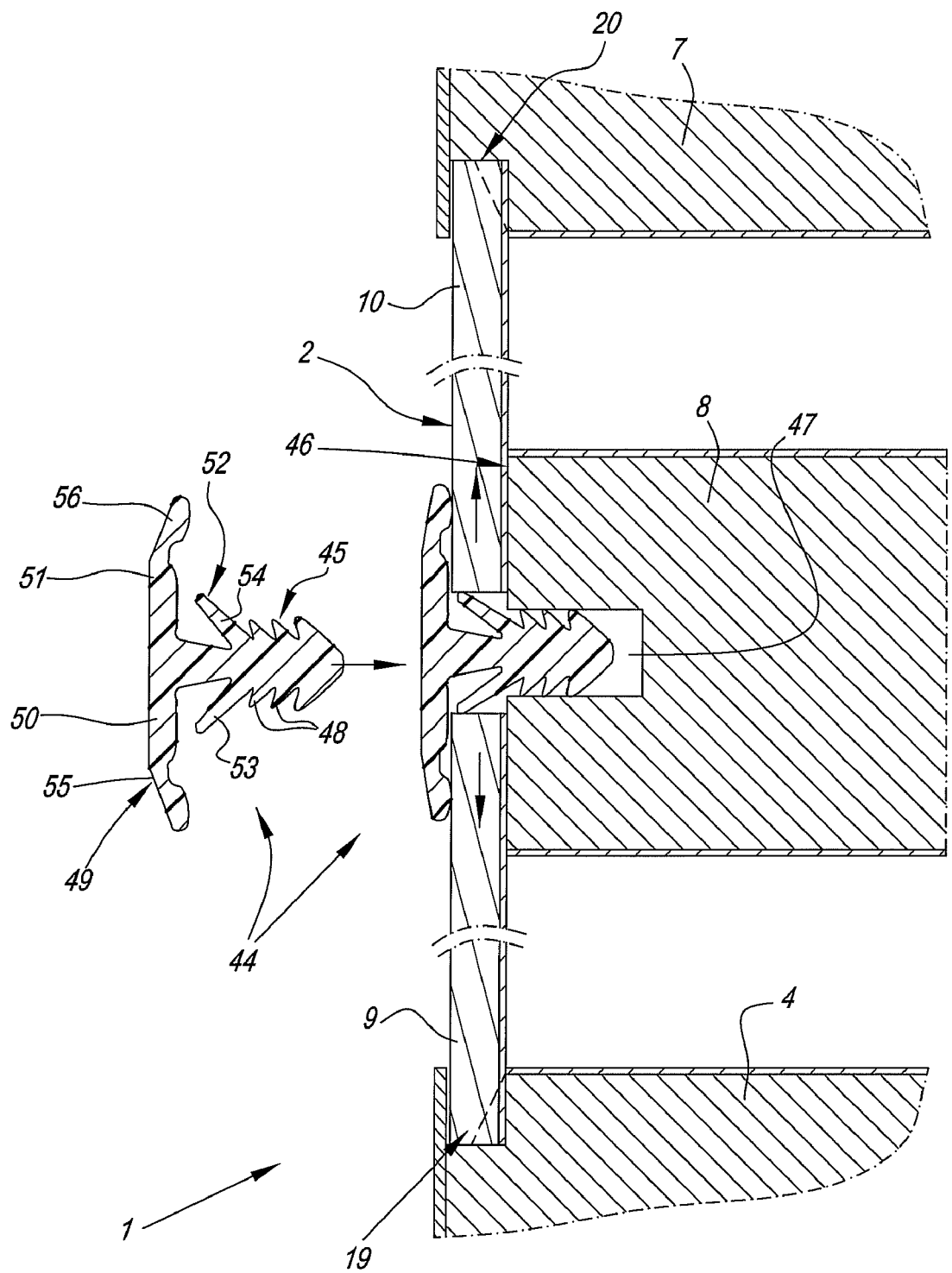
FIG. 9, at a larger scale, represents a view according to line IX-IX in FIG. 3.

In FIGS. 1 to 3, a composed element 1 according to the invention is represented, in this case in the form of a piece of furniture, more particularly a cupboard. The element 1 comprises a rear wall 2, as well as a number of constructional parts, which in this case are indicated generally by reference number 3 and which form a whole in which the rear wall 2 is provided, in such a manner that the rear wall 2 forms the rear side of the composed element 1.

In the example, the constructional parts 3 are formed by a bottom wall 4, a left-hand side wall 5, a right-hand side wall 6, a top wall 7 and a shelf 8. In this example, the rear wall 2 is composed of two rear wall parts 9 and 10 situated one above the other.

As can be seen in FIG. 2, this preferably relates to a composed element 1 of the type of which the constructional parts forming the actual basic carcass, in this case the aforementioned walls 4, 5, 6 and 7, substantially can be locked to each other exclusively by means of coupling parts 11-12 integrated at the edges, thus, without the necessity of separate connection elements. More particularly, it is also preferred that, as represented, the constructional parts 3 preferably all consist of flat or relatively flat elements, as a result of which the whole can be marketed as flat-pack furniture.

The coupling parts 11-12 may be of any form, however, as represented, preferably consist of a tongue 13 and groove 14 which are provided with locking parts 15-16 engaging behind each other. Examples hereof are widely known, amongst others, from the international patent application WO2010/070605.

Further, the composed element 1 is at least provided with seats 17 and 18, and in the example also 19 and 20, in which the rear wall parts 9-10 are taken up, which seats, in the example, consist of grooves 21-22 on opposite sides of the basic carcass, thus, in the inner sides of the side walls 5 and 6, as well as grooves 23-24 on the inner sides of the bottom wall 4 and the top wall 7. Herein, this relates to grooves which are integrated in the respective walls 4-5-6-7, which will become clear further below.

As represented in FIGS. 4 to 7, the grooves comprise a first side wall 25, which borders such groove towards the front side of the piece of furniture, a second side wall 26, which borders such groove towards the rear side of the piece of furniture, and a bottom 27. The side wall 26 is part of an edge 28 behind which the respective rear wall parts thus are retained in mounted condition.

In the represented example, each groove as such is formed by a recess 29 in the respective constructional part, whereas the edge 28 is formed by a portion 30 of a relatively stiff finishing tape 31, which is provided on the narrow side 32 of the respective constructional part and whereby said portion 30 reaches up to in front of the recess 29. However, it is clear that the first aspect of the invention is not restricted to the manner how such groove and the edge bordering the groove are composed materially, and that said groove and edge, within the scope of this herein below explained first aspect, can also be realized in any other manner.

In accordance with the first aspect of the invention, at least the seats 17-18 are configured such that said rear wall parts 9-10 can be slid into the seats 17-18 starting from the rear side of the composed element, more particularly from a position which differs from the final plane in which the rear wall parts 9-10 are situated in the final condition. More particularly, the whole is configured such that, when all constructional parts to which the rear wall 2 has to be attached are mounted to each other, the rear wall 2 still, as aforementioned, can be slid into the seats 17-18 and consequently also can be positioned in the seats 19-20.

To this aim, as represented in FIG. 3, two passages 33-34 are present between the grooves 21-22 and the rear side of the composed element 1, which allow that the rear wall parts 9-10 can be slid up into the grooves starting from the rear side, through said passages 33-34, possibly with a certain bending and/or other deformations in the respective rear wall parts and/or the respective edges. In the example, the passages 33-34 are situated on opposite sides of the rear side of the piece of furniture, such approximately halfway up. As can be seen more specifically in FIG. 4, such passage 33-34 consists in that the edge 38 locally is not present over a restricted distance, or according to an alternative at least is more pronouncedly less present, in this case in that the finishing tape 31 locally is cut away.

As can be seen in FIG. 3, the passages are situated at the height of the location where the rear wall parts 9-10 merge into each other, thus, at the height where the upper edge 35 of the lower rear wall part 9 and the lower edge 36 of the upper rear wall part 10 adjoin against each other or approximately against each other.

It is clear that the grooves 23 and 24 form seats for the lower edge of the rear wall part 9 and the upper edge 38 of the rear wall part 10. All this permits that the rear wall parts at a first pair of opposite edges, namely the edges 39-40 and 41-42, are displaceable in said grooves 21-22, until they also at a second pair of opposite edges, in this case formed by the lower edge 37 of the lowermost panel and the upper edge 38 of the uppermost panel, are positioned in the grooves 23-24 present there.

In the represented example, the whole is configured such that the two rear wall parts 9-10, starting from the passages 33-34, can be slid in opposite directions D1 and D2 into the respective grooves 21-22, more specifically as explained herein below by means of FIG. 5. It is clear that herein first the furniture carcass is composed, as illustrated in FIG. 2. Subsequently, the lowermost rear wall part 9 is slid according to direction D1 through the passages 33-34 towards the bottom side of the piece of furniture into the groove, thus, starting from an inclined and mostly somewhat bent position P1 towards a final position P2 in the final plane of the rear wall. In the position P2, the lowermost rear wall part becomes seated with its lowermost edge 37 in the lowermost groove 23. Subsequently, the uppermost rear wall part 10, starting from an inclined and mostly somewhat bent position P3, is slid, via the same passages 33-34, according to the represented direction D2 into the grooves until it finally also assumes a position P4 in the actual plane of the rear wall. It is noted that the dimensions of the rear wall parts preferably are such that, when the latter are situated against each other in the aforementioned positions P2 and P4, they still are seated with the lower edge 37 and upper edge 38, respectively, in the grooves 23 and 24.

For illustration's sake, FIGS. 6 and 7 also represent cross-sections in mounted condition.

In FIG. 8, a variant is represented, wherein the rear wall part is made thinner towards one edge, in this case by means of a chamfer 43. As represented, this facilitates bringing such rear wall part initially behind the edges of the respective grooves.

The composed element 1 represented in FIG. 3 is also provided with an attachment piece 44 for the rear wall parts 9-10, which, in accordance with the third aspect of the invention, cooperates with an intermediate panel, in this case the shelf 8. The composition of the represented embodiment hereof, as well as the working thereof, is explained hereafter with reference to FIGS. 2 and 9.

In view of said cooperation, the attachment piece 44 is provided with an attachment portion 45, which engages on the rearward-directed side 46 of the shelf. This attachment portion 45 is performed as a clamping part which can be pressed down in an opening 47, such as a groove, which is provided in the respective shelf 8 for this purpose, more particularly a clamping part with barbs 48.

Further, the attachment piece 44 comprises a stop-forming part 49, in this case in the form of a flange which, in the mounted condition, cooperates with the rear sides of the rear wall parts 9-10. The attachment portion 45 and the flange form a substantially T-shaped body, wherein the flange defines two wings 50-51 situated on opposite sides of the attachment portion.

Further, the attachment piece 44 comprises a support portion 52 laterally cooperating with the adjoining edges of the rear wall parts. Herein, the support portion 52 is performed as a tensioning part which pushes the respective rear wall parts away from the attachment piece 44, preferably such that they are pressed down in their seats. The tensioning part is formed by elastically deformable lips 53-54 acting on the rear wall parts with an elastic force.

As represented in FIG. 2, the attachment piece 44 may be performed in the form of a profile strip, for example, of synthetic material.

In the example of FIG. 9, the wings 50-51 comprise elastically bendable parts 55-56, which, in the mounted condition, exert a permanent pressing force. On the one hand, this offers the advantage that the rear wall parts are permanently pressed against the rear side of the shelf 8. By this pressing force, a clamping is obtained, too, which effects that it becomes more difficult for the rear wall parts 9-10 and the shelf 8 to move in mutual respect, by which the composed element becomes less sensitive to possible wobbling movements which might arise in such piece of furniture as a result of play.

In FIG. 10, a variant of the attachment piece 44 is represented, wherein the flange is substantially flat. FIG. 10 also clearly shows that the attachment piece is made as a profile strip.

It is noted that such attachment piece 44, and in particular when it is made as a profile, can consist of any suitable material, for example, of metal or synthetic material, wherein synthetic material, due to its elasticity, is preferred.

Possibly, such attachment piece 44 and at least one of the rear wall parts 9-10, and preferably both, may comprise locking parts which counteract a mutual lateral displacement, mutually among the two rear wall parts, and/or mutually among one or more rear wall parts and a partition wall. In FIG. 10, as an example, such locking parts 57-58 are represented in dashed line as an alternative. Herein, they consist of local protrusions, which are intended for cooperation with non-represented openings in both rear wall parts.

The attachment pieces 44 preferably are performed such that they can be provided manually in a simple manner, preferably without tools. In the represented example, providing such attachment piece 44 thus also is performed simply by positioning it between the two rear wall parts 9-10 and pressing it down in the opening provided for this purpose. The attachment portion 45 then provides for that the attachment piece is fixedly retained in the shelf 8. The stop-forming part 49, or, thus, the wings 50-51, provide for that the rear wall parts remain positioned against the shelf. The support portion 52 supports the rear wall parts on each other, wherein between these rear wall parts also a tensioning force is exerted by the portions 55-56.

It is noted that, as can be seen in FIG. 3, at the location where such attachment piece 44 has to be provided, recesses 59 can be provided in one or both of the rear wall parts 9-10. These recesses 59 offer various advantages. A first advantage consists in that, when the rear wall parts 9-10 rest freely upon each other, it is directly visible where the attachment piece 44 has to be provided. A second advantage is that the installing person does not need to first push the two rear wall parts out of each other in order to install the attachment piece 44. A third advantage is that the two rear wall parts, as long as such attachment piece is not applied next to the recesses 59, rest upon each other and the upper rear wall part remains present in the respective groove with its upper edge, by which is excluded that, while applying the attachment piece, one would have to pay attention to whether the uppermost rear wall part slides into the pertaining groove.

The recesses 59 can be exclusively present there where the attachment pieces 44 are provided, however, as represented in dashed line in FIG. 3, they can also be present on other locations, more particularly on respectively two opposite edges of such rear wall part, such that, irrespective of how the installing person provides the rear wall parts, these latter will always be in the right position for still providing the attachment piece.

Figure 11:
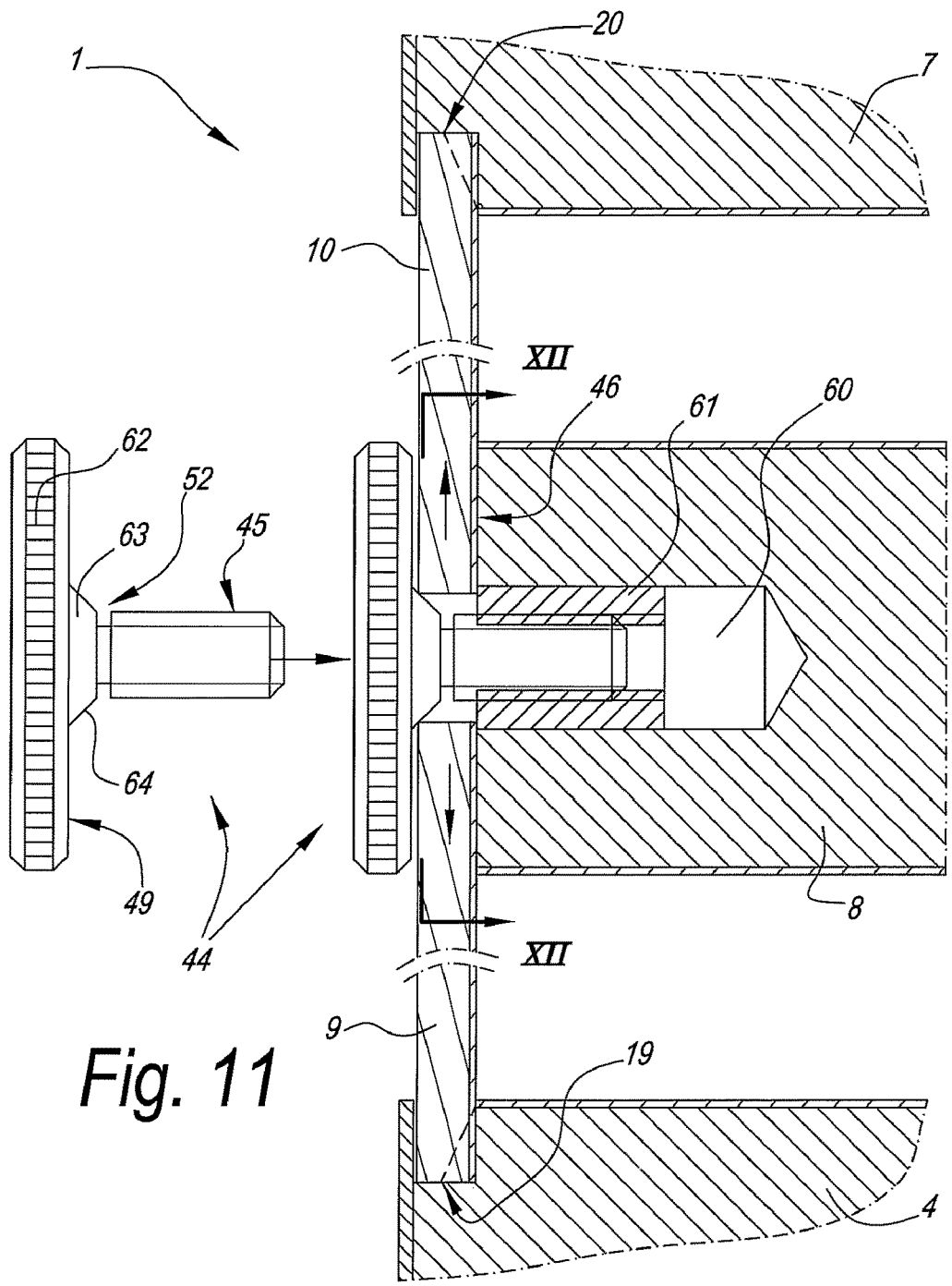
FIG. 11 represents a variant of the embodiment of FIG. 9.
Figure 12:
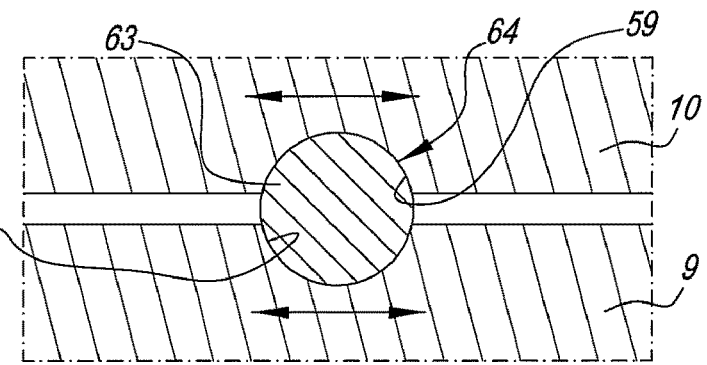
FIG. 12 represents a section according to line XII-XII in FIG. 11.

In FIGS. 11 and 12, a variant of such attachment piece 44 is represented. The attachment portion 45 is designed as a screw part, which can be screwed down in an opening 60 which for this purpose has been provided in the shelf 8 concerned, either directly in the material of the shelf or, as represented, in a bush 61, provided with screw thread and being fixed in the opening 60 for this purpose.

Here, too, the attachment piece 44 comprises a stop-forming part 49, in this case in the form of a round flange which, in the mounted condition, cooperates with the rear sides of the rear wall parts 9-10. The flange comprises a portion 62 in the form of a turning knob, as well as a conical or inclined portion 63, the inclined side 64 of which, when the attachment piece is screwed down, comes into contact with the edges of the rear wall parts. As a consequence of said cooperation, not only a clamping down of the rear wall parts against the shelf 8 is obtained, but also a lateral pushing-apart of the rear wall parts is obtained, by which the play thereof in the seats is reduced or even removed and a tension is created, by which the rigidity of the piece of furniture is enhanced. The turning knob possibly may be screwed down so far that the aforementioned portion 62 is tensioned with its rear side against the rear wall parts, whereas the portion 63 penetrates somewhat into the material of the rear wall parts. It is clear that the portion 63 herein functions both as a support portion 52 and as a tensioning part.

Herein, the recesses 59 preferably are realized locally, for example, in the form of approximately semi-circular recesses, whereby they also automatically function as laterally-effecting locking parts, wherein a mutual lateral displacement of the rear wall parts is excluded.

Figure 13:
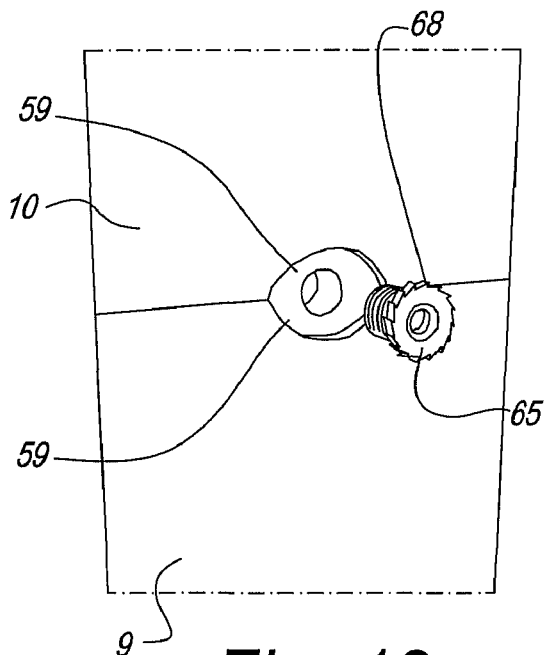
FIGS. 13 to 15 illustrate another variant of the embodiment of FIG. 9.
Figure 14:
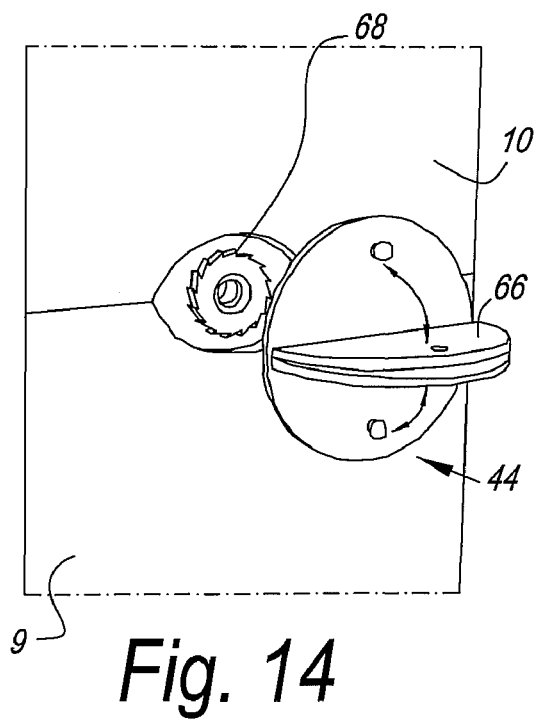
Figure 15:
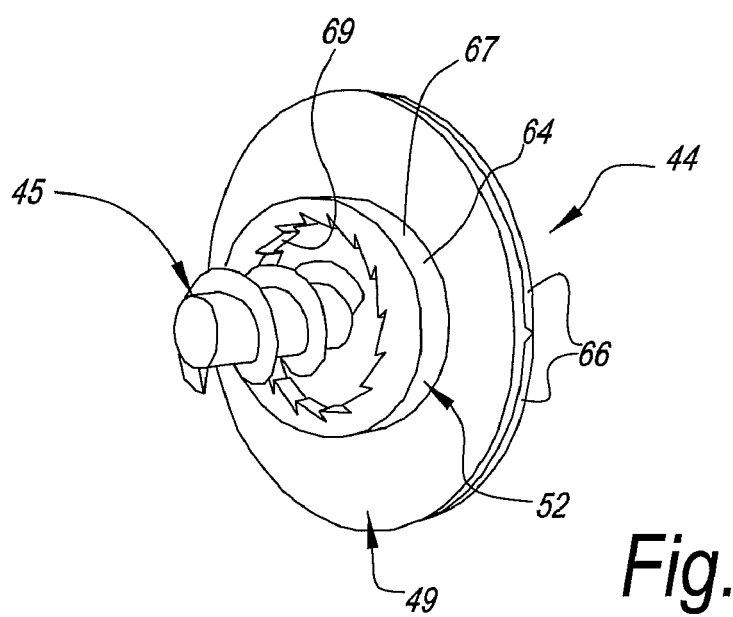

In FIGS. 13 to 15, another variant is represented. Here, too, a bush 65, provided with screw thread, is attached in the rear edge of a shelf 8 or the like. Into this, an attachment piece 44 is screwed, which fits into the bush 65 with an attachment piece 45 which is provided with screw thread. The attachment piece 44 comprises a stop-forming part 49 in the form of a flange, with a foldout-handle 66 for rotating and tensioning the whole, as well as a support portion 52, functioning as a tensioning part, with a radial surface 67, wherein the distance of the latter to the central axis of the attachment portion varies in function of the circumference, preferably in that the support portion is elliptical. Also, pawl-shaped teeth 68-69 are provided on the bush 65 and the attachment piece 44, which, possibly by deformation in one mutual direction, in fact can be rotated in mutual respect, however, are prevented from rotating back. During assembly, when the attachment piece 44 is screwed into the bush 65, a condition is created wherein the elliptical support portion 62 is tensioned between the edges of the two rear wall parts and thus pushed the latter apart. It is clear that the recesses 59, the shape of the support portion 52 and more particularly the contour of the surface 67 thereof, and the screw threads in the bush 65 and on the attachment portion 45, are adapted such in a fitting manner that the support portion initially gets with its smallest radial dimension between the rear wall parts and, when rotated from this position, provides for the intended tensioning action.

It is clear that the invention is not restricted to composed elements 1 of which the rear wall is composed of two rear wall parts, or wherein the passages 33-34 are situated halfway of the height of the composed element. In order to demonstrate this, hereafter, by means of FIGS. 16 to 26, some variants of composed elements 1 are described, wherein the rear walls are realized in a different manner.

Figure 16:
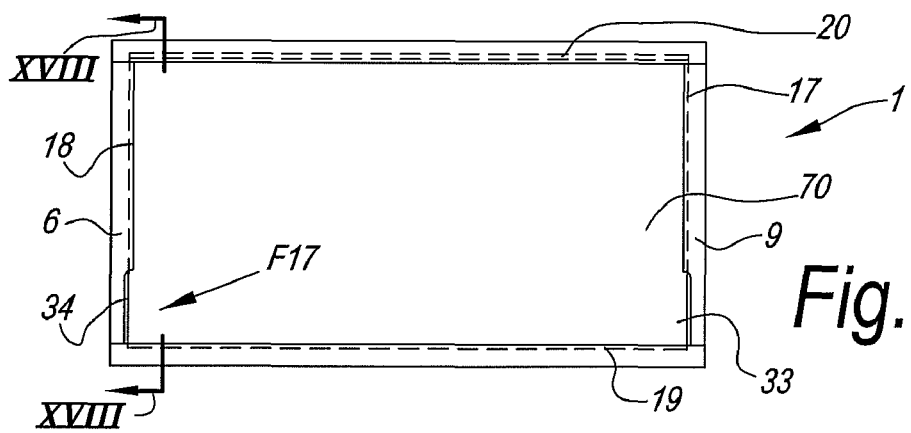
FIG. 16, in a rear view, represents a composed element according to the invention.
Figure 17:
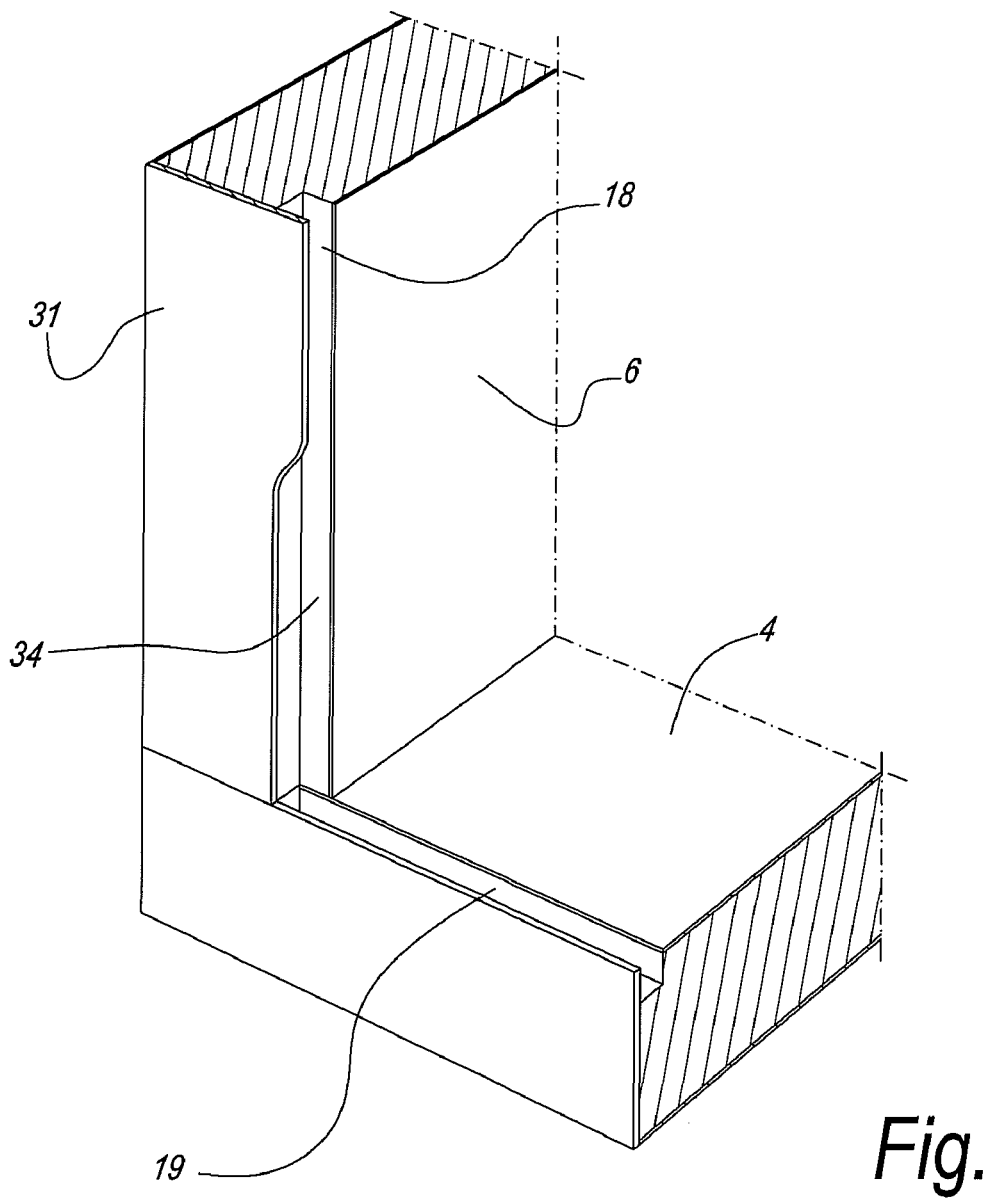
FIG. 17, at a larger scale, represents a view according to arrow F17 in FIG. 16.
Figure 18:
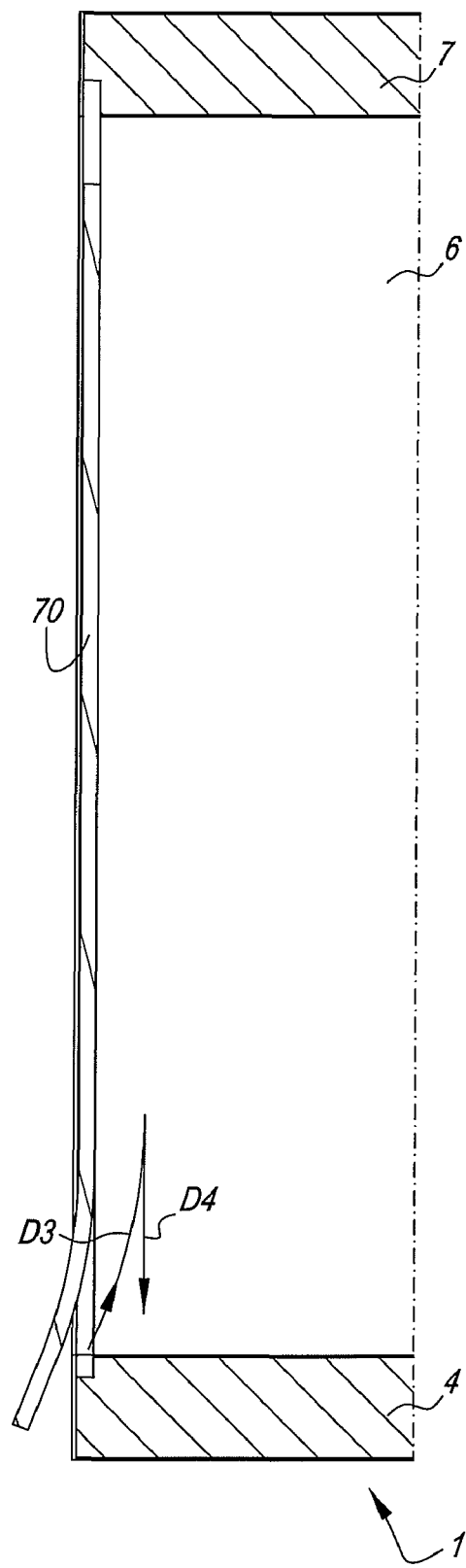
FIGS. 18 and 19, at a larger scale, represent sections according to line XVIII-XVIII in FIG. 16, during and after mounting the rear wall.
Figure 19:
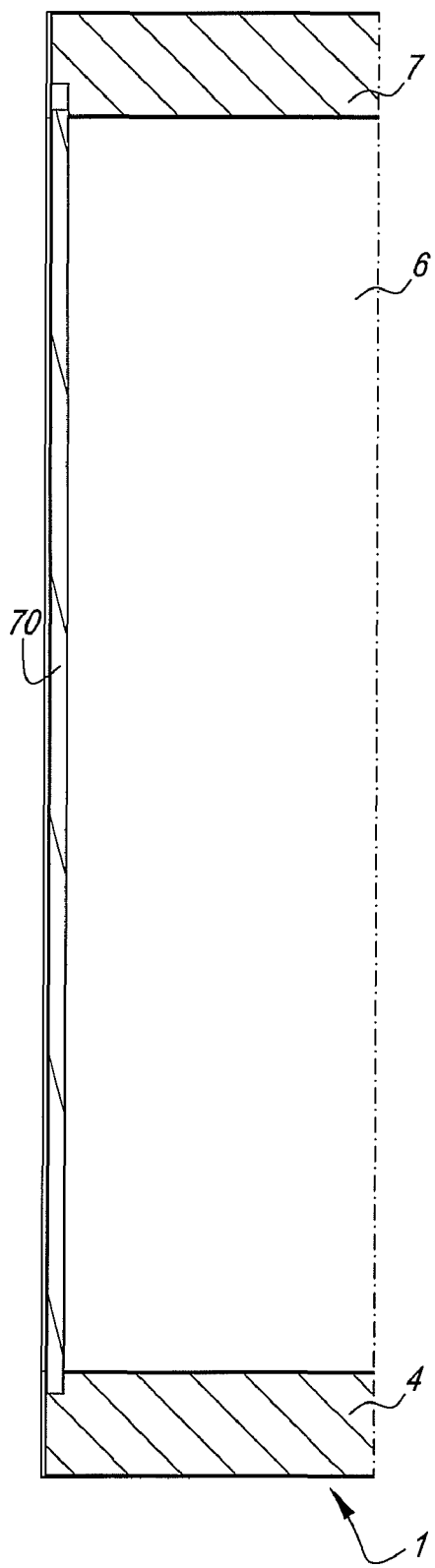
Figure 20:
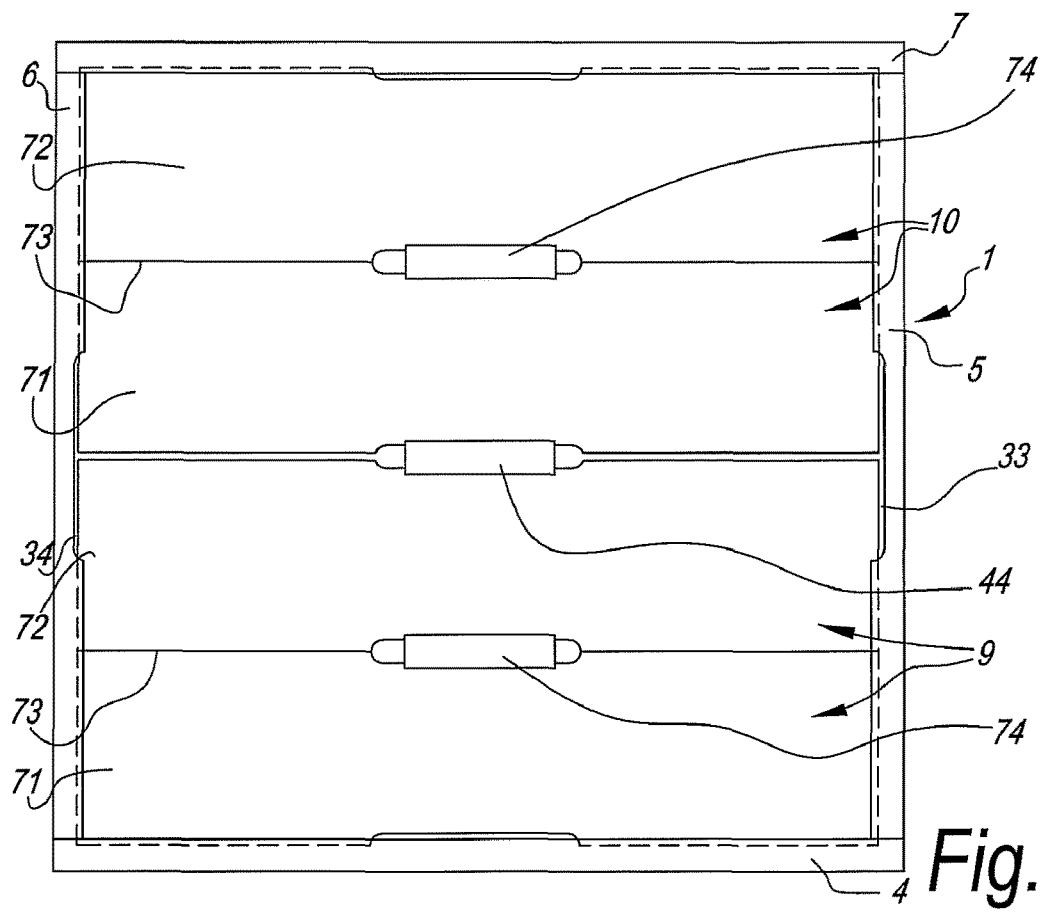
FIGS. 20 and 21 represent another variant of the invention.
Figure 21:
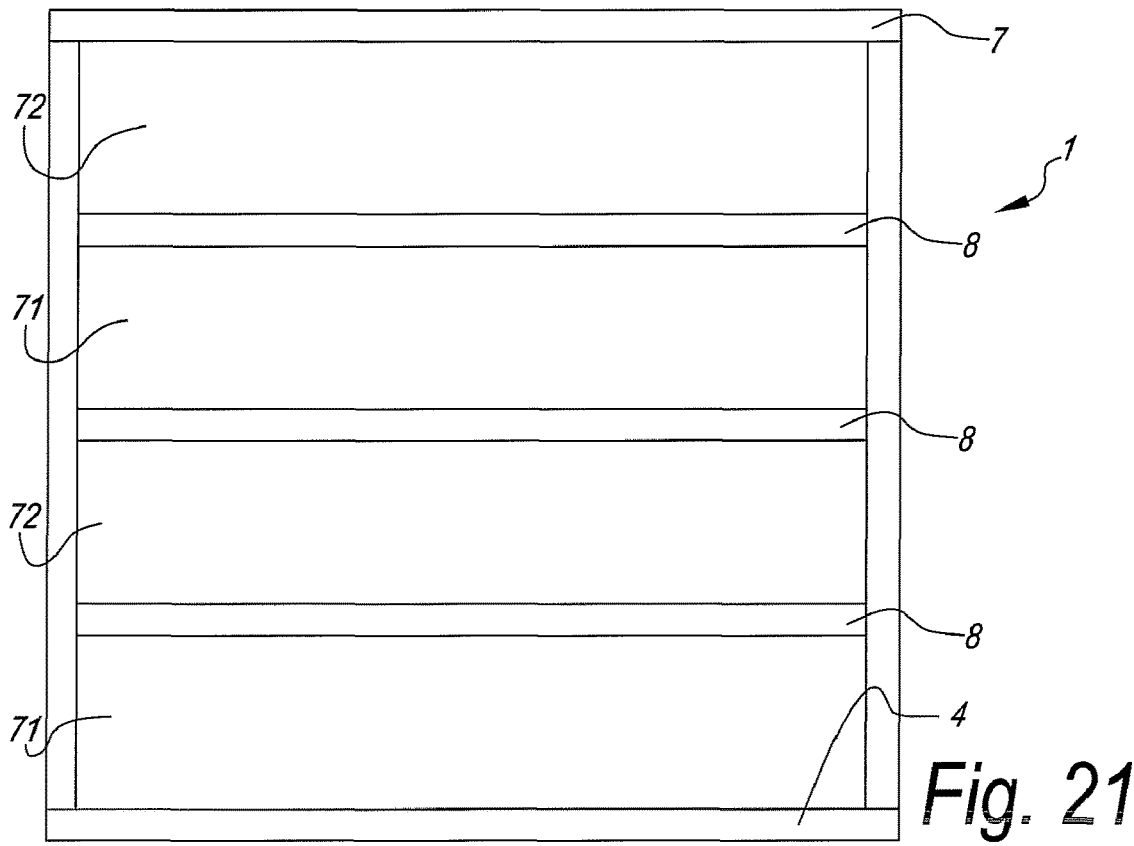
Figure 25:
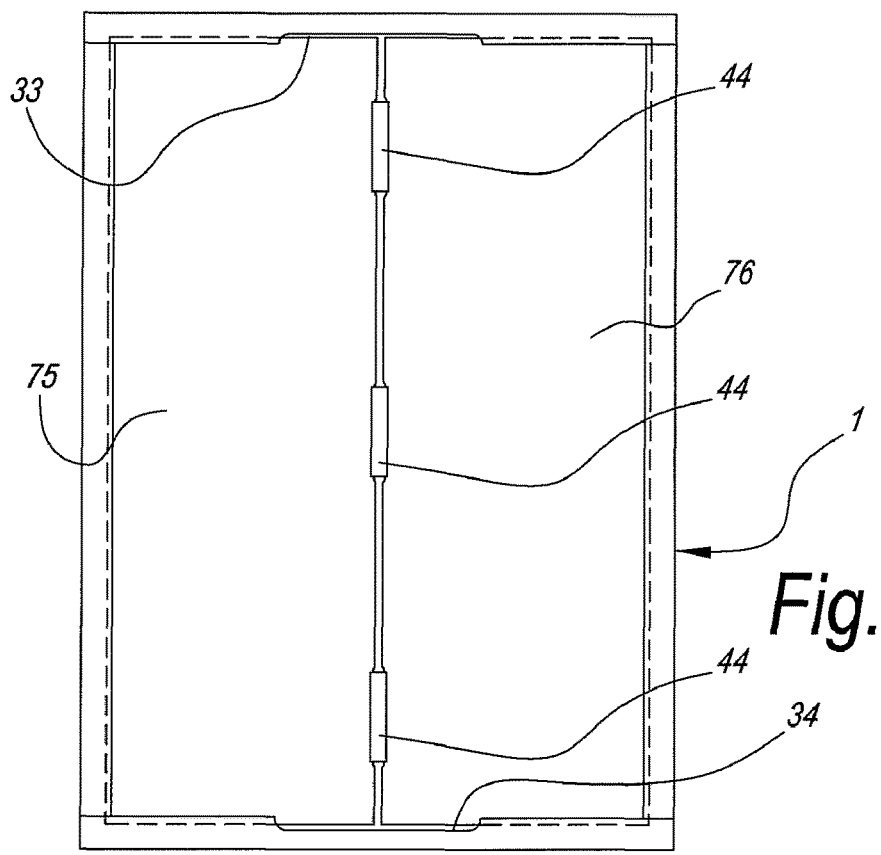
FIGS. 25 and 26 represent another composed element of the invention, in a back and a front view, respectively.
Figure 26:
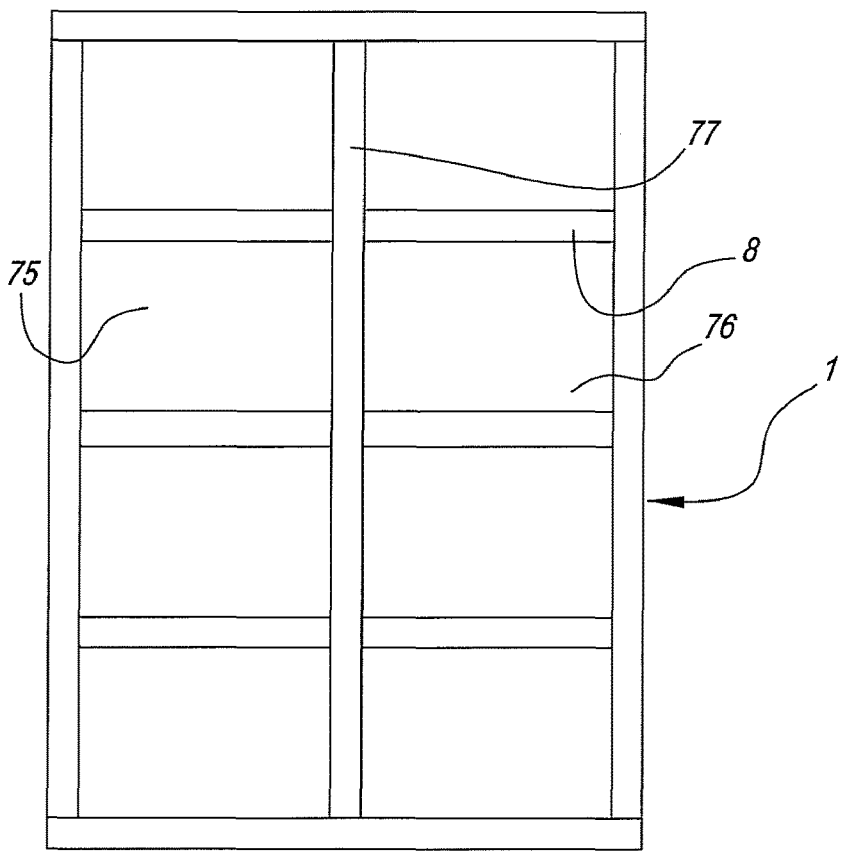

In FIG. 16, in a rear view a composed element 1 is represented having only one rear wall part 70. Seats 17-18-19-20 in the form of grooves are located on all four sides. Next to the lower edge, on opposite sides passages 33-34 are provided for providing the rear wall part 70. As represented in detail in FIG. 17, such passage 34, in a manner comparable to that of FIG. 4, can consist of a cutout in the finishing tape 31. Applying the rear wall part then is performed, in accordance with the first and second aspect of the invention, by sliding the rear wall part through the passages 33-34 into the grooves, according to arrow D3 in FIG. 18, in order to subsequently letting it drop somewhat according to arrow D4 in order to obtain that it becomes seated in the seats on all edges, as illustrated in FIG. 19.

In FIGS. 20 to 24, a variant is represented wherein use is made of two rear wall parts 9-10, which each as such are made multi-part, thus, in the form of a folding back, respectively. Each rear wall part 9, 10, respectively, comprises two portions 71-72, which respectively are linked together by means of a hinge portion 73. FIG. 22 shows such rear wall part in partially folded-open form. Herein, the hinge portion 73 is formed by a glue joint which connects the two portions and functions as a kind of film hinge. FIGS. 23 and 24 represent a magnification at the height of the hinge portion 73, in a completely folded-open condition and a completely folded-tight condition, respectively. It is clear that such rear wall part in the folded-tight condition has only half the size as in folded-open condition. Such rear wall part, which is performed as a folding rear wall, offers the advantage that in mounted condition, it will behave as a single part, which renders a better rigidity to the piece of furniture than two separate parts. At the same time, the advantage is offered that such rear wall part in the folded-tight condition is easier to package and transport, which is very useful with flat-pack furniture.

The two rear wall parts 9 and 10, after having been folded open, are slid through the passages 33-34 into the respective seats in a manner analogous to that of the embodiment of FIG. 2.

The whole preferably is constructed such that all transitions, thus, the transitions between two rear wall parts as well as the transitions between the portions 71-72, will be situated behind shelves or the like. An attachment piece 44 can be provided between the two rear wall parts 9 and 10. Possibly, also additional attachment pieces 74, analogous to the attachment pieces 44, can be provided at the folding edges.

It is noted that the hinge portion can also be realized in other manners. For example, a covering film, which is provided continuously over two or more portions of a rear wall part, can be applied as a film hinge at the location of the transitions.

It is also noted that the rear wall parts and attachment pieces do not necessarily have to be directed horizontally. For example, FIGS. 25 and 26, in a rear view, represent an embodiment of a piece of furniture with vertically-directed rear wall parts 75-76 and attachment pieces 44. These latter then cooperate with openings in a partition wall 77. It is clear that providing the rear wall parts then is performed by means of passages 33-34, which are situated on the top and bottom of the piece of furniture.

Generally, the constructional parts 3 and rear wall parts can consist of various materials, however, preferably use shall be made of covered board material. This is especially recommended for the manufacture of flat-pack furniture.

The constructional parts 3 preferably consist of a basic board 78, which is provided with a covering 79 on opposite sides.

Such basic board 78 preferably is based on vegetable matter and more particularly consists of particles and/or fibers consolidated by means of a binding agent, whether or not mixed with other materials. Wood material is most recommended, preferably in the form of chips and/or fibers, for example, particle board or MDF/HDF, possibly at least partially and possibly entirely of recycled wood.

Possibly, more light-weight basic boards can be applied by making use of flax chips or by mixing in cork, expanded synthetic material parts or the like. It is also not excluded to apply hollow boards for the basic board 78, which, however, have strips at the edges in which the respective seats are provided. The hollow portions can be provided with honeycomb structures.

The basic board 78 can have any thickness. Usual thicknesses for furniture are situated between 12 and 30 mm, however, other values are not excluded.

Said covering 79 preferably is formed by laminate, for example, in the form of DPL, however, other coverings are not excluded, such as lacquer, films, veneer and the like.

The basic board 80 of the rear wall and the covering 81 thereof can be constructed in a similar manner. Preferably, the back, however, is relatively thin and has a thickness in the order of magnitude of 3 mm. Preferably, as represented, it is provided with a covering 81 on one side only. In a practical embodiment, to this aim a MDF or HDF board is applied and the covering consists of a film. Other possibilities are not excluded.

It is clear that the combination of the fourth aspect of the invention with the first aspect offers a practical solution for realizing the aforementioned passages 33-34, as in that case only the finishing tape 31 has to be interrupted locally, which can be realized very easily by means of a movable cutting tool, such as a milling cutter, which can be present in the tape adhering device. In the actual furniture panel, exclusively a straight-lined recess 29 has to be realized, and the necessity of particular milling treatments in the furniture panel itself, for forming passages, is excluded.

Figure 27:
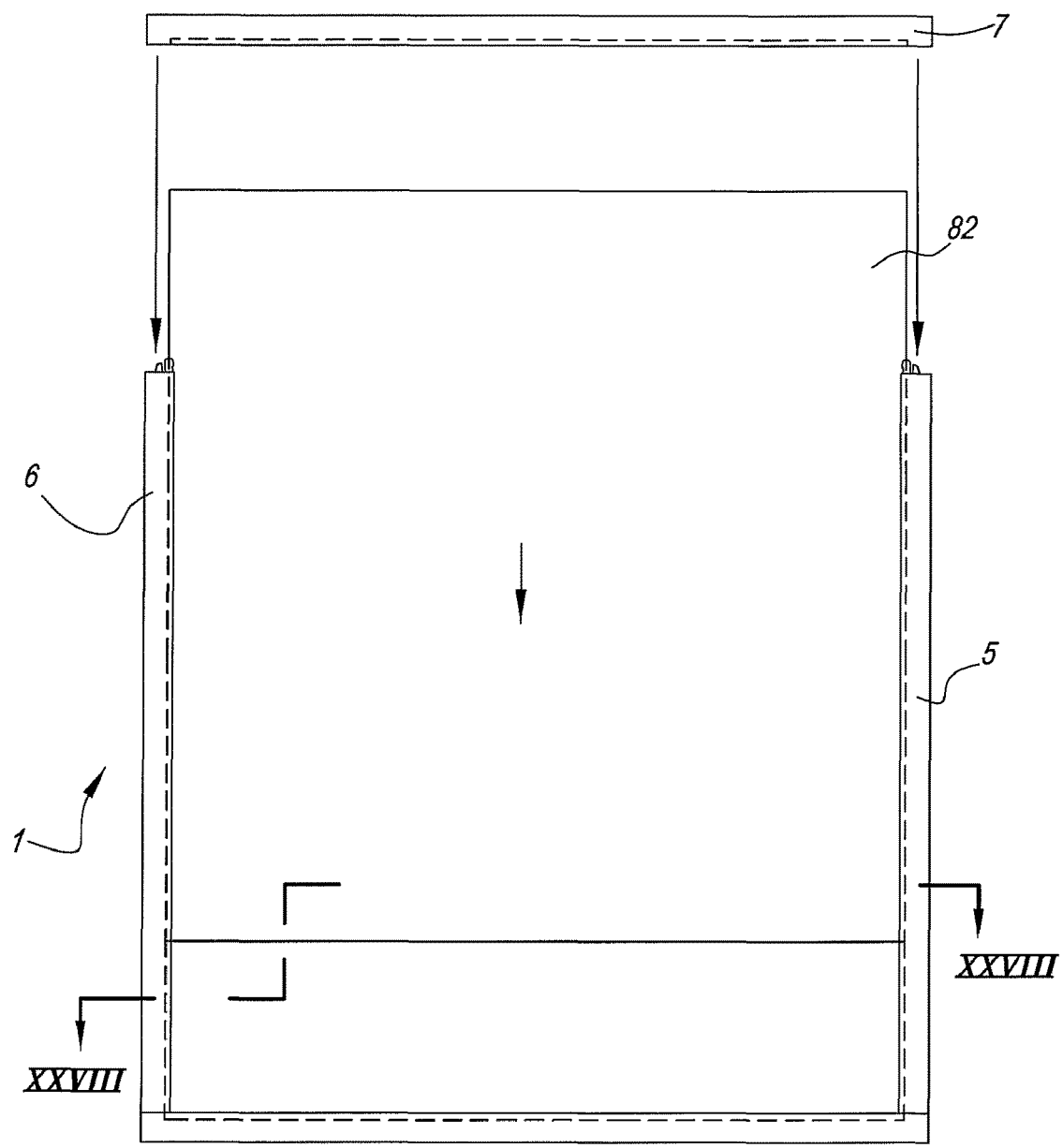
FIG. 27, in a back view, represents another composed element according to the invention.

The herein above-described embodiment of the fourth aspect can also be realized independent from the first aspect. In fact, it is clear that said fourth aspect in general relates to the manner in which the seat for the rear wall is formed, wherein this is independent from the manner in which the rear wall is provided in the pertaining seats. As an example, in FIGS. 27 and 28 thus a composed element 1 is represented, more particularly a piece of furniture, in which no passages, as aforementioned, are present; however, the rear wall part 82 is let down into the seats in the usual manner between the two side walls 5-6 and wherein then only thereafter the upper wall 7 is provided on the side walls, wherein the attachment of the rear wall part, however, is performed by applying the fourth aspect of the invention.

Figure 28:
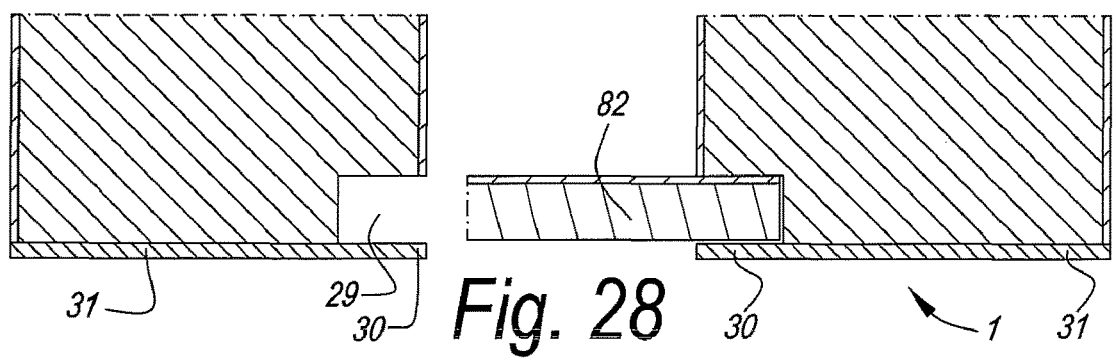
FIG. 28, at a larger scale, represents a section according to line XXVIII-XXVIII in FIG. 27.
Figure 29:
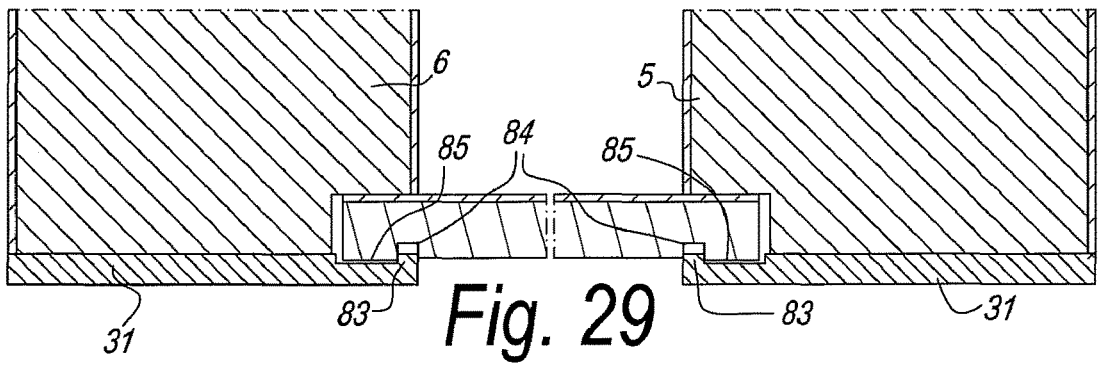
FIGS. 29 to 33, in views similar to that of FIG. 28, represent different variants.
Figure 30:
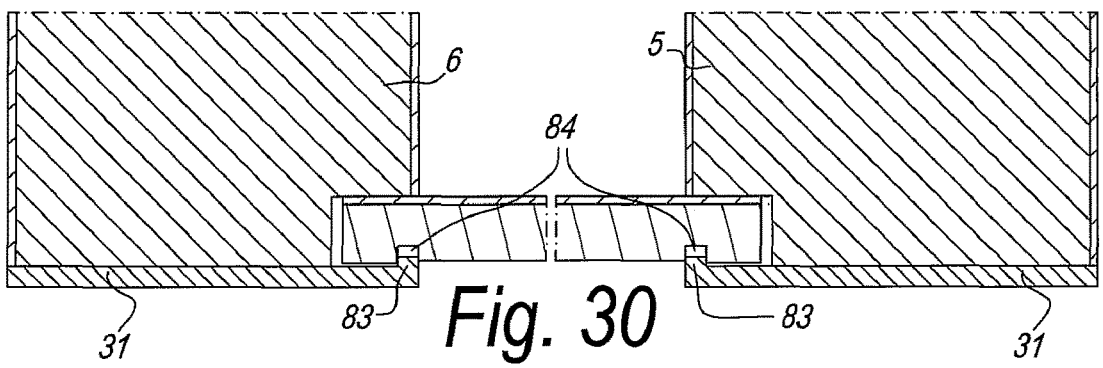
Figure 31:
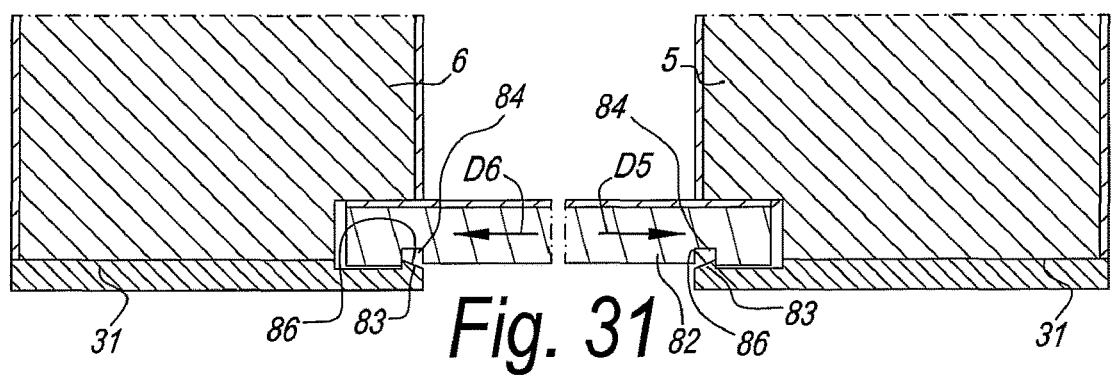

In FIGS. 29, 30 and 31, in cross-sections similar to that of FIG. 28, a number of particular embodiments of the fourth aspect are represented. The particularity herein consists in that the finishing tapes 31, at least at one pair of opposite sides of the rear wall part 82, are provided with hook-shaped locking parts 83, which cooperate with the rear wall part, more particularly with groove-shaped recesses 84 in the rear wall part. In this manner, it is obtained that the rear wall contributes better to the rigidity of a piece of furniture, by which the latter will wobble less than in the case that no hook-shaped locking parts are applied.

Preferably, the finishing tapes 31 are already provided with the hook-shaped locking part before they are applied.

In the embodiment of FIG. 29, the finishing tape 31 has a hook-shaped locking part 83 in that, at a distance from the edge of the finishing tape, a recess 85 is formed in the finishing tape. FIG. 30 represents a variant, wherein the hook-shaped locking part protrudes from the actual plane of the tape.

In the embodiment of FIG. 31, chamfers 86 are formed on the protruding locking part. This is, for example, useful when such rear wall part has to be slid into the seats according to directions D5-D6. This may be, for example, when it is intended that the rear wall part is somewhat elastically bent in order to be subsequently positioned between the side walls of the piece of furniture, such that, after releasing it, it will relax in a flat condition, with the edges in the seats. As an example, the embodiment of FIG. 31 can also be useful for being applied on the bottom and top in an embodiment of a piece of furniture according to FIG. 27.

Figure 32:
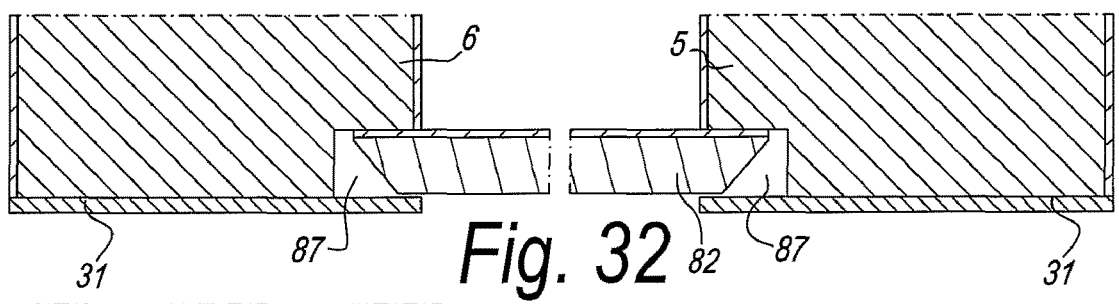
Figure 33:
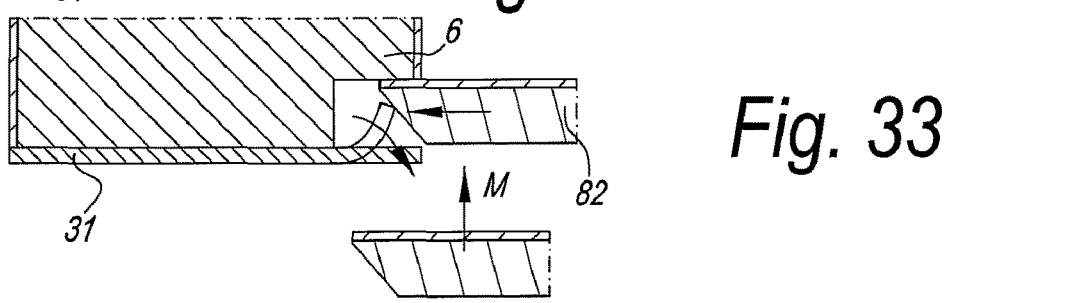

FIGS. 32 and 33 represent a particular embodiment of the fourth aspect, with the particularity that the whole is configured such that a rear wall part 82 can be provided at its place by means of a frontal movement M and by bending the finishing tape 31. Preferably, this is substantially realized by applying a material removal at the rear side of the respective rear wall part, which in the represented example consists of a chamfer 87.

The present invention also aims at a device for attaching a shelf by means of a shelf support, wherein the whole is designed such that, on the one hand, the shelf support in mounted condition is of little or no hindrance, and, on the other hand, the provisions which have to be made on the shelf itself can be realized in a simple manner in respect to production techniques and at low costs.

According to the invention, to this aim a device is applied which is characterized in that the bottom side of the shelf, starting from the lateral edge thereof, is provided with a recess; that, starting from this recess, an upward-directed bore hole extends in the shelf; that a lateral bore hole is present in the side wall; that the shelf support comprises a body which fits into said recess and, in the mounted condition, is sitting at least partially and preferably completely countersunk in respect to the bottom side of the shelf; that an upward-directed protrusion fitting in said bore hole is present on said body; and that the shelf support further comprises an attachment part with which it fits into the lateral bore hole.

Figure 34:
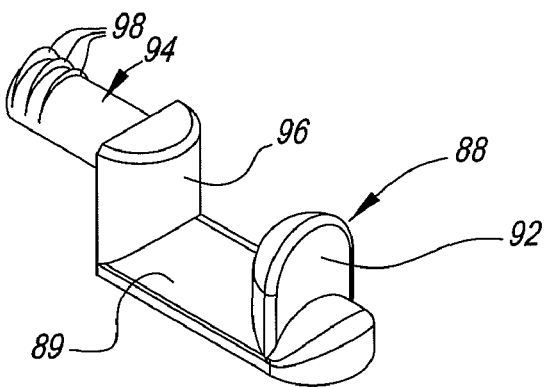
FIGS. 34 to 38 represent two embodiments of a device for attaching, more particularly supporting, a shelf.
Figure 35:
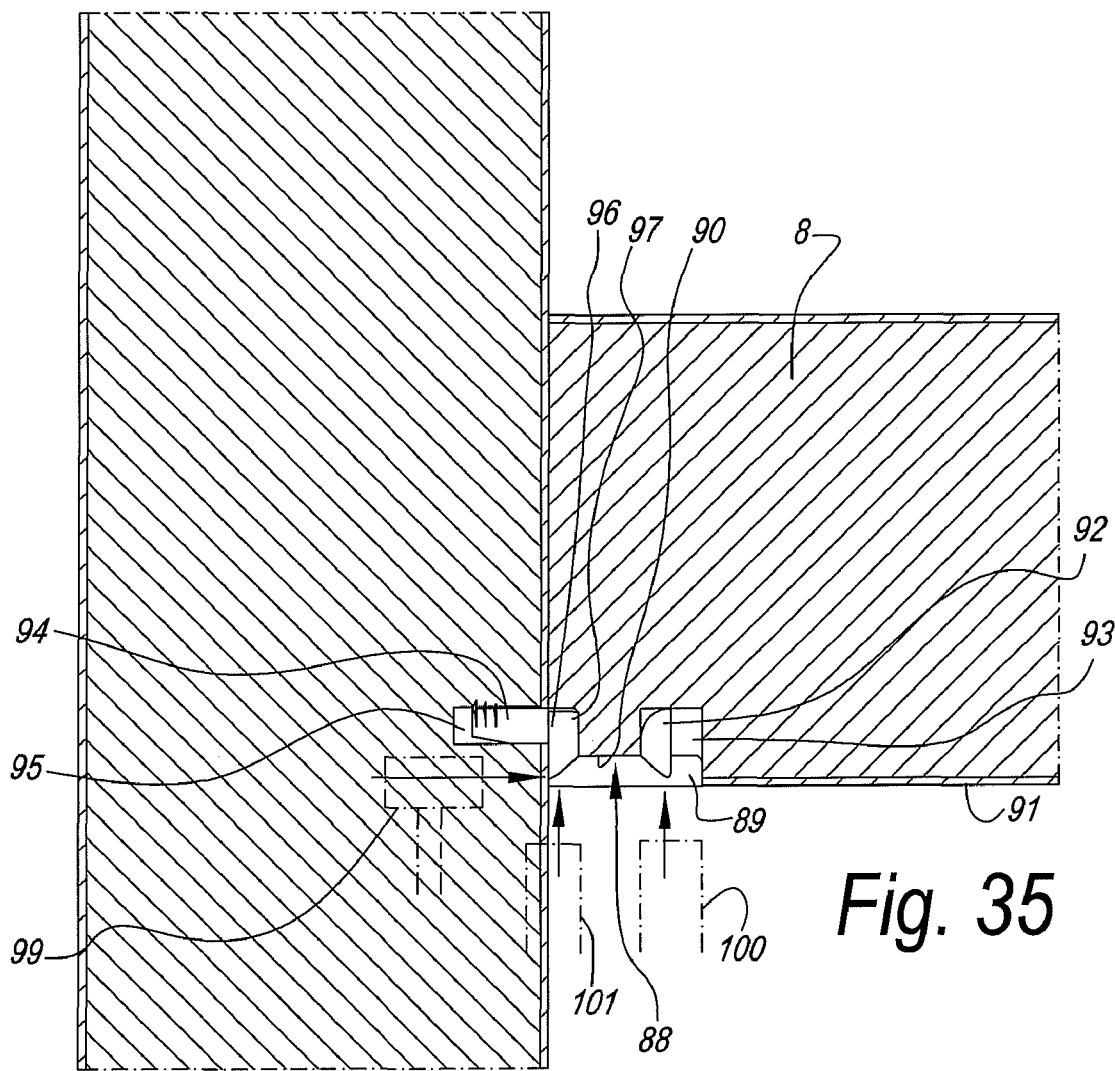

According to a first preferred embodiment, herein it is striven for that the provisions which have to be realized on the shelf consist exclusively of a milled-in part or the like and further one or more bore holes. A practical example thereof is represented in FIGS. 34 and 35, in which FIG. 34 represents the shelf support 88 as such in perspective and FIG. 35 represents a cross-section in mounted condition. As aforementioned, the shelf support 88 comprises a body 89 which fits into a recess 90 and is countersunk in respect to the bottom side 91 of the shelf 8. On this body 89, an upward-directed protrusion 92 is present, which fits into a bore hole 93. Further, the shelf support 88 comprises an attachment part 94 with which it fits into a lateral bore hole 95 in a side wall. This attachment part 94 is indirectly in connection with the body 89 via an upward portion 96 fitting into an opening formed by half a bore hole 97. Further, the attachment part 94 can be provided with clamping ribs 98.

As schematically indicated in FIG. 35, the recess 90 can be formed by means of a laterally moving finger cutter 99, whereas the bore holes 93 and 97 can be realized simply by means of drills 100-101.

Figure 36:
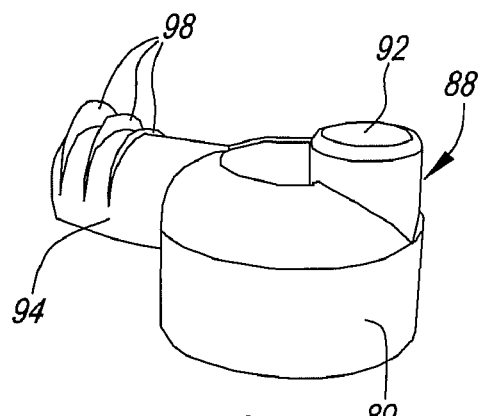
Figure 37:
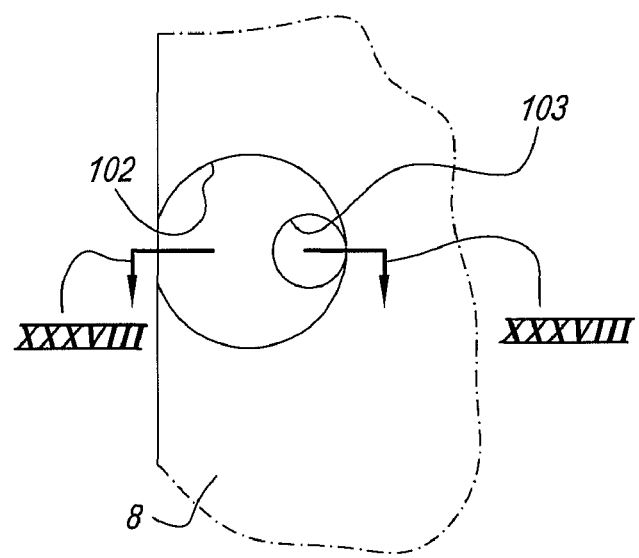
Figure 38:
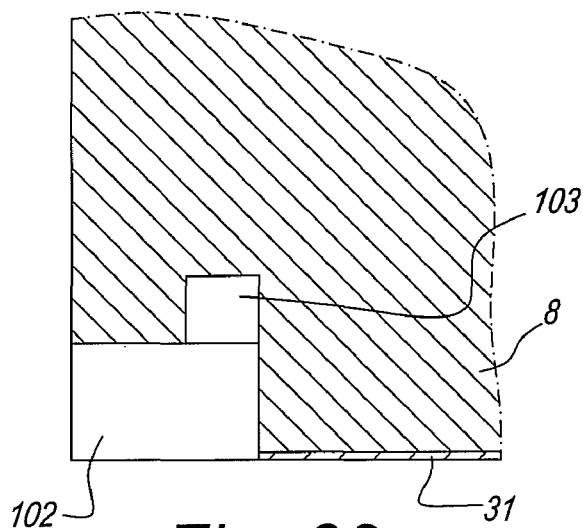
Figure 39:
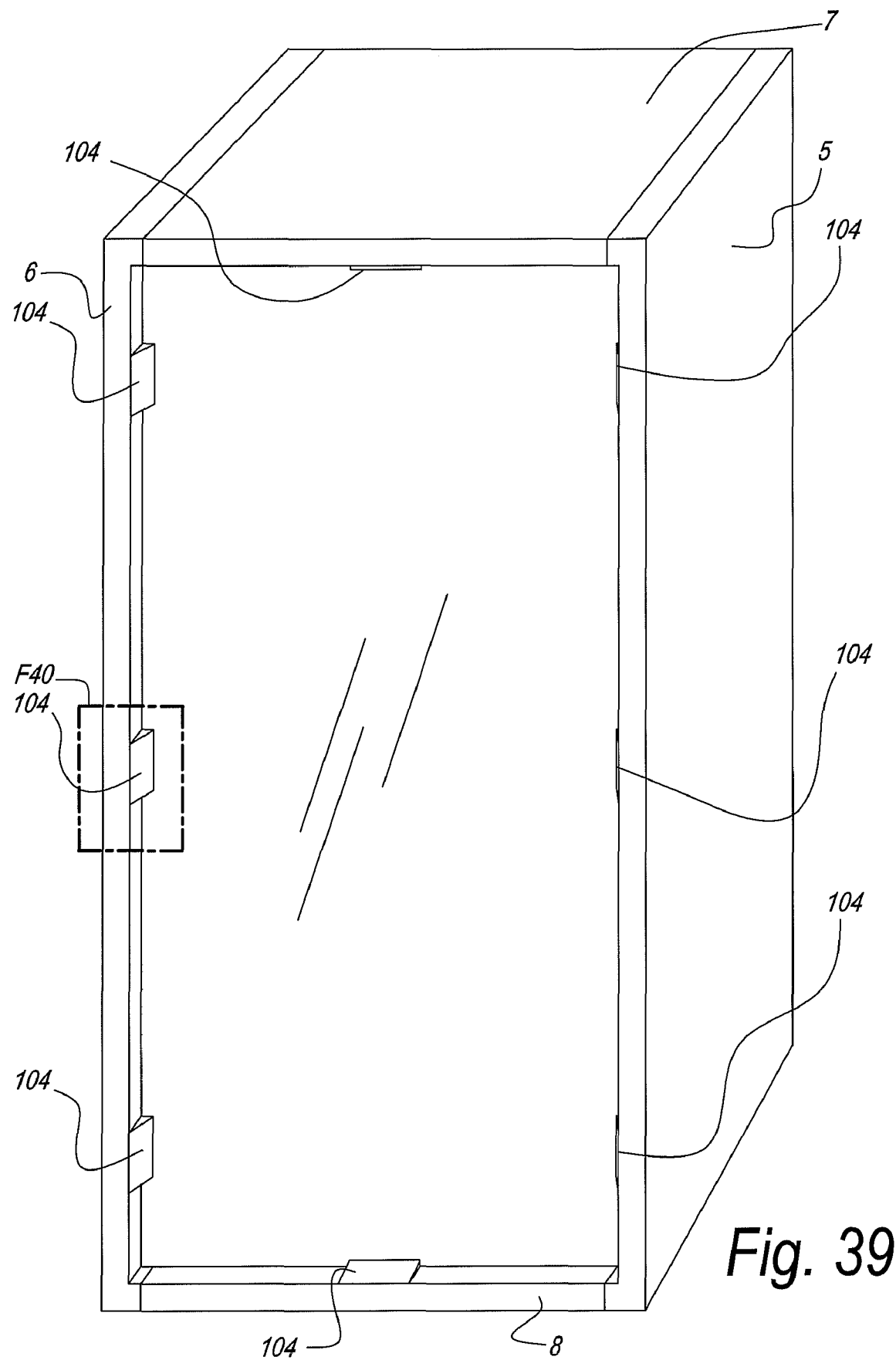

According to a second, more preferred embodiment, all provisions to be applied at the shelf are realized exclusively by means of bore holes, wherein a first bore hole then offers a seat for the actual body of the shelf support, whereas the second bore hole offers room for an upwardly directed protrusion. A practical example thereof is represented in FIGS. 36 to 38. FIG. 36 represents the shelf support 88, FIG. 37 represents the bottom side of the shelf 8, and FIG. 38 represents a cross-section thereof. As represented, two bore holes 102-103 of different diameter are provided in the bottom side of the shelf 8. The shelf support 88 comprises a body 89 which fits into the largest bore hole 102, and an upwardly directed protrusion 92, which, in the mounted condition, is intended for engaging in the smaller bore hole 103. Further, a laterally directed attachment part 94 is provided on the body 89.

Figure 40:
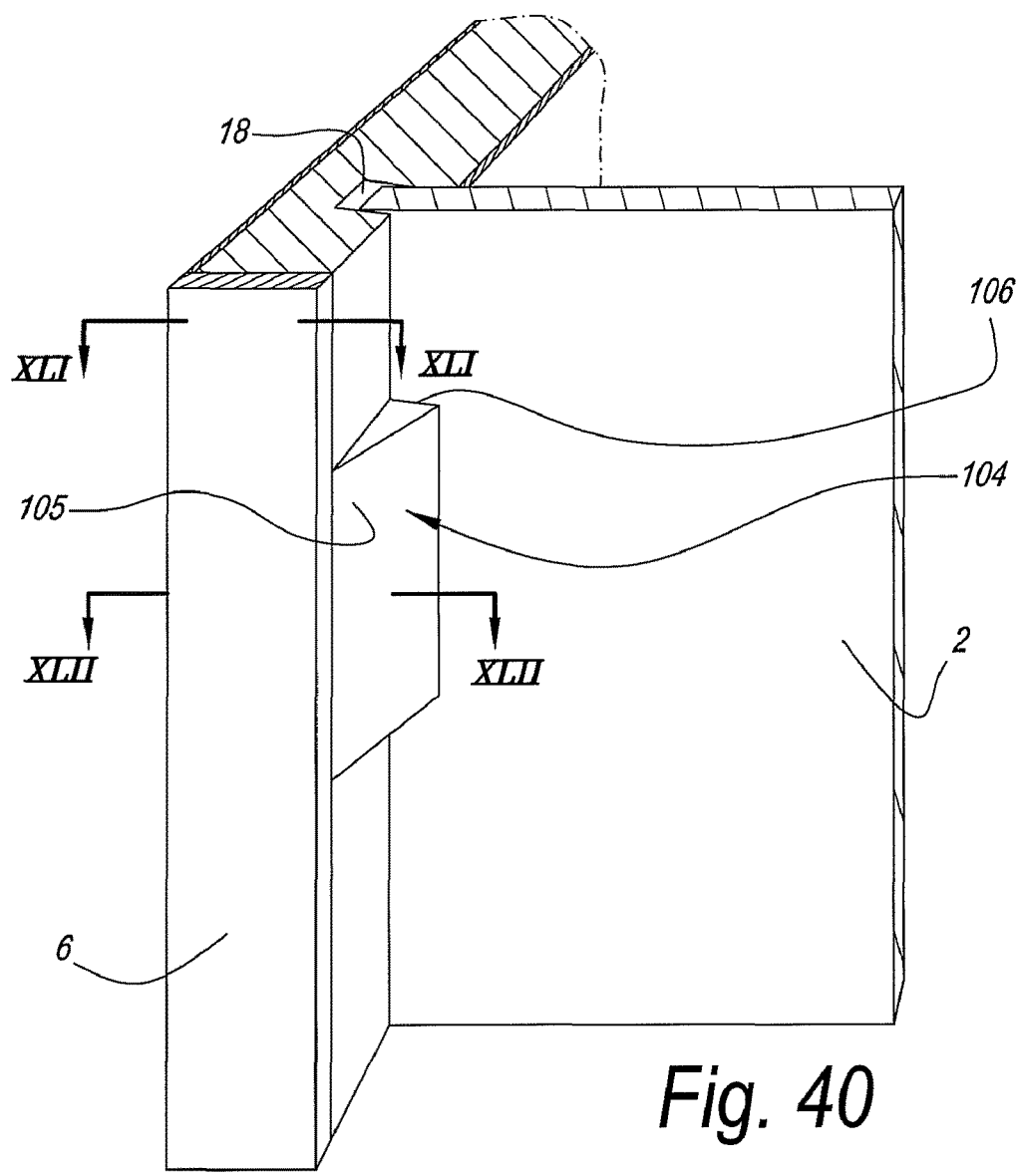
Figure 41:
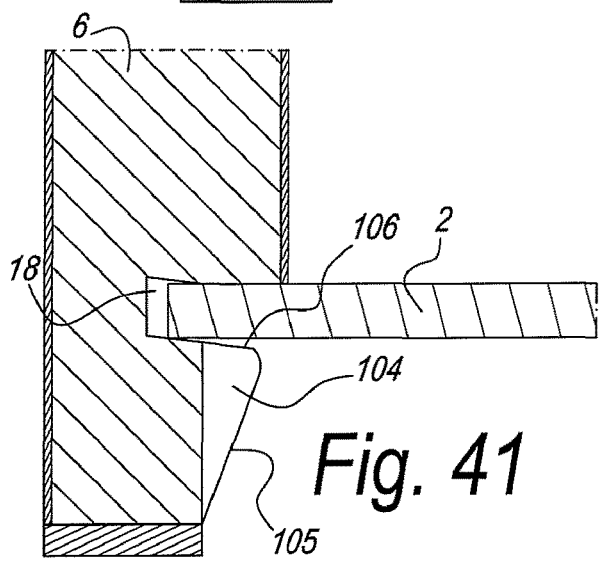
Figure 42:
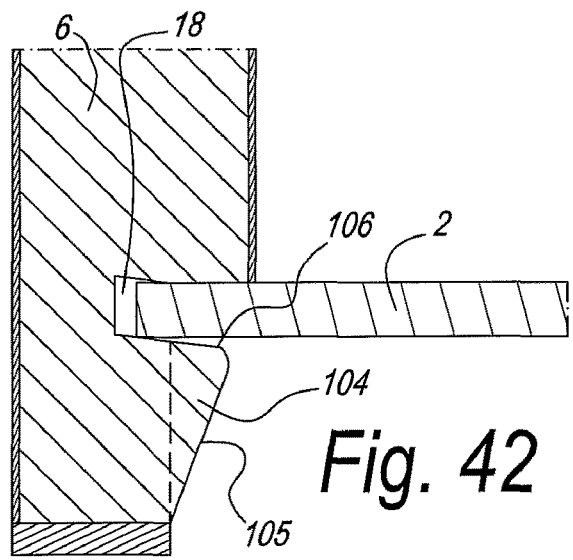
Figure 43:
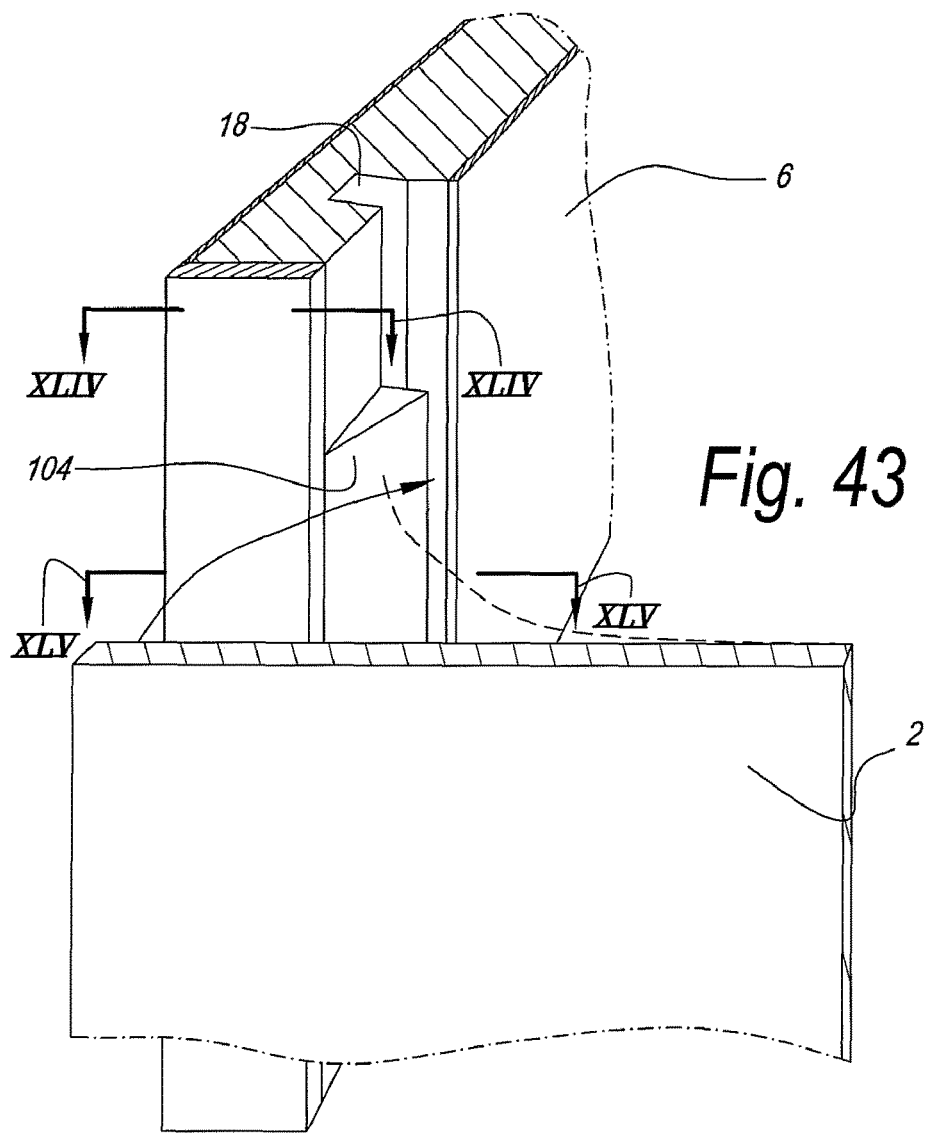
Figure 44:
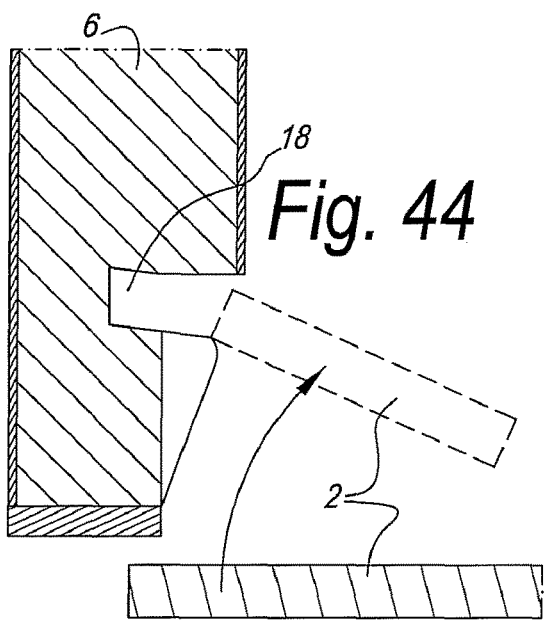
Figure 45:
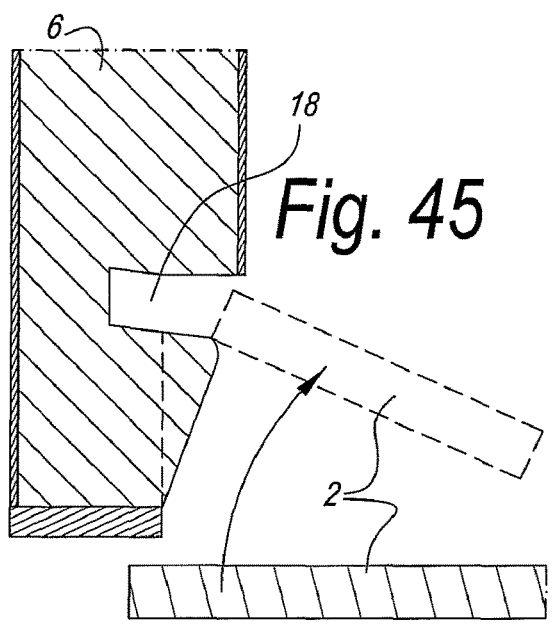

FIGS. 39 to 45 represent an example of the fifth aspect of the invention. The particularity herein consists in that the composed element 1 is provided with attachment parts 104, which are made in one piece with one or more of the constructional parts and behind which the rear wall 2, usually with a certain deformation, for example, bending, can be pressed down. As represented, these attachment parts 104 preferably consist of cam-shaped portions which border the seat for the rear wall and which preferably have a somewhat inclined guiding side 105 and a steeper locking side 106. As represented, the use of these cam-shaped portions further can be combined with a seat 17-18-19-20 in the form of a groove. FIGS. 40 to 42, at a larger scale, represent views in the mounted condition. FIGS. 43 to 45 schematically illustrate the manner in which the assembly of the rear wall 2 is performed, to with simply by pressing the rear wall over the cam-shaped portions.

As can be seen in the magnified views of FIGS. 41 and 42, for the seats possibly use can be made of grooves having a particular design, such that the rear wall part, as it is getting situated deeper in the groove, becomes less free and even will become clamped. In this case, this is achieved in that the respective groove, in cross-section, is inclined in respect to the plane of the rear wall.

Figure 46:
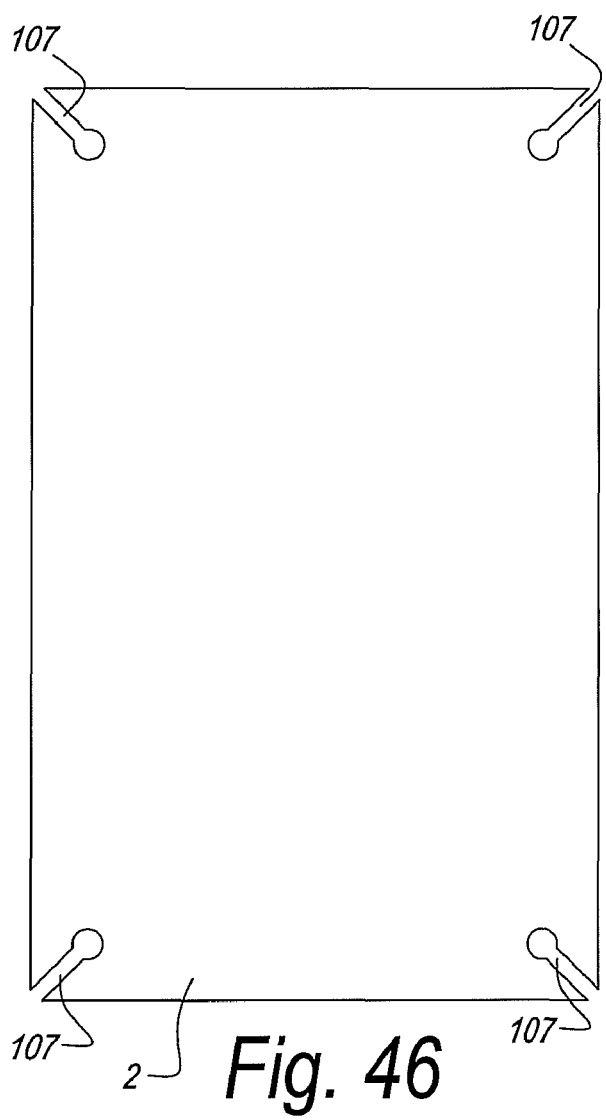
FIG. 46 represents a particular embodiment of a rear wall part.

It is noted that the use of such attachment parts can be applied on one, two opposite, three or all four sides of a piece of furniture as well. If it is applied on all four sides, then possibly particular provisions can be made in order to obtain that the rear wall, or the component rear wall parts thereof, can deform in a smooth manner and can be pushed on all edges to behind the cam-shaped portions. This is possible, for example, by providing the rear wall part, next to the corner points, with cut-out portions 107, as depicted in FIG. 46.

Figure 47:
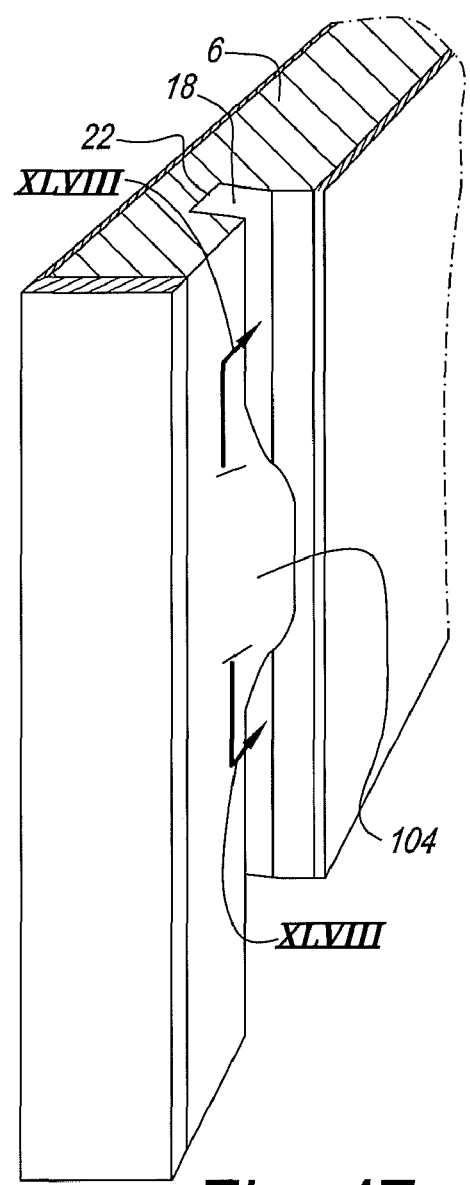
FIG. 47 represents a variant of the embodiment of FIG. 40.
Figure 48:
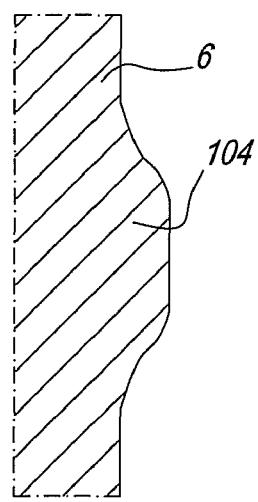
FIG. 48, at a larger scale, represents a section according to line XLVIII-XLVIII in FIG. 48.

FIGS. 47 and 48 represent a variant of such attachment part 104, in the form of a cam-shaped part, the surface of which gradually merges into the surrounding material. This portion can be formed in a simple manner by subjecting the milling cutter, by which the edge zone is formed, to a tilting movement.

Figure 49:
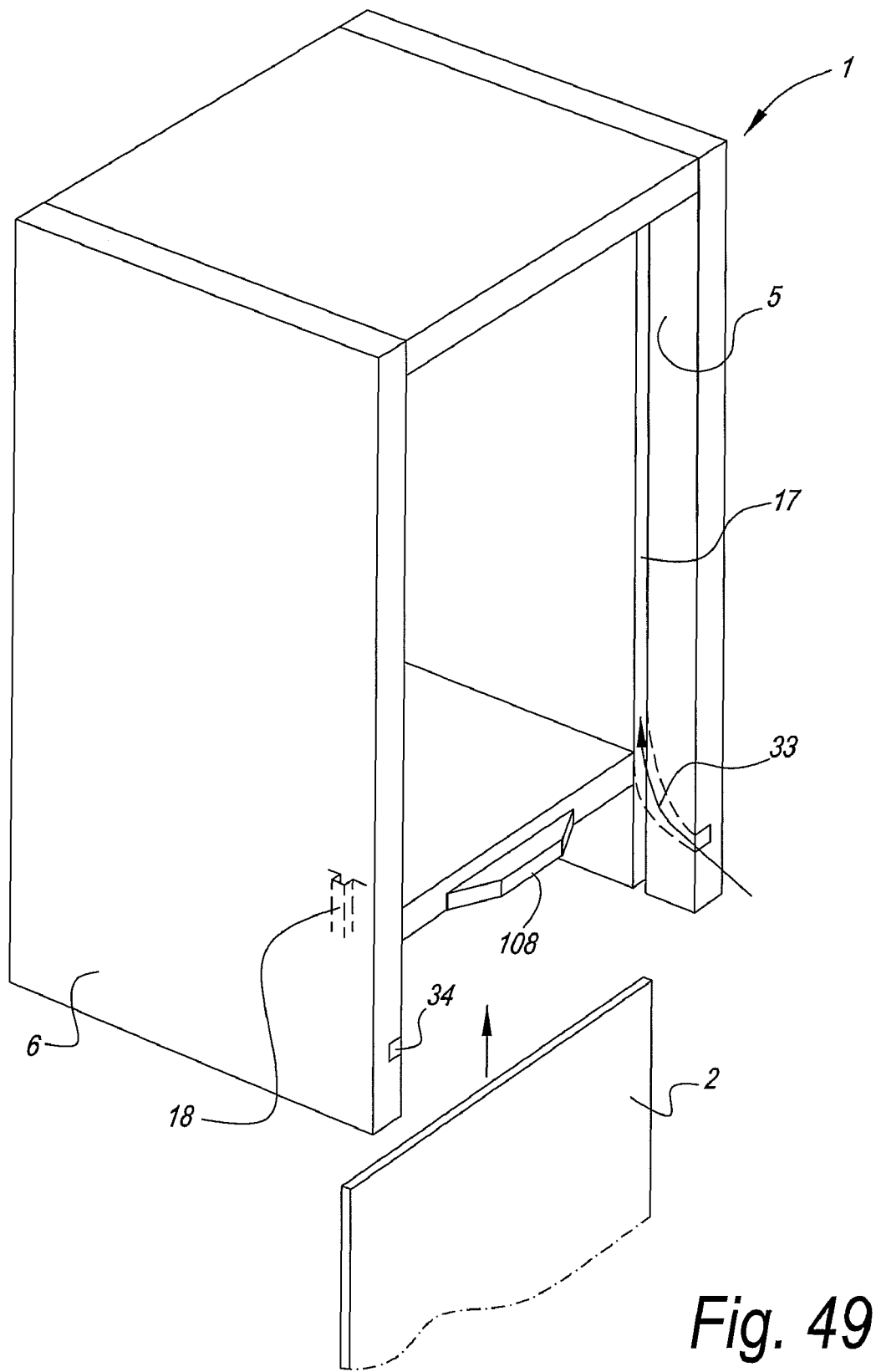
FIG. 49 represents another composed element according to the invention.

FIG. 49 schematically represents another composed element 1 according to the invention, which has the characteristic that the rear wall can also be provided at its place after assembly of the other parts. The particularity herein consists in that the rear wall 2, or certain rear wall parts thereof, can be slid into seats 17-18 starting from the outer side of the piece of furniture, wherein blocking means are provided which in fact allow to provide the rear wall, but which prevent that the rear wall can slide out of the seats by itself. These blocking means preferably consist of one or more stops, in the example one stop 108, along which the rear wall cannot move without any deformation. Such stops preferably are realized at the piece of furniture in one piece.

In FIG. 49, in dashed line another alternative is depicted, with passages 33-34 giving out towards the rear, along which the rear edge also can be brought into the seats 17-18, by means of a forced bending. Once the rear wall is provided in the seats 17-18 via the passages 33-34, it remains upright by itself and is maintained in its place by the stop 108. It is clear that the composed element 1 from FIG. 49 in such case also represents an example of the first aspect.

It is clear that all above-described rear wall constructions according to the invention primarily are intended for being applied with composed elements with constructional parts which can be locked together at least at the corners by means of profiles. It is precisely with such embodiments that one strives for working with a minimum of small loose accessories or even without these accessories, which is precisely fulfilled by the embodiments described herein above. In other words, the invention shows its advantages best with so-called "click furniture". Thus, the herein above-described examples, when applied with such "click furniture", automatically form examples of the sixth aspect of the invention.

However, the above does not exclude that such rear wall constructions are applied in other furniture, too. The herein above-described rear wall constructions as such will remain offering advantages even then.

Figure 50:
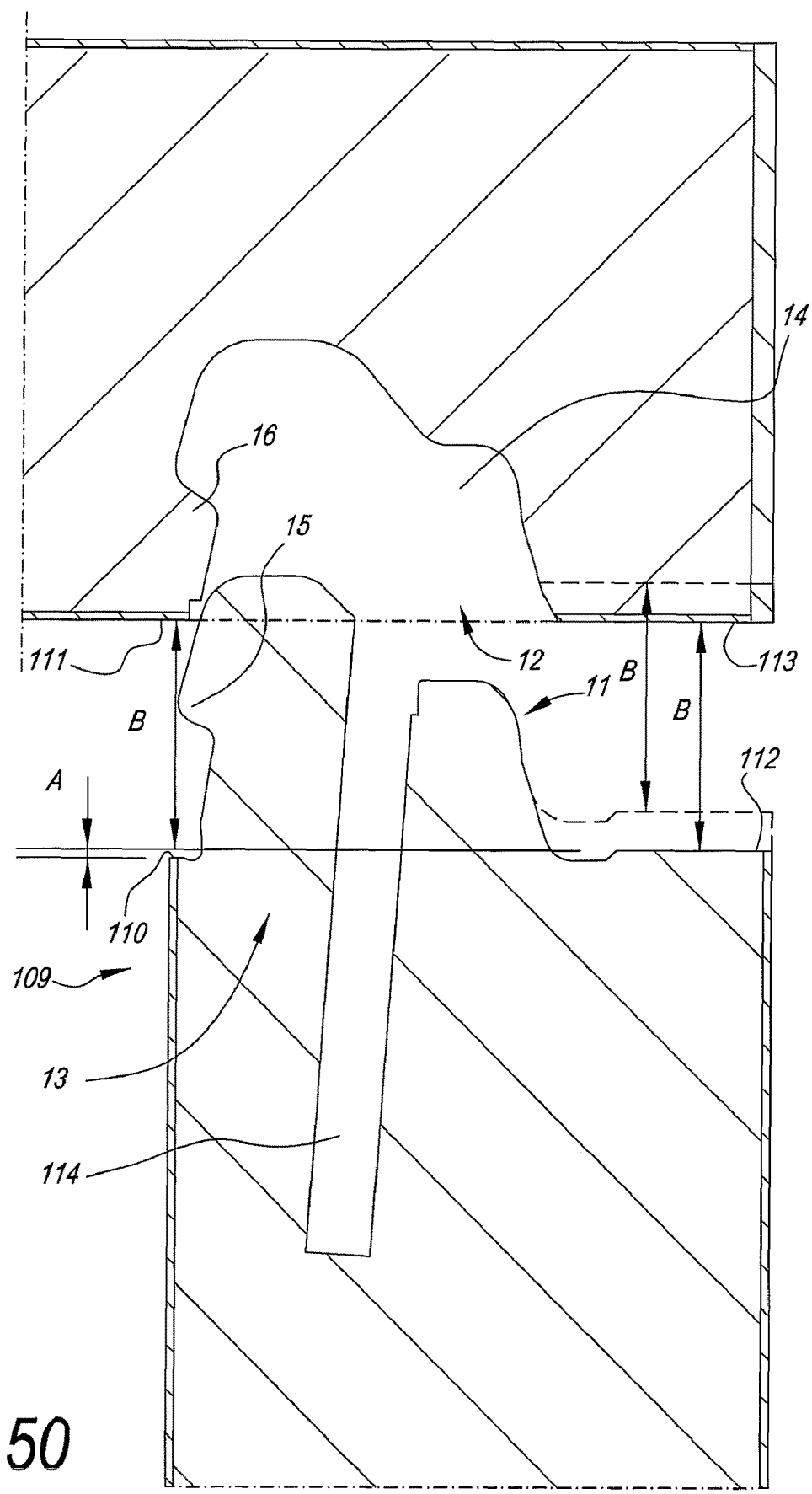
FIGS. 50 and 51 represent a particular form of a coupling according to the invention, in a not coupled and a coupled condition, respectively.
Figure 51:
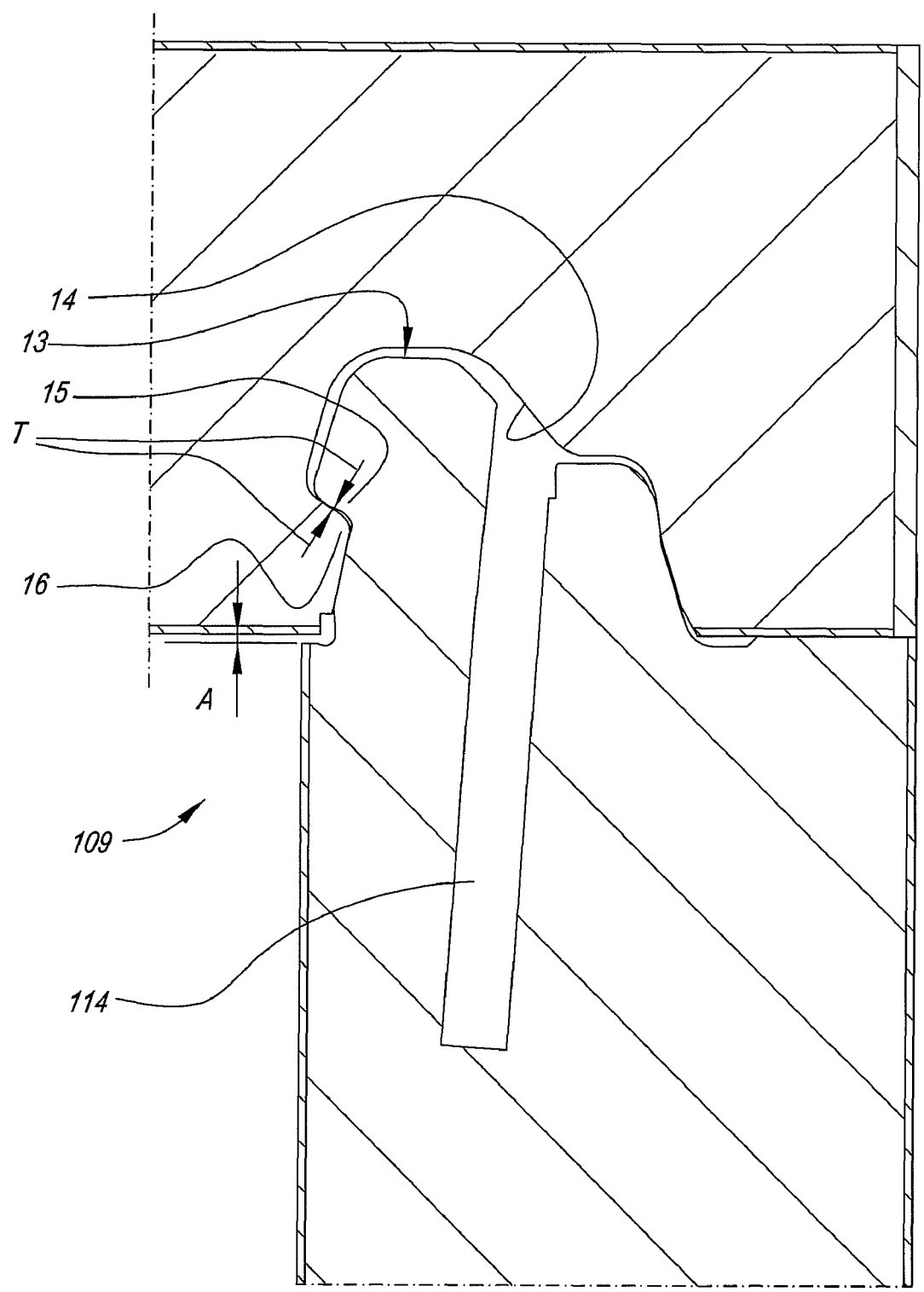

Finally, in FIGS. 50 and 51 a practical embodiment of the seventh aspect is represented. This seventh aspect provides for a corner connection 109, which, in the mounted condition, provides additional rigidity to the whole. The particularity herein consists in that a tongue and groove coupling with locking parts 15-16 is applied, wherein said locking parts are situated substantially on one side of the tongue only, wherein portions positioned opposite to each other are present on both sides of the tongue, namely first portions 110-111 on the side where the locking parts are situated, and second portions 112-113 on the other side, with the characteristic that, when the second portions 112-113 theoretically are positioned against each other, there is a small distance A between the first portions 110-111. In FIG. 50, this means that, when the coupling parts theoretically are positioned opposite each other at a distance from each other, there is a distance B between the portions 112-113, whereas then there is a distance B+A between the portions 110-111. Herein, the intended distance A is less than 1 mm and preferably more than 0.1 mm. Practically, it will be 0.2 to 0.6 mm, and the best results are obtained with nominal values of 0.3 to 0.5 mm, with 0.4 mm as a best value.

Preferably, all this is combined with the use of a so-called pretension, obtained by a small theoretical overlapping of the profile shapes, which provides for creating a tension T. By maintaining said distance A in the theoretical form, unexpectedly it was found that a particularly rigid corner connection can be achieved, in particular when this principle is applied at two successive corner connections of the composed element, wherein the distances A at these successive corners do not necessarily have to be equal to each other.

It is noted that the plane of the portion 113 does not necessarily have to be situated in the extension of the plane of the portion 111. As represented as a variant in dashed line in FIG. 50, this may also be situated displaced, wherein thus also the portion 112 must be displaced over the same distance, such that the same distance B remains applied.

Further, this has proven particularly useful with coupling parts 11-12 wherein use is made of a split tongue, thus, with the represented gap 114.

When this aspect then is combined even further with the third aspect of the invention, a wobbling of the piece of furniture is counteracted on two fronts, which results in that finally a very rigid and stable piece of furniture is obtained.

It is noted that according to the invention, by a "composed element" an element has to be understood in "composed" as well as in "still to be composed" condition. Thus, this, for example, also means that a not yet assembled and still packaged flat-pack piece of furniture, which, in the mounted condition, shows one or more of the characteristics of the invention, has to be considered a "composed element" already.

The present invention is in no way limited to the embodiments described by way of example and represented in the figures, on the contrary, such composed elements, and more particularly the parts thereof which are used for realizing the aforementioned aspects, in particular the herein above-described rear wall constructions, may be realized according to various variants without leaving the scope of the invention.

It is clear that the invention in general also relates to rear wall constructions as described herein above, more particularly to the attachment of the rear wall parts, irrespective whether this is intended for flat-pack furniture or not.

Figure 52:
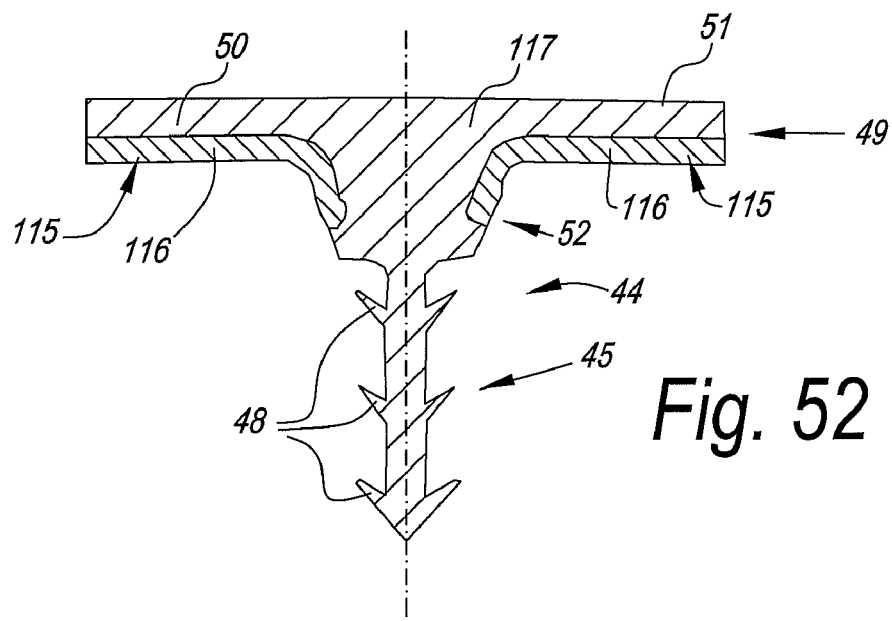
Figure 53:
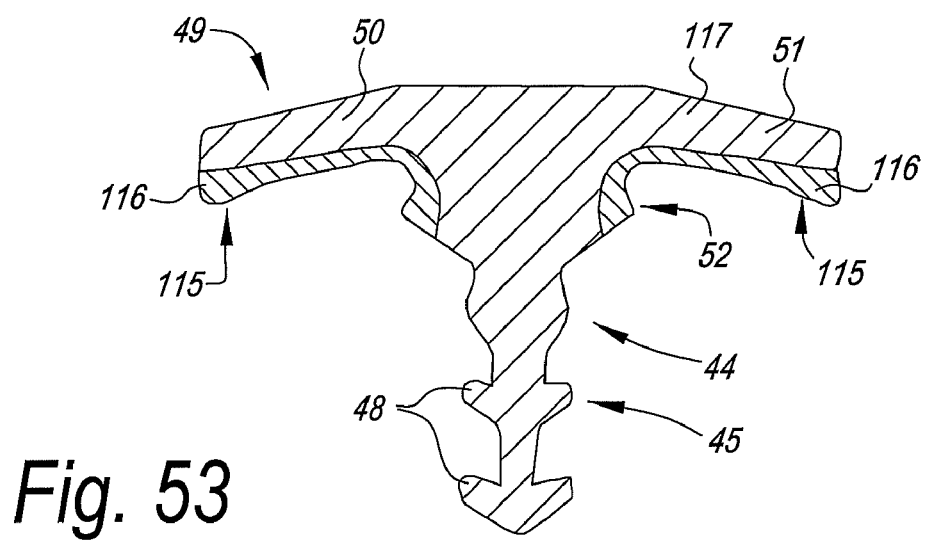
Figure 54:
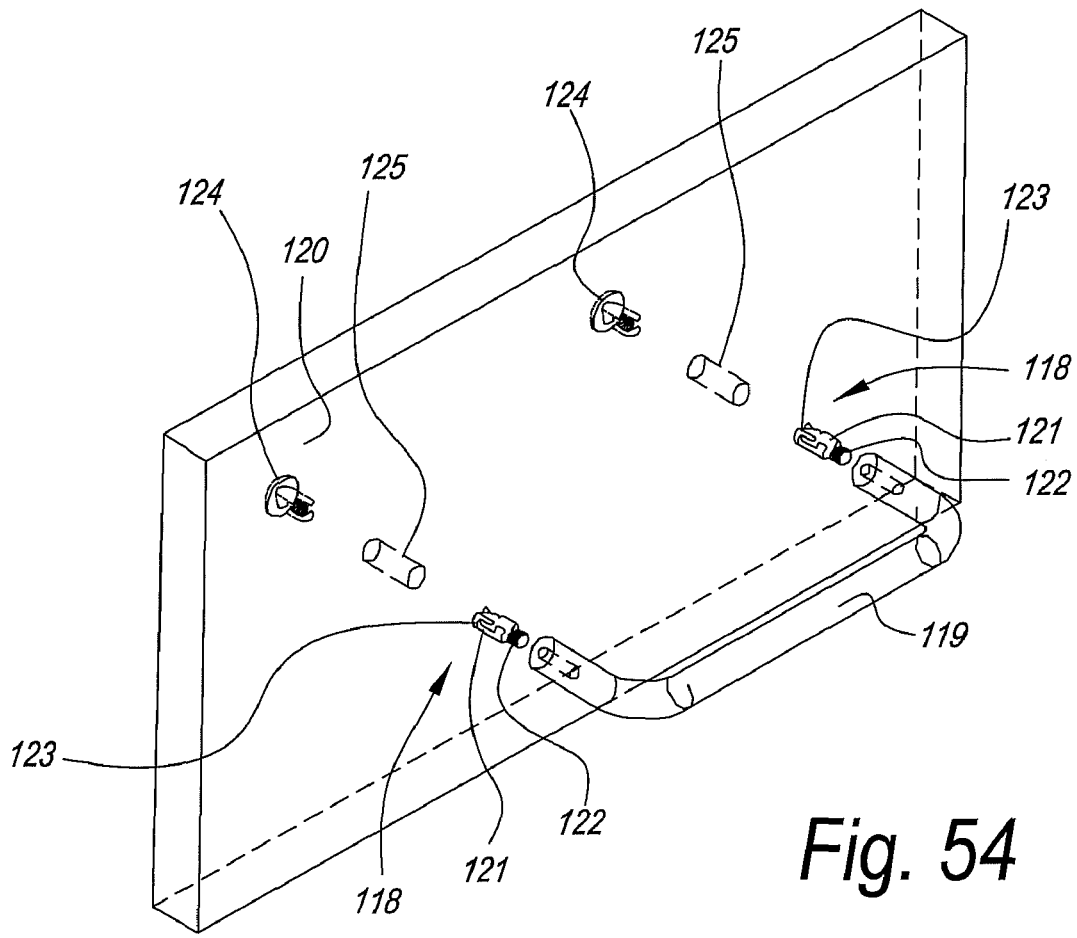
Figure 55:
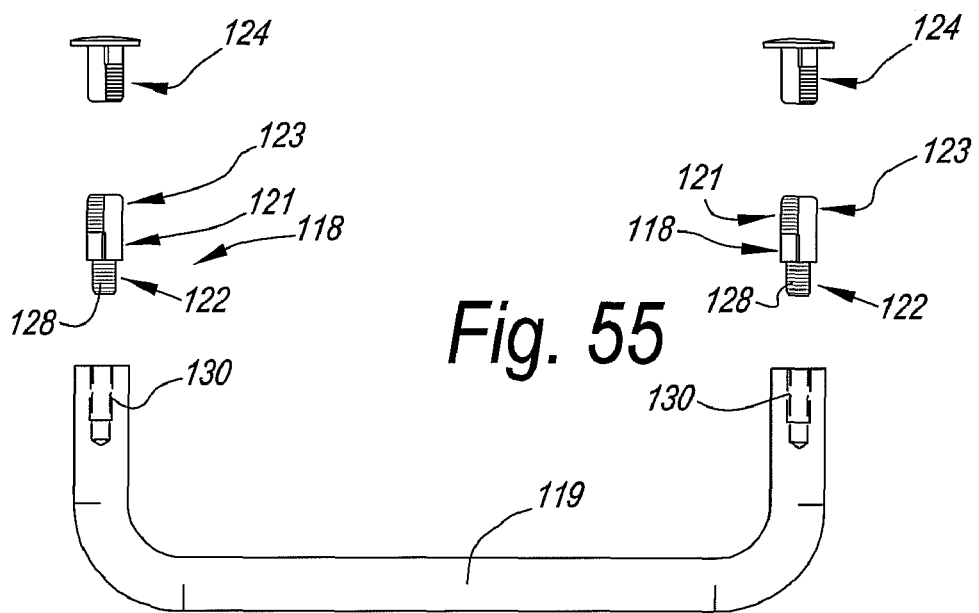
Figure 56:
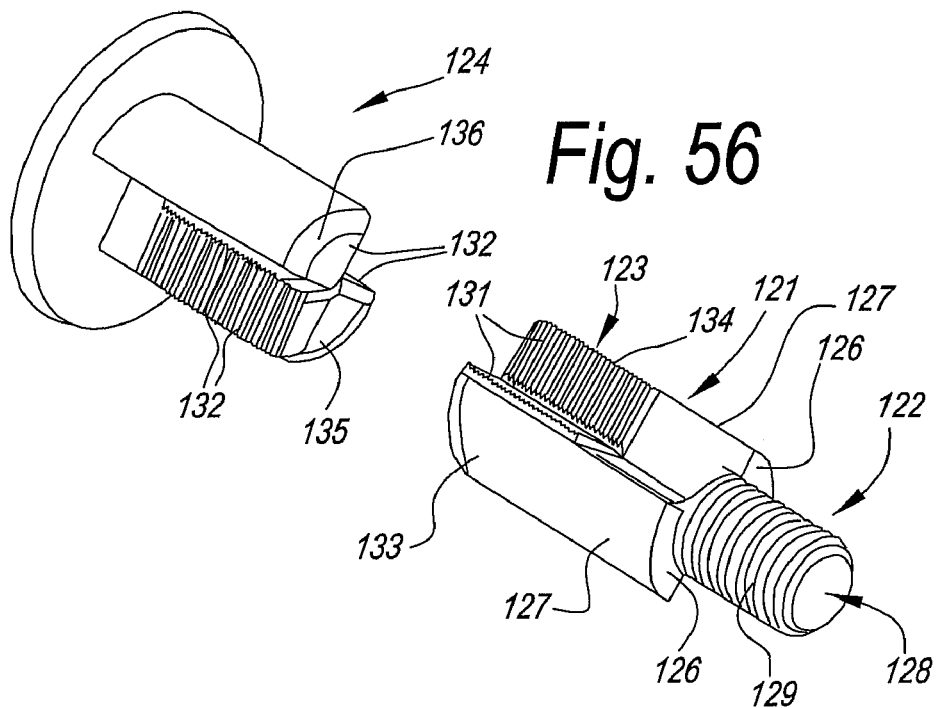
Figure 57:
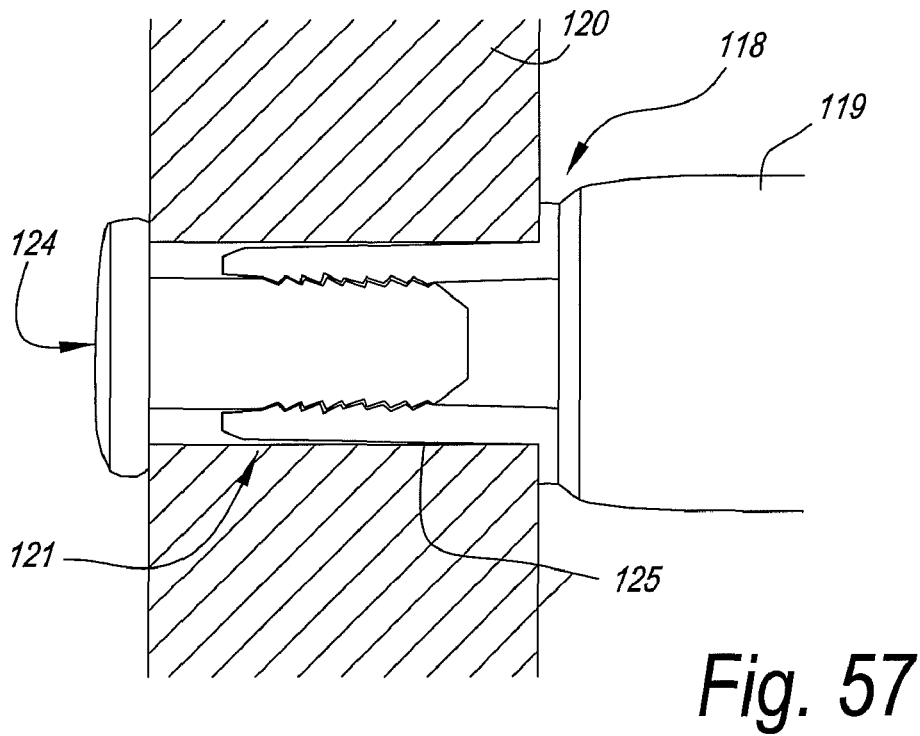

In FIGS. 52 and 53, two other variants are represented of attachment pieces 44 which can be applied in a similar manner as in FIG. 9. These attachment pieces 44 substantially consist of an attachment part 45 and a stop-forming part 49. Moreover, they preferably also comprise support portions 52, which are intended for cooperating with the rear wall parts 9-10. The attachment parts 45 preferably are provided with barbs, clamping ribs or the like, indicated by reference 48.

A particular independent characteristic of the embodiments from FIGS. 52 and 53 consists in that the attachment piece 44 is provided with one or more anti-slip parts 115, which provide for that an increased friction is present between the clamped attachment piece and the rear wall parts 9 and/or 10. These anti-slip parts thus preferably are situated at the bottom sides of the wings 50 and 51, and possibly also at the support portions 52.

In a preferred embodiment, the anti-slip parts 115 to this aim are formed of a material 116 which is softer than the material 117 of which the actual body of the attachment piece 44 is formed. Preferably, for the materials 116 and 117 synthetic materials, preferably rubbers, are applied, having a different hardness. Herein, it is preferred that the material 116 has a shore hardness of less than 50 and still better of less than 30, for example in the order of magnitude of 25, whereas the material 117 has a shore hardness of more than 50, for example, 75, however, preferably less than 100. Thereby, the strip-shaped attachment piece 44 will remain somewhat supple in its totality, such that it can be pressed on systematically in its place by an unwinding movement. This also offers the advantage that, if desired, the attachment piece 44 can be relatively long and may even extend over the entire or almost entire length of the adjoining rear wall part.

According to a variant, for the anti-slip parts also adhesive means, for example, adhesive strips, can be applied, whether or not in combination with a more supple material 116.

Another independent characteristic, which either can or cannot be combined with the aforementioned characteristics, consists in that the attachment piece consists of two or more co-extruded materials, in this case 115 and 116, which impart various features to the attachment piece. In this manner, the material choice can be optimized in function of the features which are to be imparted to the attachment piece at certain locations.

As represented in FIG. 53, the wings 50 and 51 can be directed somewhat downward, such that, after being pressed on, they exert a lasting elastic force.

According to still another independent aspect, the invention relates to an attachment system 118 for attaching component parts to each other, in particular for providing furniture accessories on furniture parts, and such in a simple manner, preferably without necessitating tools. More particularly, this relates to an attachment system which is particularly suitable for attaching handles and the like onto furniture parts. By way of example, in FIGS. 54 to 57 a handle 119 is represented which is fixed on a drawer front 120 by means of such attachment systems 118.

According to the invention, such attachment system 118 substantially is characterized in that it consists of a body 121, which might also be characterized as a holder or a connection piece, which on one extremity is provided with a first connection part 122 intended for cooperating with an accessory, in the example thus the handle 119, and on a second extremity is provided with a second connection part 123 which can cooperate with an attachment element 124. According to a preferred embodiment, the attachment system 118 shows one or more of the following characteristics, which can be applied in any combination with the aforementioned basic characteristic:

- The body 121 comprises a design by which it fits into a bore hole 125, preferably in that it comprises parts 126 defining a cylindrical outer surface 127;
- The first connection part 122 consists of internal or external screw thread, and preferably, as represented, of a protruding screw thread portion 128 with external screw thread 129, which can be screwed into a bore hole 130 in the accessory;
- The second connection part 123 consists of a clamping or snapping portion on which or in which the attachment element 124 can be pressed down;
- The attachment element 124 is made as a press-on plug or a screw plug which can cooperate with the second connection part 123 and thus simply can be pressed down thereon or therein;
- The second connection part 123 and the attachment element 124 cooperate via toothed parts or barbs 131-132, which latter preferably are situated on segments 133-134 and 135-136 provided diagonally opposite each other.

In the represented example, all these characteristics are combined.

The functioning of the attachment system 118 can simply be deduced from the figures. The body 121 is provided with the first connection part 122 on the accessory, in this case by screwing it down with the screw thread part 128 into the bore hole 130. Then, the accessory is provided with the body 121 in the bore hole 125, after which, from the other side, the attachment element 124 is provided on the second connection part 123, in this case by pressing down the respective attachment part 124 with the segments 135-136 between the segments 133-134.

It is noted that the toothed parts 131-132 possibly can be made as screw thread, such that the attachment element 124 can be pressed down in a simple manner, however, still can be unscrewed by means of a screw movement. The toothed parts then cannot be provided on such segments and then have to be present on concentric parts instead.

The component parts, in particular the body 121 and the attachment element 124, can consist of any material, however, preferably are formed of synthetic material, for example, PVC.

Figure 58:
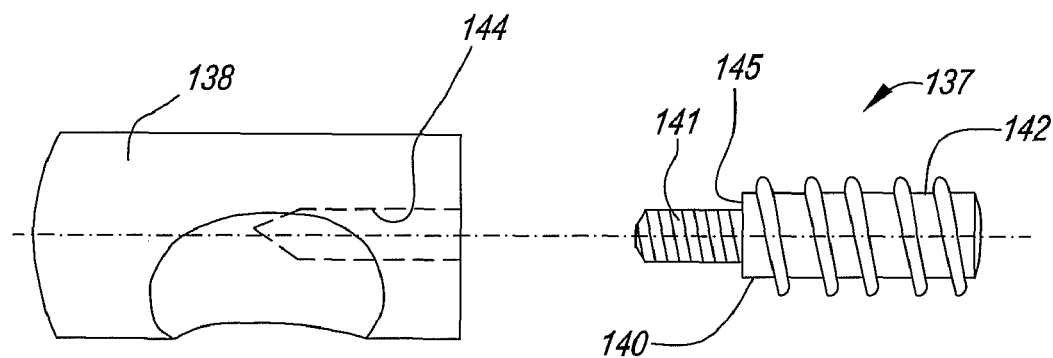
Figure 59:
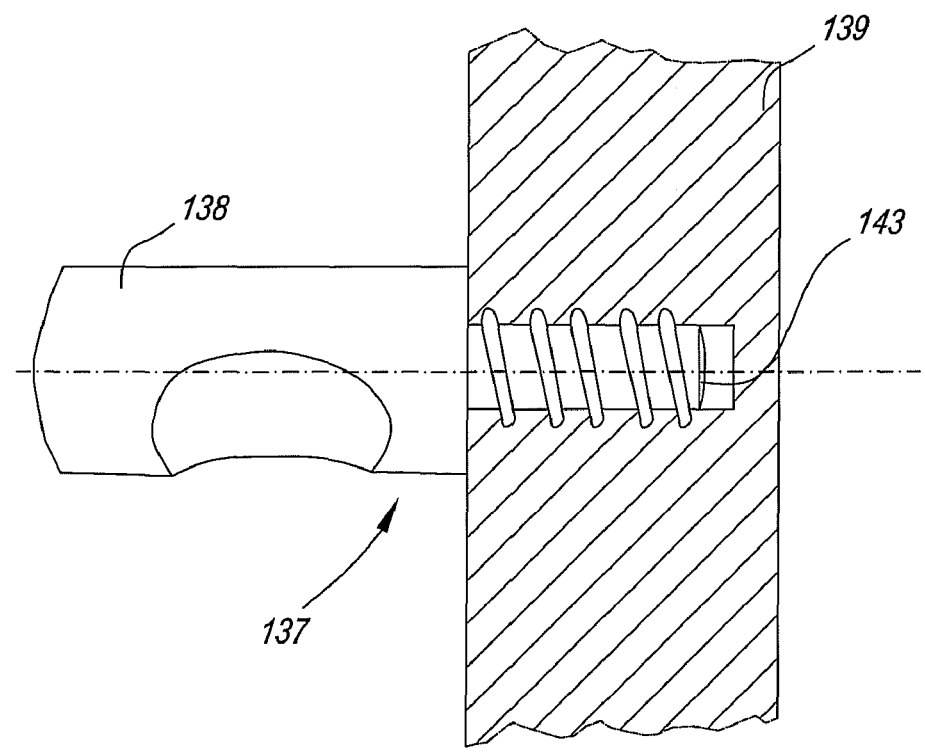

FIGS. 58 and 59 illustrate still another attachment system 137 according to the invention for providing an accessory, such as in this case a small handle or pulling handle, on a furniture part 139.

The attachment system 137 is characterized in that it substantially consists of a connection piece 140 with two screw thread portions 141 and 142, whereby the first screw thread portion 141 is suited for being attached to an accessory 138, and the second screw thread portion 142 is made as a screw and thus can be screwed down in the furniture part 139 in a self-tapping manner, possibly in a bore hole 143 provided therein.

Preferably the first screw thread portion 141 is made with metric thread. This screw thread portion 141 preferably is realized as a portion with external screw thread which can cooperate with internal screw thread 144.

The second screw thread portion 142 preferably is provided with so-called wood thread, thus, screw thread for screwing into wood, as also applied in so-called Euro screws.

Further, the whole is designed such that the accessory can be screwed onto the connection piece only up to a certain length, which can be obtained, for example, by means of the represented stop-forming edge 145.

The functioning can simply be deduced from the figures. The accessory 138 is screwed down on the screw thread portion 141, after which the whole is screwed into the bore hole 143.

The connection piece 140 preferably consists of steel; however, other materials are not excluded.

FIGS. 60 to 63 represent another variant of a shelf support 88. This latter comprises a body 89, which can cooperate with a bore hole in the lower side of a shelf, and further a collar or flange 146, which is intended for being situated against the lower side of the shelf. The body 89 substantially is round, however, in fact preferably shows a flattened part 147, which is intended for coinciding with the side of the shelf. The attachment part 94 comprises clamping ribs 98.

An important independent major characteristic which is present in the represented shelf supports is that the attachment parts 94 as well as the tab-shaped bodies 89 in mounted condition are situated between the planes determined by the upper side and the lower side of the shelf, such with the possible exception of a collar or flange 146 or the like.

FIGS. 64 to 67 represent an embodiment with a body 89 which is made slimmer than in FIGS. 60 to 63.

Figure 68:
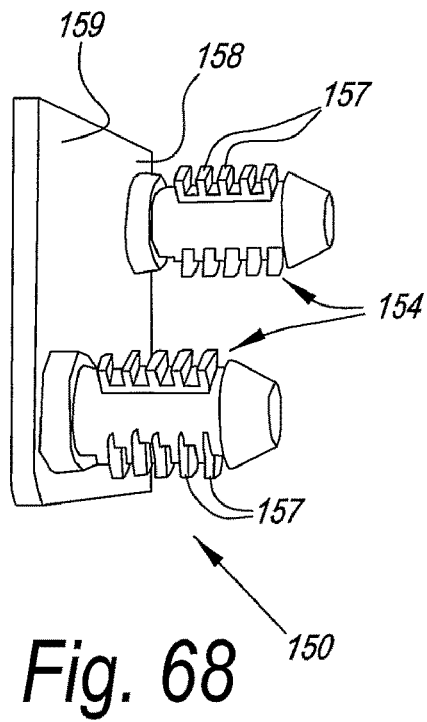
Figure 70:
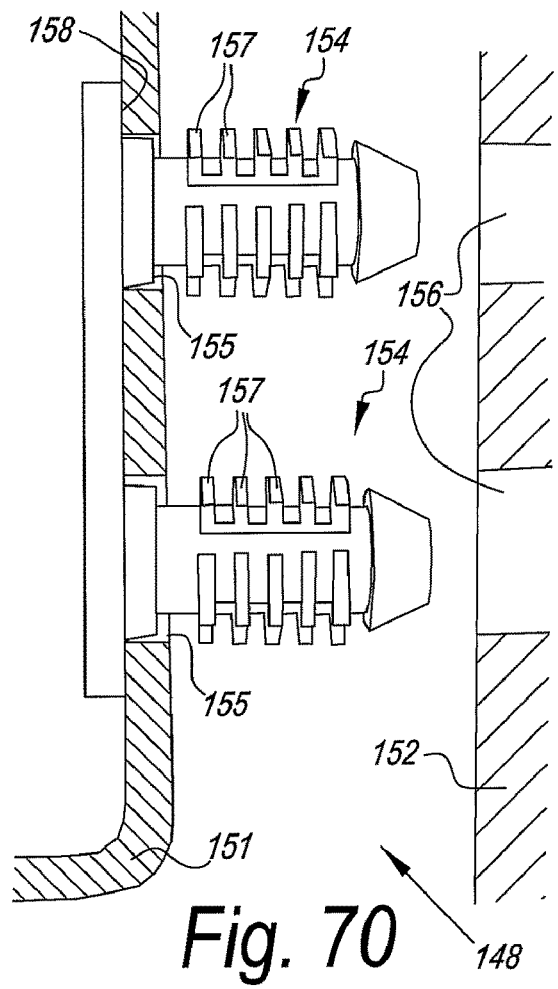
Figure 69:
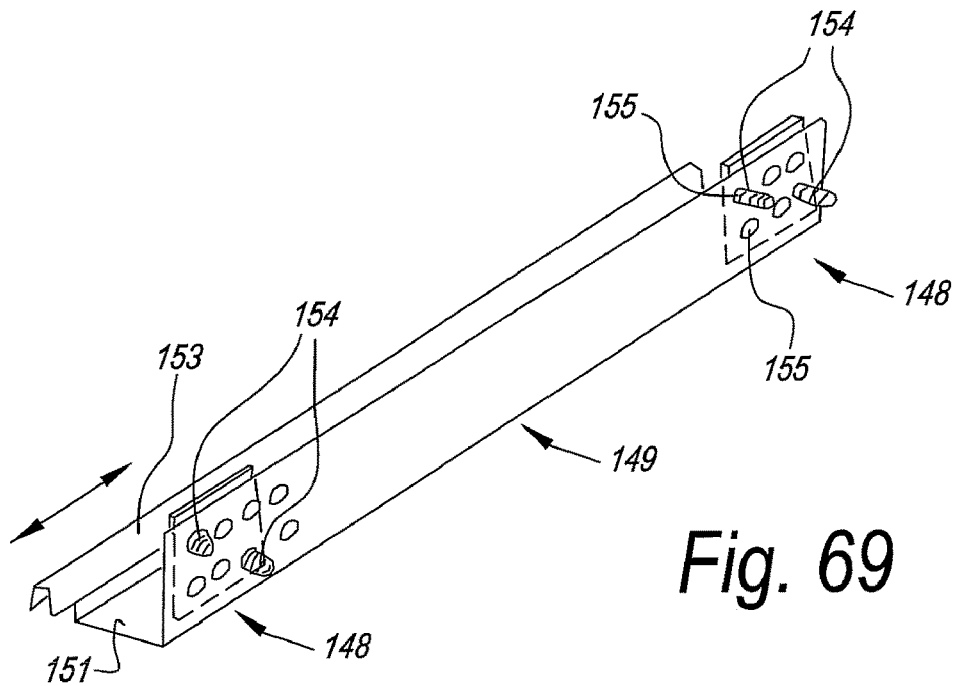

FIGS. 68 to 70 represent an attachment system 148 for a slide 149 for a drawer, as well as an attachment element 150 applied therewith, which allows smooth assembly.

The slide 149 consists of at least two parts, namely at least one fixed part 151, which is intended for being attached to a cupboard wall 152 or the like, and at least one movable part 153 to which the drawer will be attached.

The attachment system 148 is particular in that it shows one or more of the following features, which in the represented example all are combined, however, also may be present as such or in any reduced combination:

The attachment system 148 makes use of one or more clamping plugs 154 which fit through openings 155 in the fixed part 151 and which can be pressed down in bore holes 156;

The one or more aforementioned clamping plugs 154 can be pre-mounted in the openings 155 and comprise retention means by which they are retained in the openings, which in the example is obtained in that the clamping ribs 157 on the one hand and a portion 158 on the other hand are acting in both directions as stops around the openings 155;

The attachment element 150 comprises at least two clamping plugs 154 which are connected by a common basis 159, which has the advantage that such element 150 can be mounted in only one position or only a limited number of positions in the openings 155 which mostly are present on the fixed part in multiple numbers, thereby reducing the risk of a faulty assembly; another advantage is that the clamping plugs 154 will wiggle less as they hang on the same basis and thus will have less tendency to come loose by themselves;

The attachment system makes use of a common basis 159 with two or more clamping plugs 154 formed thereon, wherein the basis 159 is made as a small plate; amongst others, this offers the advantage that a proper application of the attachment element mostly is facilitated.

The assembly and working of the attachment system 148 can simply be deduced from the above description and the drawings. It is clear that the attachment system 148 can also be applied for attaching other furniture fittings.

According to a particular independent aspect of the invention, it relates to an element in the form of a composed element or in the form of a furniture part which is provided with one or more furniture fitting parts, with the characteristic that at least one of the furniture fitting parts substantially consists of metal and that it is attached to the element via one or more attachment elements consisting at least partially and preferably entirely of synthetic material. According to another characteristic, the attachment element is pre-mounted on the furniture fitting part. These characteristics allow an optimization in the attachment technique. FIGS. 69 and 70 form an example thereof, at least when therein use is made of attachment elements of synthetic material.

Figure 71:
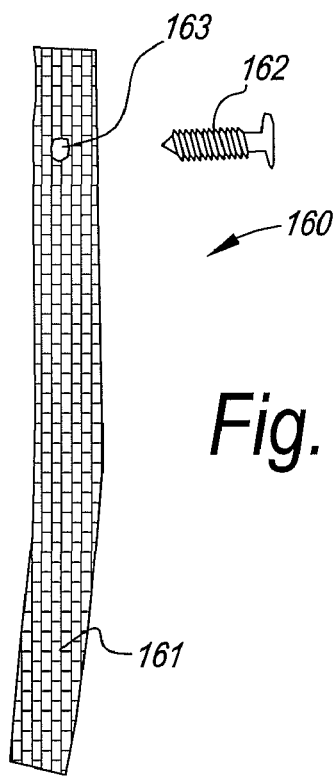
Figure 72:
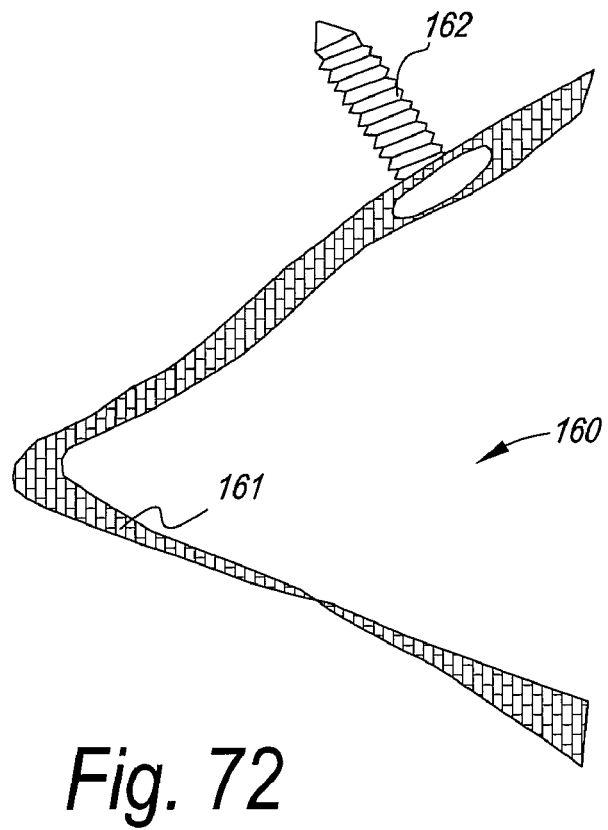

FIGS. 71 and 72 represent an auxiliary means 160 according to the invention, which is intended for securing a piece of furniture against accidentally tilting forward. The auxiliary means 160 consists of a belt 161 and a screw plug or clamping plug 162, with which the belt can be pressed down in a bore hole or the like in a cupboard. The clamping plug 162 preferably is inserted through the belt 161 via a preformed opening 163. The other extremity of the belt then has to be attached to the wall behind the cupboard.

FIGS. 73 to 84 are connected to a number of particular hinge suspensions which can be applied in furniture.

Figure 73:
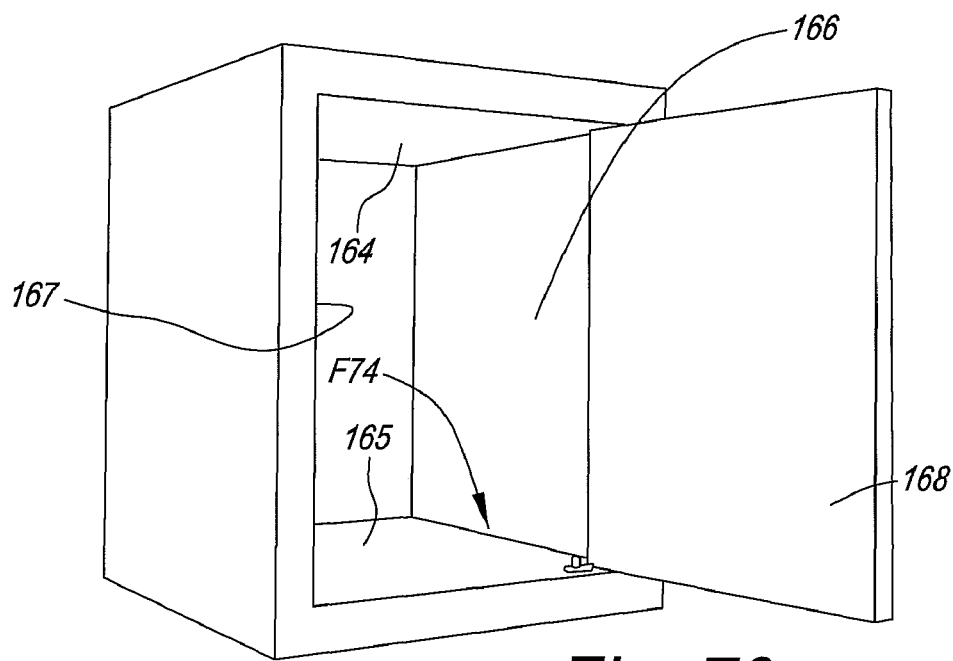

FIG. 73 schematically represents a cupboard with an upper side 164, a lower side 165, sidewalls 166-167 and a cupboard door 168.

Figure 74:
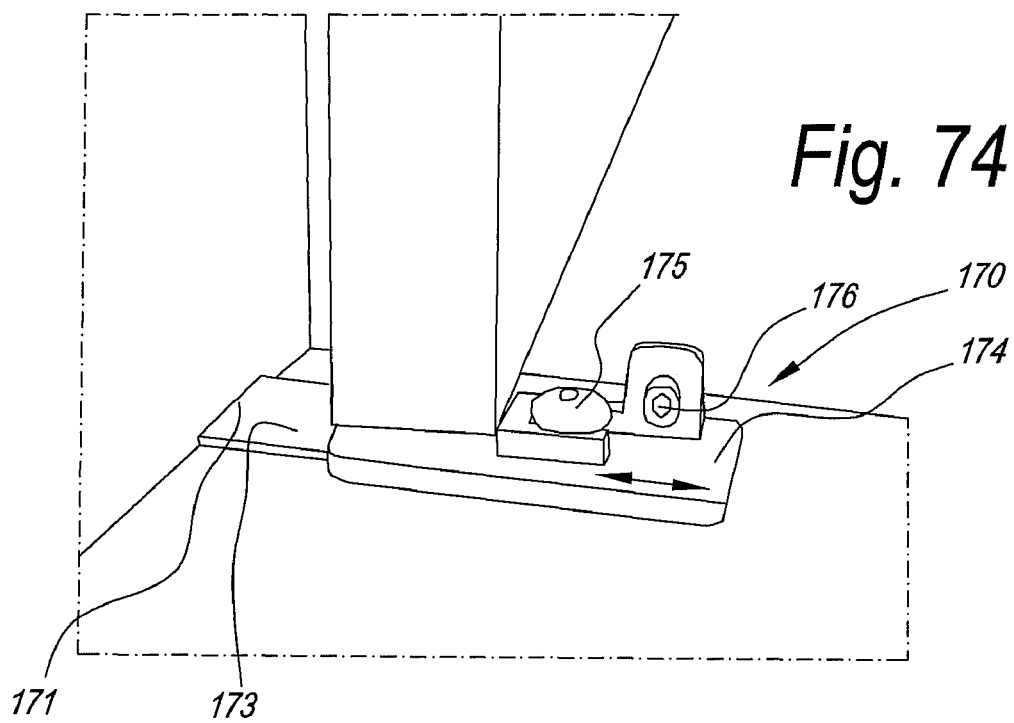
Figure 75:
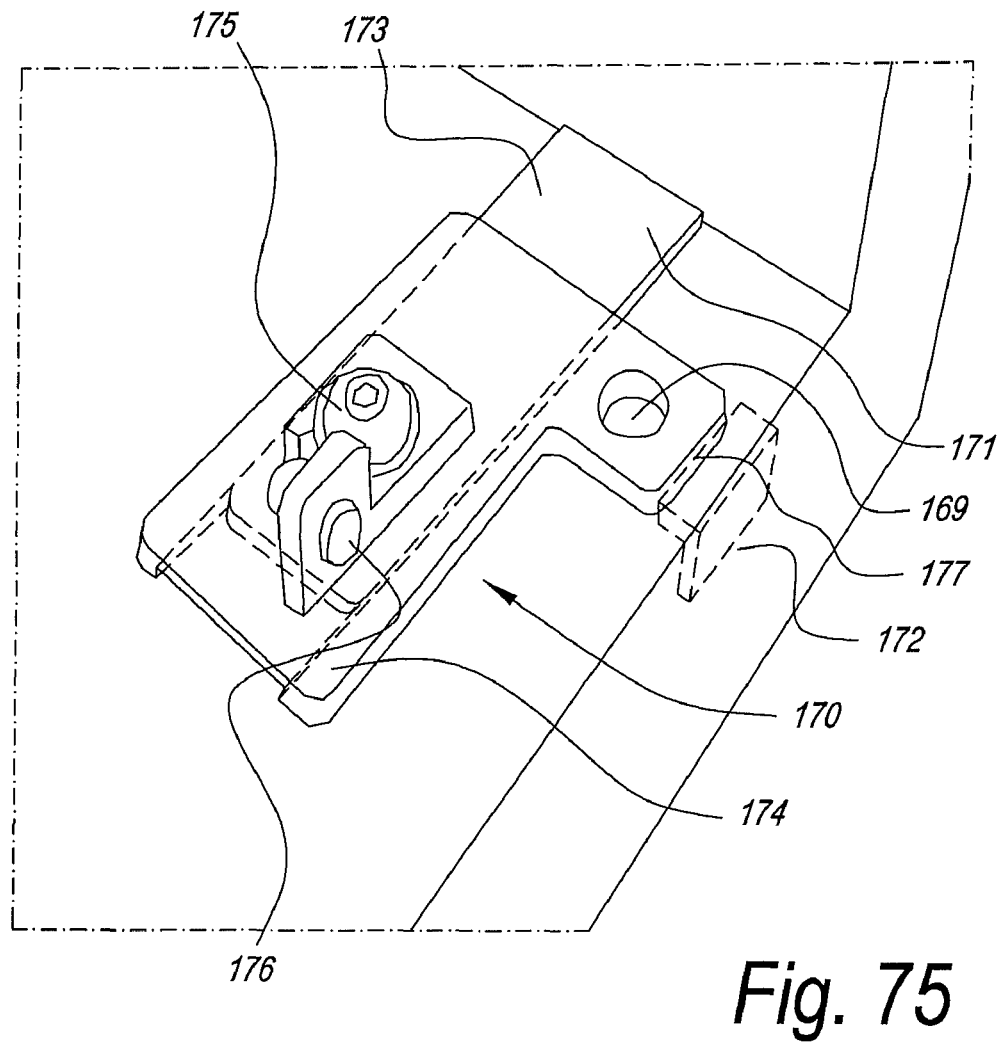

FIG. 74 shows a view according to arrow F74 in FIG. 73, wherein a possible hinge attachment of the invention is represented in greater detail. FIG. 75 represents a view from the other side, wherein the door is unhinged, and an opening 169 is visible in which normally the door is retained with a not represented pin.

Figure 76:
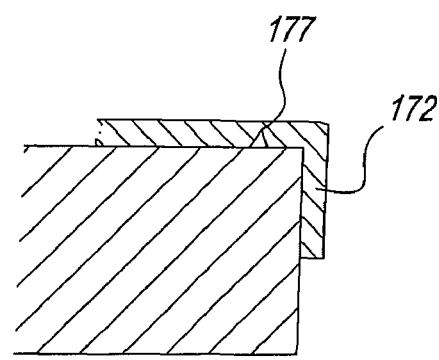

The represented hinge attachment 170 is particular in that it shows one or more of the following features, which, in the represented embodiment, can all be combined, however, can also be present as such or in any reduced combination:

- It comprises one or more stop-forming parts 171-172, with which the hinge attachment can be positioned against walls or alongside edges;
- It comprises a fixed part 173 and a part 174, which latter is displaceable and adjustable in respect to the former and which allows shifting the hinge point, for example, by means of a tensioning screw 175;
- It comprises a stop 176 for the door, which stop preferably is adjustable;
- It comprises a stop part, in this case 172, which can be broken off, which, after being positioned and attached, can be removed in order to be removed from view, for example; this may be performed, for example, by means of a break-away edge 177, as can be seen in FIGS. 75 and 76; such positioning part can be a collar cooperating with an edge, however, also a protruding part forming a temporary stop or which is intended to be installed on equal height with an edge;
- The hinge attachment is provided on the piece of furniture exclusively by means of an adhesive connection, for example, by adhering the fixed part 173 onto the piece of furniture.

Figure 77:
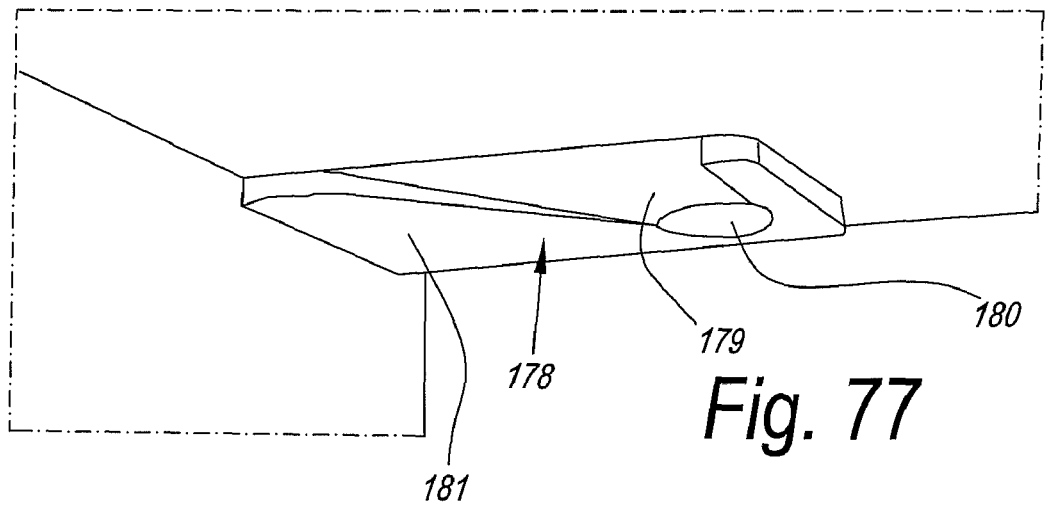

FIG. 77 shows a hinge attachment 178 with a guide 179 in the form of a ramp surface for guiding a hinge pin smoothly towards a hinge opening 180. Here, too, the hinge attachment can be provided exclusively by means of an adhesive connection against a wall; however, other possibilities are not excluded. Analogous as herein above, also stop-forming parts, whether for being broken off or not, can be provided on the basic body 181.

Figure 78:
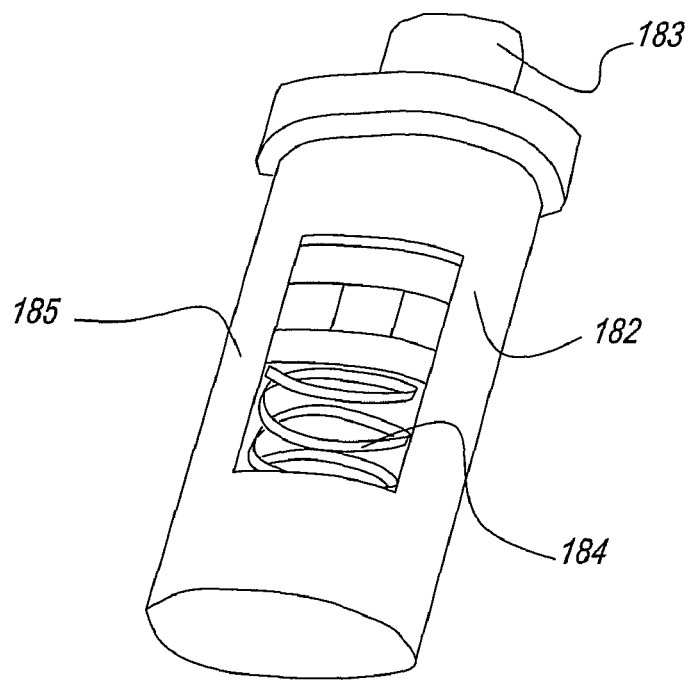

FIG. 78 shows another hinge pin, which can be mounted in a door. It consists of a housing 182, the actual pin 183, a spring 184 pushing the pin outward, and an opening 185 in the housing, along which the pin, by means of a tool, can be pushed back temporarily for mounting and/or dismounting the door.

It is clear that a door preferably is provided with one fixed pin and one movable pin, wherein the fixed pin preferably is located at the top.

Figure 79:
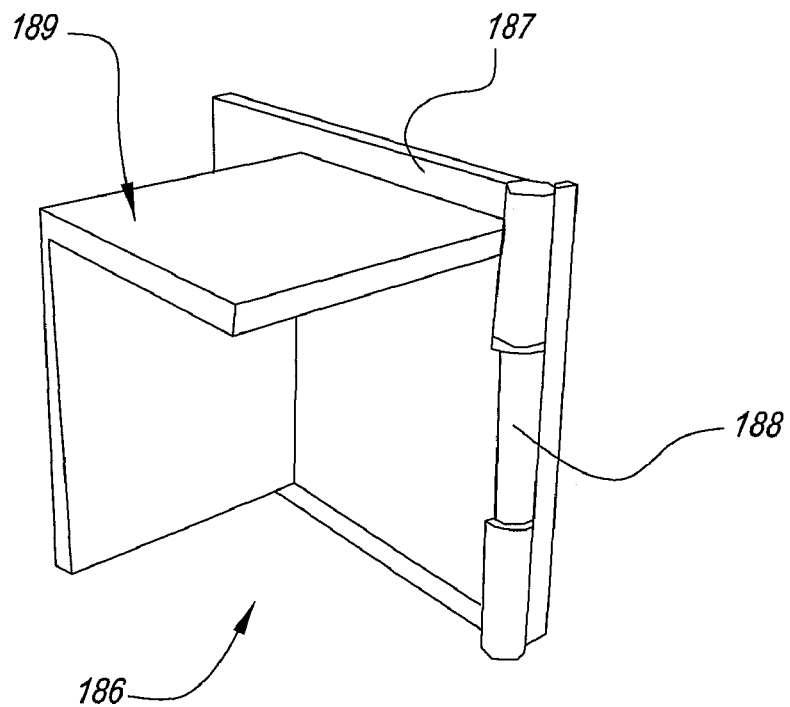
Figure 80:
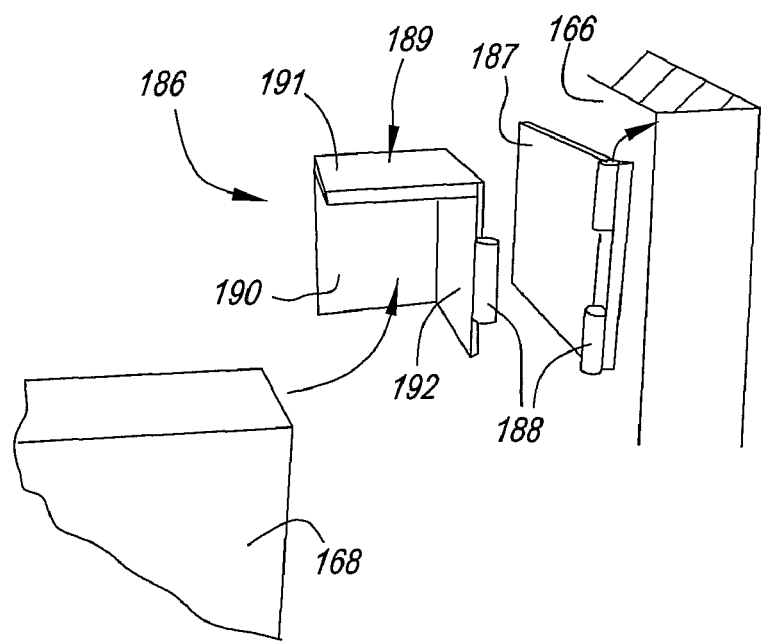

FIGS. 79 and 80 show a hinge attachment or suspension 186 with a fixed part 187 which can be attached against a sidewall 166, with an adhesive connection and/or in any other manner, and with a hingeable part 189, attached thereto via a hinge coupling 188, which preferably is made as a corner part.

The corner part preferably comprises two walls standing at an angle, and preferably, as shown, at least three walls 190, 191 and 192 standing at an angle, against which the door can be attached with an edge and/or corner, by means of an adhesive connection and/or in any other manner.

Figure 81:
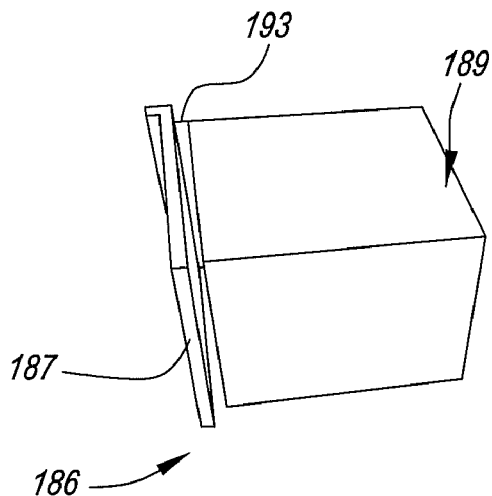
Figure 82:
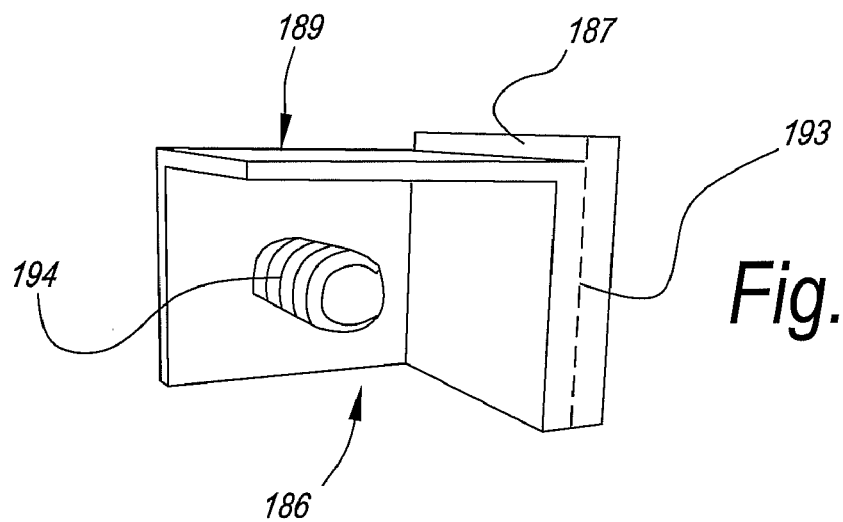

FIGS. 81 and 82 represent a variant, wherein the fixed part 187 and the movable part 189 are not connected by a hinge with a pin, but rather by means of a film hinge 193. Optionally, at the fixed part a pin 194 or pressure screw part can be present, which engages in an opening in the door. This can also be applied in the preceding embodiment.

Figure 83:
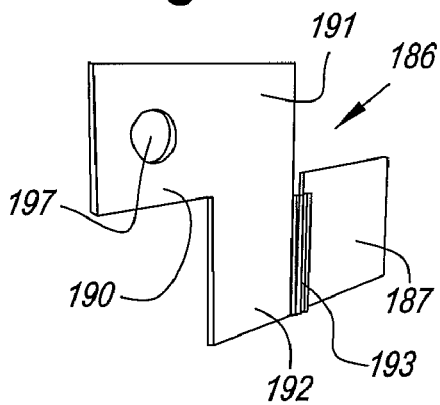
Figure 84:
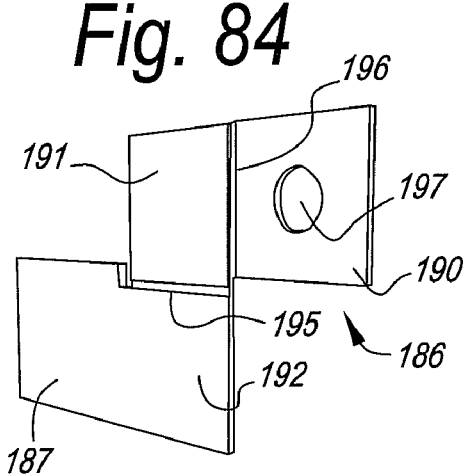

FIGS. 83 and 84 represent another variant, viewed along both sides thereof. The represented hinge attachment 186 is special in that it shows one or more of the following features, which, in the represented example, all are combined, however, may also be present as such or in any lesser combination:

- All component parts, or at least all wall parts thereof, can be marketed in a substantially flat configuration, which allows packaging them along with flat-pack furniture in a smooth manner;
- Two or more walls forming a corner part are coupled to each other via hinges 195-196, preferably film hinges; in the example, all three walls 190-191-192 are coupled together by hinges, in this case, film hinges.

It is clear that the walls 190-191-192 then can be folded into a corner shape as in FIGS. 81 and 82 in order to then attach them to the corresponding surfaces of the door, for example, by means of adhesive connections and/or in other manners. The opening 197 is optional and allows guiding an extra pin there through.

By means of FIGS. 85 to 104, hereinafter some more rear wall constructions according to the invention are described.

FIGS. 85 to 90 illustrate a number of alternatives to the embodiment of FIGS. 3 and 4. The particularity of the embodiments of these figures consists in that one or more spacers 198 are provided for keeping the rear wall parts 9-10 at least initially at a distance X from each other, in order to allow providing one or more attachment pieces 44 here between, wherein these spacers 148 are different from the rear wall parts 9-10, in other words, contrary to the embodiment of FIG. 3, do not form part of the rear wall parts themselves. Amongst others, this offers the advantage that, if desired, no particular recesses 59 have to be provided in the edges of the rear wall parts, such that it is possible to work with simple straight edges. In this manner, the rear wall parts 9-10 can be realized considerably simpler, as all edges can be made exclusively by straight-lined cutting treatments, for example, sawing treatments. However, this does not exclude that according to a not-represented variant rear wall parts with non-straight edges, for example, with recesses 59, still are combined with spacers not forming part of the rear wall parts themselves.

In general, said spacers 198 preferably consist of protrusions which, in mounted condition, are situated between the rear wall parts 9-10. In rear wall parts 9-10 which are mounted on top of each other, the protrusions form supports which support the rear wall part 10 respectively situated directly there above, and such at a distance X above the rear wall part 9 situated there below, in such a manner that one or more attachment pieces, of which kind whatever, can also be provided between the rear wall parts.

The protrusions can be provided at different locations, however, preferably they are situated at the sidewalls and/or partition walls of the furniture and/or at the rear edges of one or more shelves.

In the case of embodiments wherein the rear wall parts can be provided in the grooves 21-22 via passages 33-34, such protrusion can be positioned at the height of such passage, such that a rear wall part can be pushed into the respective grooves via the passages and over the respective protrusions, mostly by bending, after which this rear wall part can be rested on the protrusions.

It is noted that such protrusions can also be applied exclusively for supporting rear wall parts independently from each other in a piece of furniture, thus, without applying attachment pieces.

Figure 85:
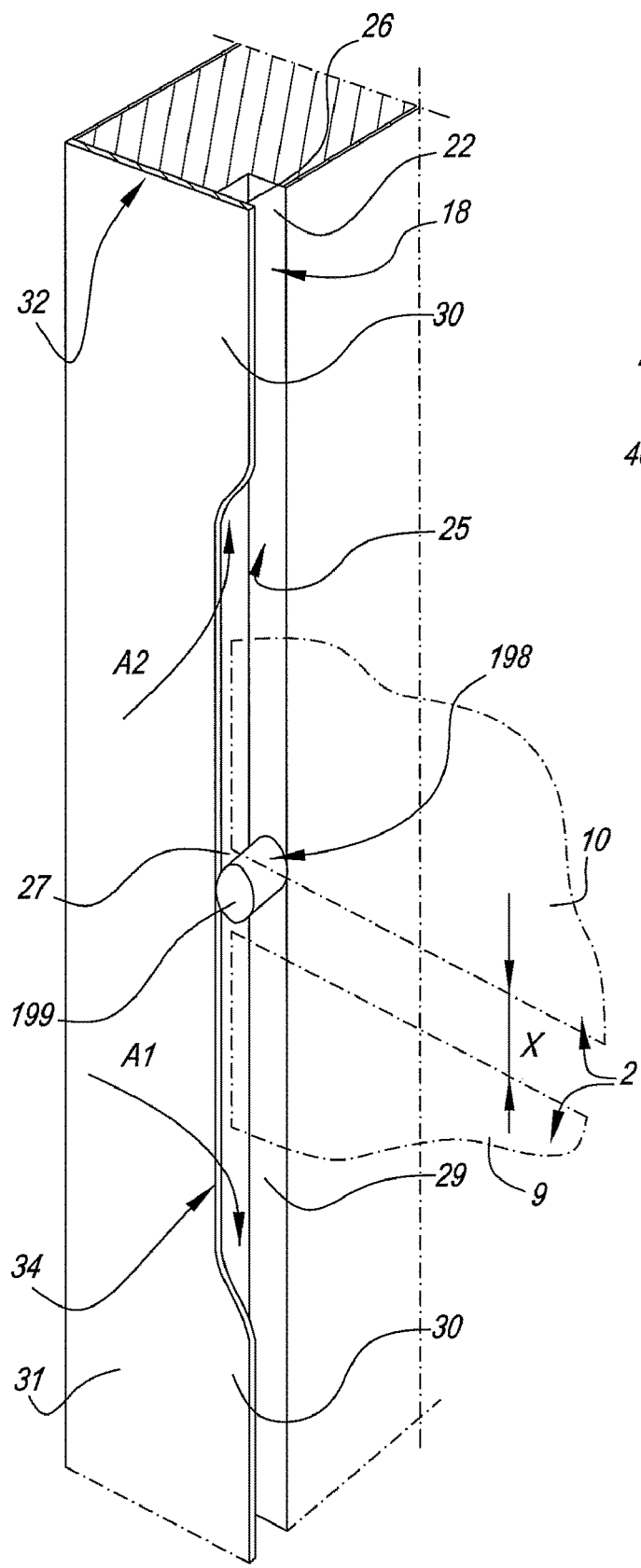
FIGS. 85 to 104 relate to some more rear wall constructions according to the invention.

FIG. 85 represents a first practical embodiment, wherein a protrusion, in this case in the form of a plug 199, is provided in the groove 22, such at the height of the respective passage 34. It is clear that a similar protrusion is provided on the other side of the piece of furniture. The rear wall parts 9-10 then can be pushed according to arrows A1 and A2 above and below the protrusions into the grooves, after which the uppermost rear wall part 10 comes to rest on the protrusions, in this case the plugs 199, and a distance X is guaranteed between the rear wall parts 9-10, said distance allowing, for example, that attachment parts 44, as aforementioned, can be provided in an opening 47 in a shelf. It is clear that the edges of the rear wall parts, which edges are facing each other, then can have a simple straight-lined contour.

Figure 86:
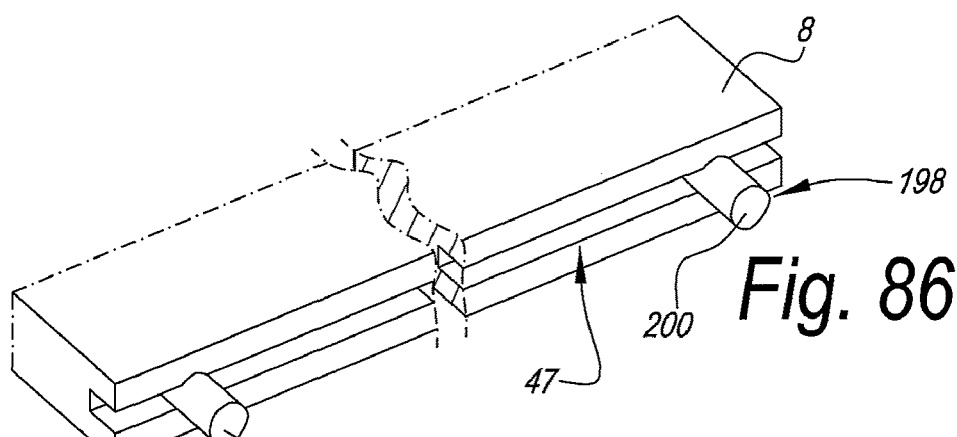

In FIG. 86, a variant is represented, wherein use is made of protrusions in the form of plugs 200 which are provided in the rear edge of a shelf.

Figure 87:
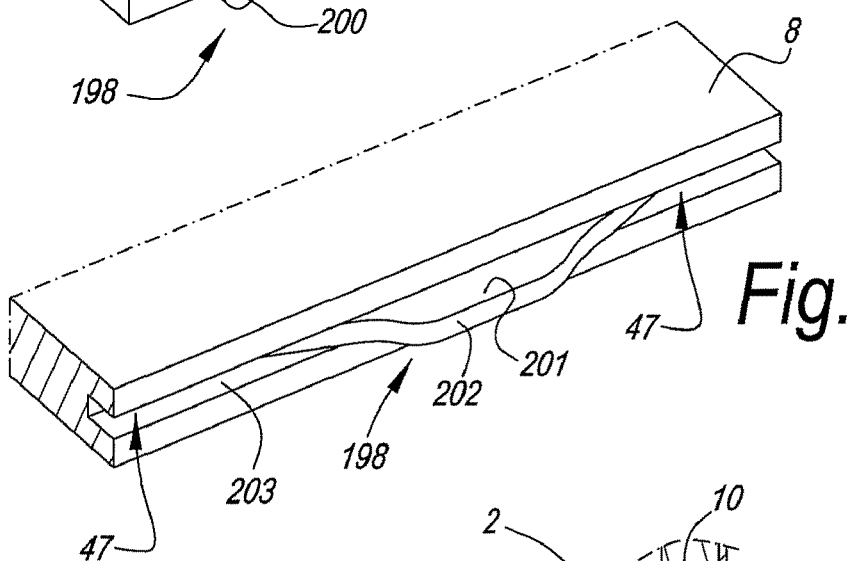
Figures 88, 89, 90:
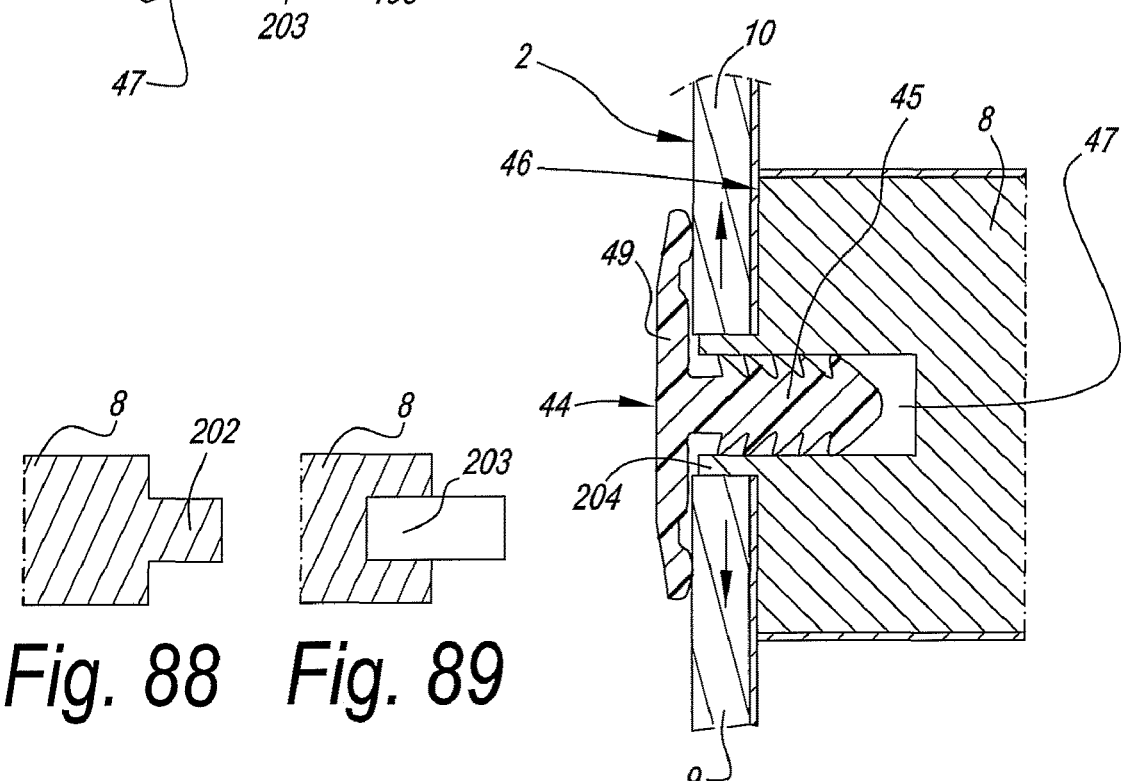

In FIG. 87, a variant is represented wherein the protrusion is realized on the rear edge of a shelf, and in this case is formed in one piece therewith in the form of a cam-shaped protruding portion 201, such that no separate parts are necessary. Such one-piece profile, which is provided with a protrusion, can be realized such, for example, as explained herein below by means of FIGS. 88 and 89. Herein, first a continuous tongue profile 202 is realized over the entire length of the rear edge, as illustrated in FIG. 88. Subsequently, at the height of the tongue profile 202, a groove profile 203 is realized, for example, is milled in, as illustrated in FIG. 89, wherein the respective milling cutter just is drawn back somewhat on the location where the protrusion has to be effected, whereby the tongue profile locally remains present in the form of a local protrusion or, thus, portion 201, whereas the groove profile 203 then forms the opening or groove 47 in which one or more attachment pieces can be provided.

In FIG. 90, a variant is represented, wherein the protrusion is realized in a continuous manner in the form of a tongue 204, wherein the recesses above and below the tongue function as seats for the rear wall parts 9-10. In the tongue 204, an opening is formed, in this case in the form of a groove 47 in which attachment pieces 44 can be provided. Possibly, such protrusion can also be provided locally, whether or not on a plurality of locations.

Figure 91:
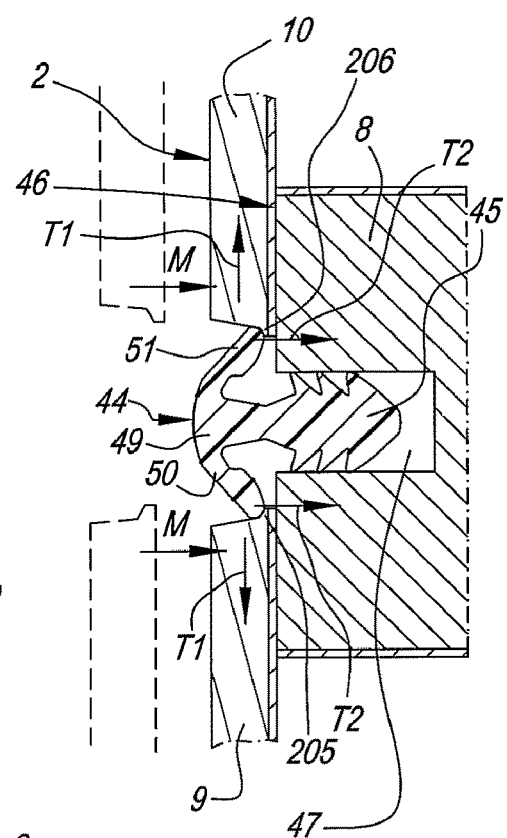

In FIG. 91, a particular embodiment is represented of an attachment piece 44 which as such combines various features. The attachment piece 44 comprises an attachment part 45 with which it can be attached to the piece of furniture, and a stop-forming part 49, which can cooperate with the rear wall parts 9-10. In the example, the attachment portion is performed as a clamping part, which can be pressed down in an opening 47. The stop-forming part 49 is made as a flange with wings 50-51 and has various functions. A first function consists in that the flange functions as a support part for the uppermost rear wall part 10. A second function consists in that the wings function as tensioning elements which, in one or more directions, exert tensioning forces on the rear wall parts. In the represented example, these are lateral tensioning forces T1, which press down the rear wall parts 9-10 in their remaining seats, as well as frontal tensioning forces T2, which press down the rear wall parts against the shelf 8. A third function consists in that the attachment piece 44 possibly can be mounted beforehand and that the flange allows to press down the rear wall parts 9-10 behind the edges of the wings by a frontal pressing-down movement M. Herein, the edges of the wings shortly will bend inward in order to subsequently elastically engage behind the edges 205-206 of the rear wall parts 9-10.

Figure 92:
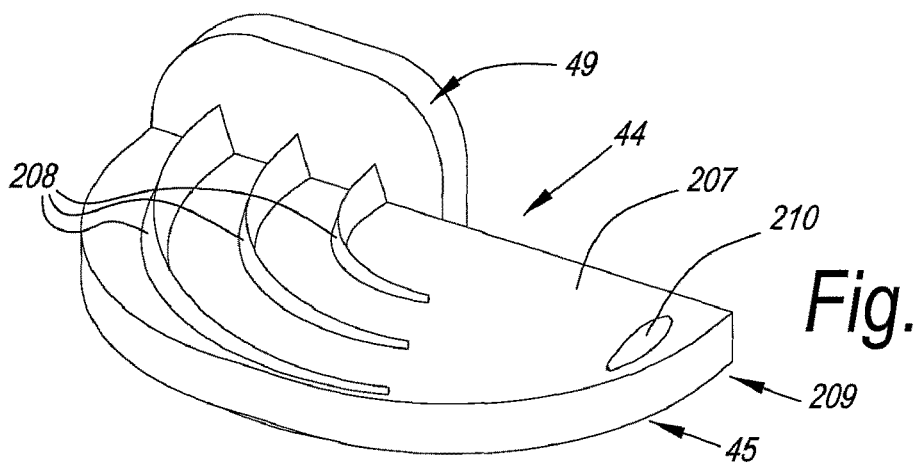
Figure 93:
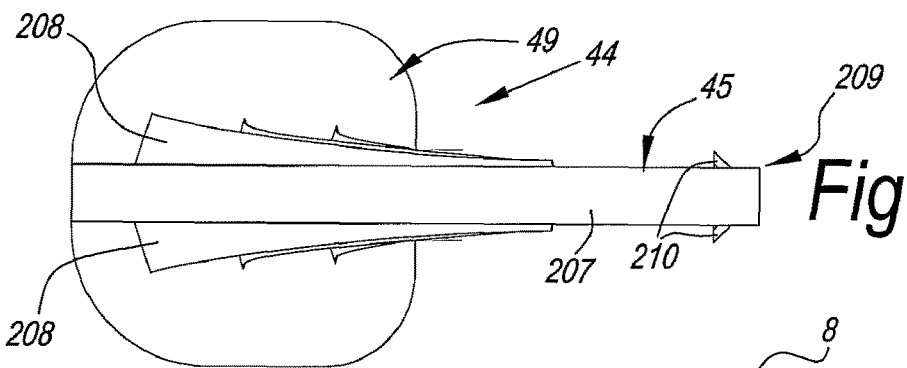
Figure 94:
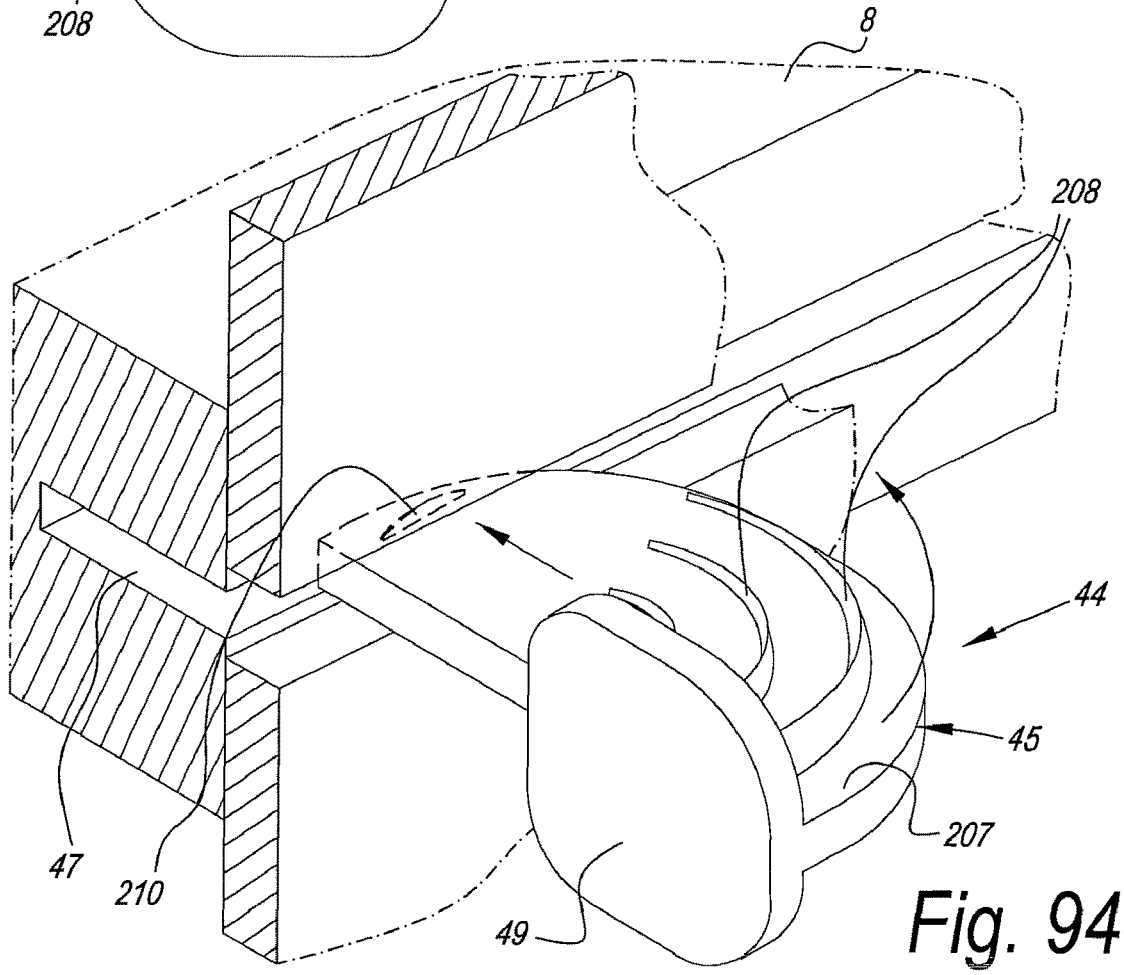

In FIGS. 92 to 94, another particular embodiment of an attachment piece 44 according to the invention is represented, which can be pressed smoothly into the groove-shaped opening 47 by means of a turning movement. The attachment piece 44 comprises an attachment portion 45 and a stop-forming part 49. The attachment portion 45 consists of a preferably semi-circular body 207, which, due to its relatively flat design, fits into the groove-shaped opening 47, wherein this body is provided with curved ribs 208, which preferably are present on both sides of the body 207 and, when being provided, tension against the walls of the groove 47 and more or less cut therein. Due to the curved shape of the ribs 208, automatically a rotation movement is induced when they are pressed on. As represented, the ribs 208 preferably are made as cutting ribs, thus, with a relatively sharp distal edge. It is also preferred that they systematically increase in height towards the stop-forming part. At the extremity 209 of the body 207 which is intended for being first inserted into the opening, preferably one or more local clamping parts 210 are formed, which, when installing the attachment piece, provide for an initial clamping in order to more or less form a hinge point.

The working can simply be deduced from FIG. 94 and substantially consists in that such attachment piece 44 first is pressed with the extremity 209 somewhat into the groove 47 and subsequently a force is exerted onto the exterior side of the stop-forming part 49, which causes the body 207 to become fixed in the groove 47 by means of a turning movement. The distance between the rear wall parts can also be chosen such that the ribs 208 also cooperate with the edges of the rear wall parts, with the extra advantage that a higher rigidity of the piece of furniture is obtained in that the rear wall parts mutually can no longer shift in lateral direction.

Figure 95:
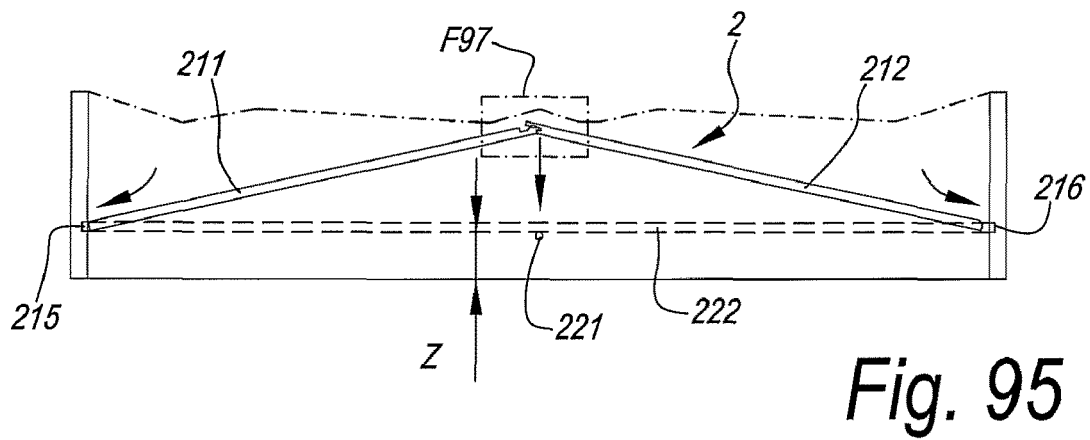
Figure 96:
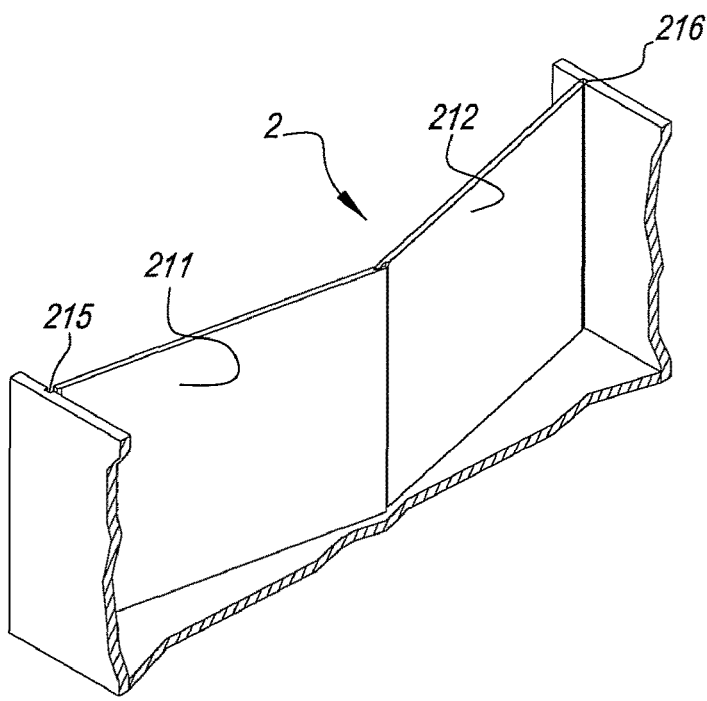
Figure 97:
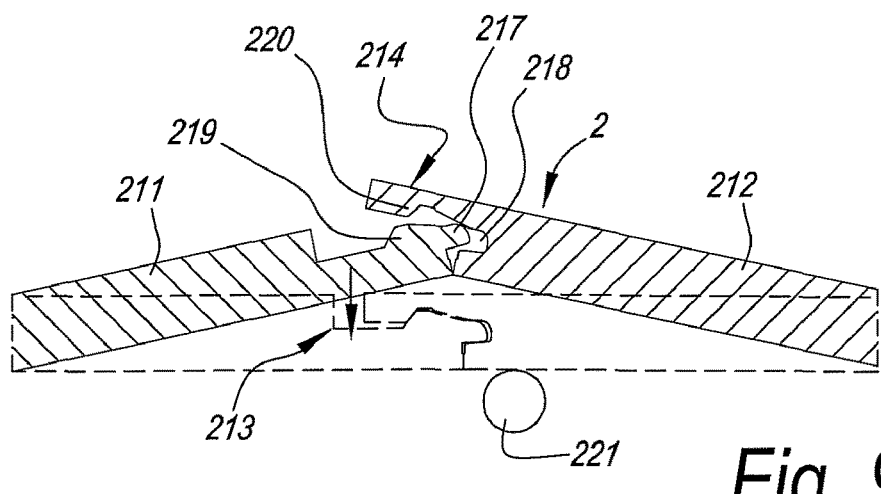

In FIGS. 95 to 97, also a particular embodiment of a rear wall 2 is represented, wherein FIG. 97 at a larger scale illustrates the part indicated by F97 in FIG. 95. Herein, the particularity consists in that the rear wall 2 is composed of a plurality of rear wall parts, preferably two separate rear wall parts 211-212, which can be fitted into each other via edge profiles 213-214, more particularly can be pressed into each other and/or can be mutually pivoted into each other, while preferably being laterally taken up in seats 215-216. In certain applications, this offers the advantage that such rear wall, after installing the remaining parts of the piece of furniture, still can be provided in the piece of furniture and can be removed therefrom as well.

The edge profiles preferably are made as a tongue 217 and a groove 218, with locking parts 219-220, which keep the rear wall parts together at their edges.

Herein, the edge profiles can be configured such that they have to be pushed over a dead point while being joined together to form the intended rear wall, such that an automatic turning back is counteracted.

Further, means can be provided which determine the end position, such as a stop, for example, a plug 221 or alternatively a groove 222, for example, in the bottom of the cupboard, into which the rear wall can drop in in the final condition.

In the example, the rear wall parts are forced into their flat condition from the interior of the piece of furniture. This application can be useful with kitchen cupboards, for example, with applications wherein the distance Z is larger than usual, and the then created space is applied for hiding cables behind the rear wall, wherein the rear wall thus can be provided after the cables are mounted, and it is also possible to remove the rear wall temporarily in the case of possible repairs.

Figure 98:
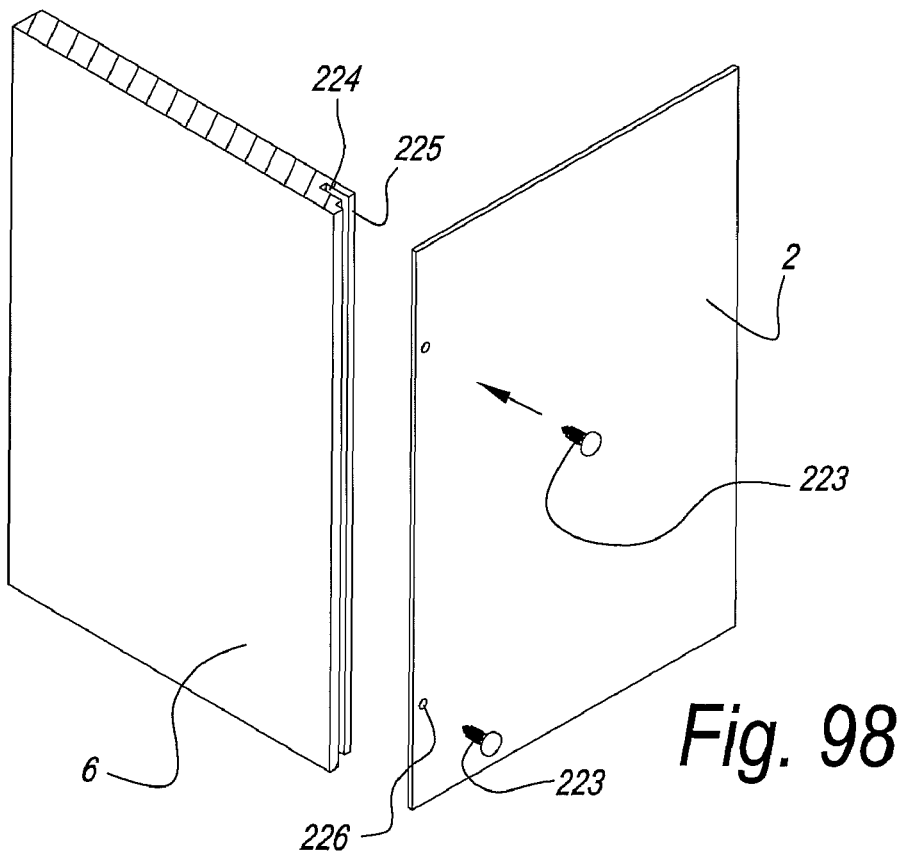
Figure 99:
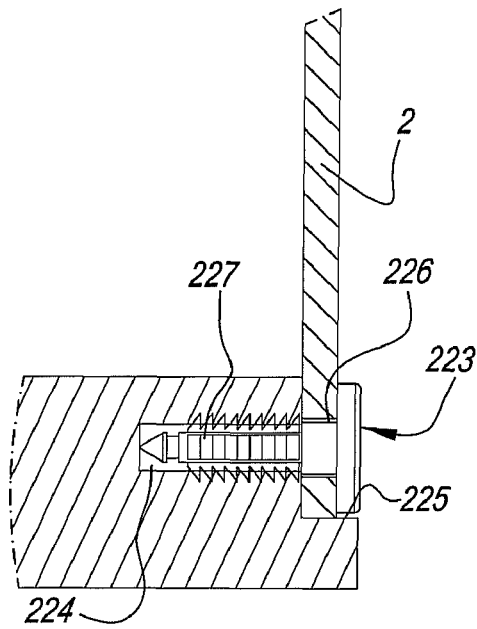

In FIGS. 98 and 99, another rear wall construction according to the invention is represented, wherein the particularity consists in that the rear wall 2, or at least a rear wall part thereof, is fixed by means of pressing elements 223 which cooperate with openings 224 in the furniture parts. This offers the advantage that the whole can be designed such that first a carcass can be built and afterwards the rear wall can be mounted therein.

Herein, the rear wall part preferably will be seated in a recessed portion 225. As more clearly represented in FIG. 99, the pressing elements 223 can consist of press-on plugs, which are provided in the respective rear wall part through openings 226 and which engage in the opening or openings 224 by means of clamping portions 227, for example, by means of a clamping toothing. The openings 226 preferably consist of bore holes, whereas the openings 227 preferably consist of grooves. Such attachment can be applied along the entire circumference of a rear wall or rear wall part, or only along a portion thereof.

In FIGS. 100 to 104, also a tensioning device 228 is represented, which allows increasing the rigidity of a composed element, more particularly a piece of furniture, by making an additional connection between the rear wall 2 and a constructional part in which the rear wall is provided, in this case a sidewall 5.

Figure 100:
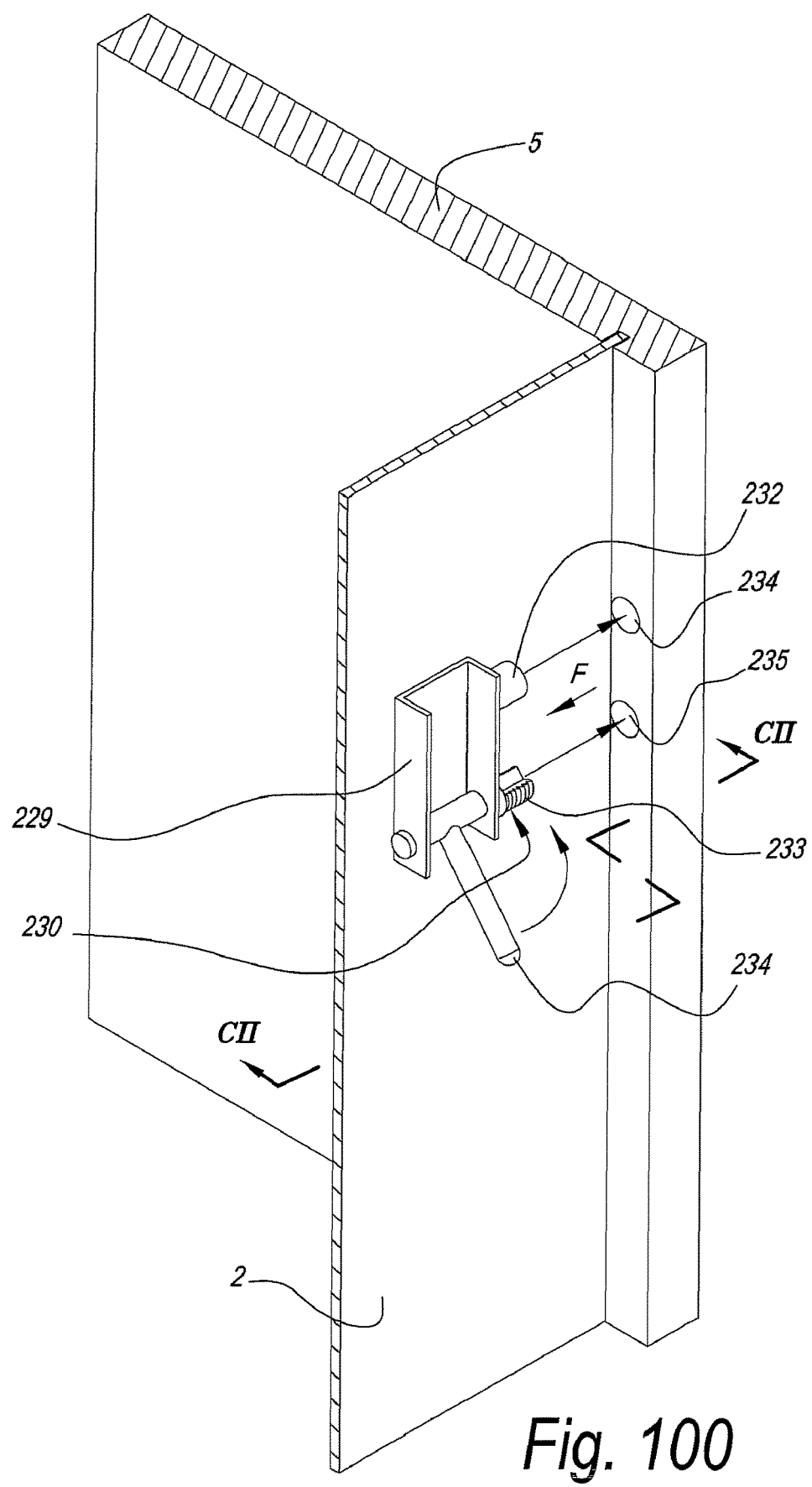
Figure 101:
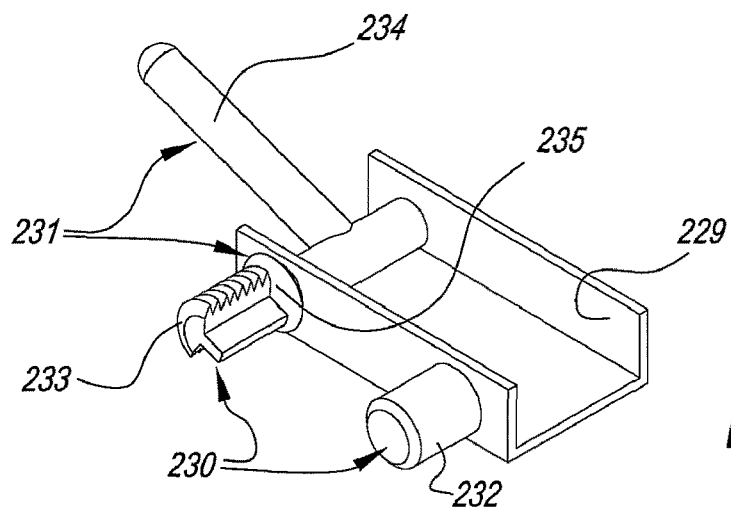
Figure 102:
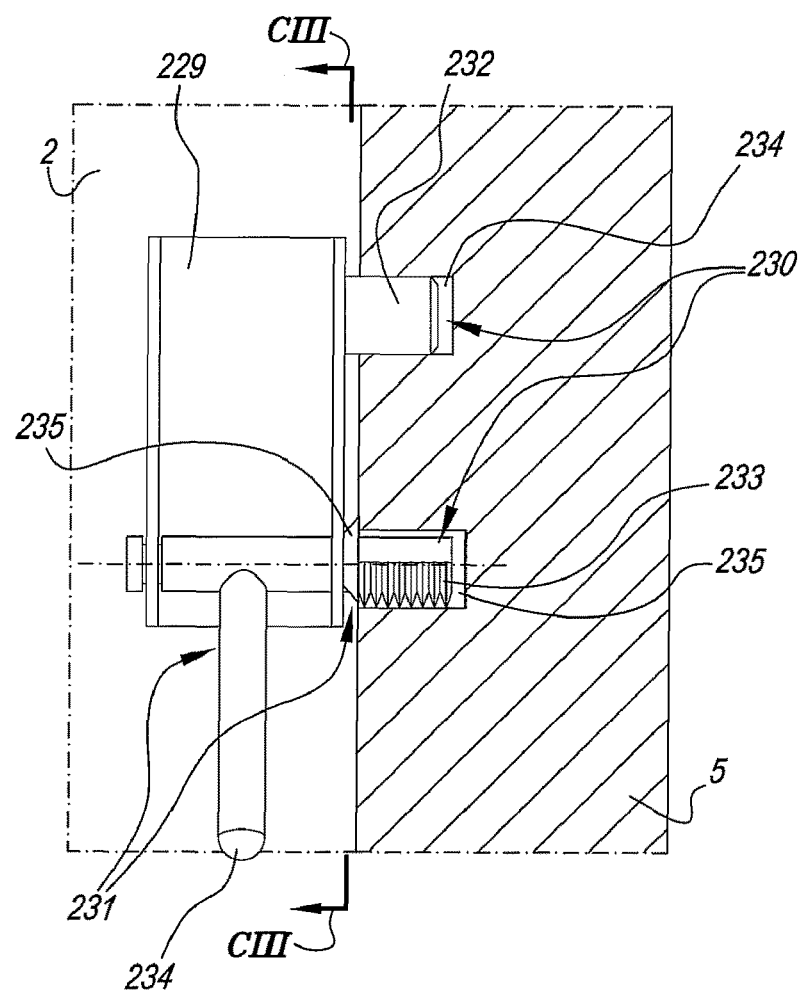
Figure 103:
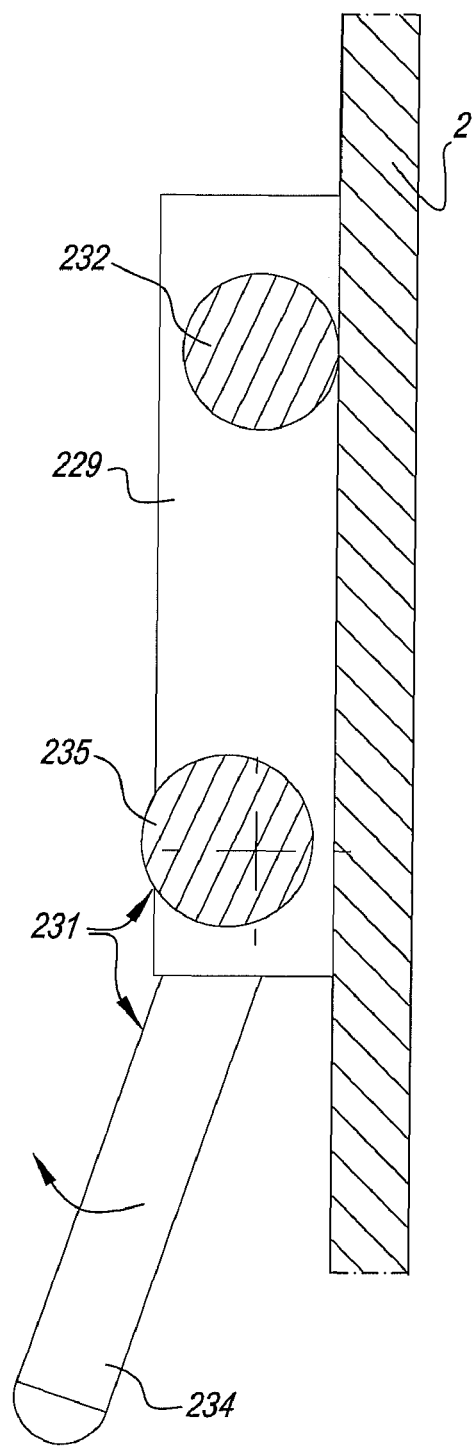
Figure 104:
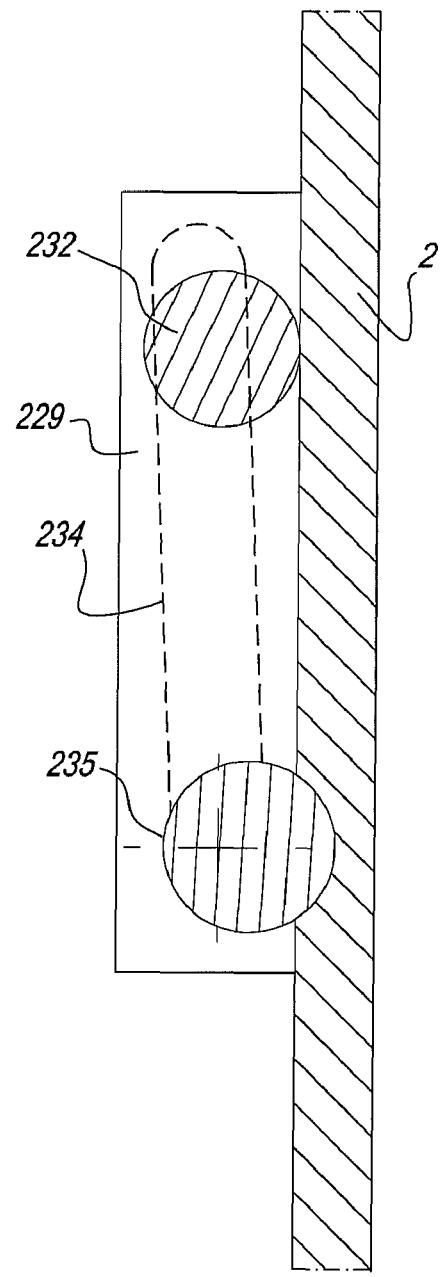

Herein, FIG. 100 in perspective represents a view where such tensioning device 228, amongst others, can be provided. FIG. 101 represents the tensioning device as such. FIG. 102 represents a cross-section according to line CII-CII in FIG. 100 after the tensioning device 228 has been provided, however, is not yet fixed, whereas FIGS. 103-104, for two different positions, represent a cross-section according to line CIII-CIII in FIG. 102.

The tensioning device 228 consists of a basic body 229 with attachment means 230 for providing the tensioning device 228 on a constructional part, in the example the sidewall 5, of the piece of furniture, and having an engagement system 231 which can cooperate with the rear wall 2.

The attachment means 230 consist of at least two pins 232-233 with which the whole can be provided in openings 234-235 in the constructional part 5. A first of these pins 232 is fixedly installed, whereas the other pin 233 is made as an eccentric part which can be turned via a handle 234, wherein the eccentricity is chosen such that, when the handle is being turned, the effective distance between the pins changes and a clamping is obtained in the openings, in this case in that the pins move towards each other and will clamp towards each other against the intermediate material part of the piece of furniture. The engagement system 231 is formed by an eccentrically installed disk 235 which in the example also can be turned by means of the handle 234 and by turning engages in the rear wall and/or tensions against it. According to not-represented variants, the disk can also be replaced by another element, such as a pin or the like, wherein this element can cooperate with the back by a displacement.

According to the invention, such tensioning device can also be realized with other forms of attachment means 230 and of an engagement system 231.

It is clear that different variants on all herein above-described embodiments are possible without leaving the scope of the invention.

It is noted that the term "furniture" in the above description has to be interpreted in a broad manner. More particularly, this may relate to complete pieces of furniture as well as to parts for furniture. This may also relate to loose pieces of furniture as well as to pieces of furniture forming part of a larger whole, such as kitchen, bathroom and dressing furniture for installation.

The invention claimed is:

1. A composed element comprising a number of constructional parts interconnected at an angle by means of locking profiles defining at least one corner connection, wherein a tongue and groove coupling with locking parts is applied, wherein said locking parts substantially are located on one side of the tongue only, wherein at both sides of the tongue, opposite-positioned portions are present, including first portions on the side where the locking parts are present, and second portions on the other side, wherein, when the second portions are positioned against each other, there is a spacing between the first portions;

wherein said spacing is less than 1 mm and more than 0.1 mm;

wherein a second spacing is defined on a second side of the tongue opposite the locking parts, the second spacing having a top surface aligned with a top surface of the spacing.

2. The composed element of claim 1, wherein said spacing is 0.3 to 0.5 mm.

3. The composed element of claim 1, wherein pretension is integrated into the at least one corner connection.

4. The composed element according to claim 1, wherein such spacing is applied to two successive corner connections of the composed element.

5. The composed element of claim 1, wherein the locking parts define an overlap with a pretension between the locking parts at the overlap.

6. The composed element of claim 5, wherein the pretension acts in a direction offset from a separation direction of the constructional parts.

7. The composed element of claim 1, wherein the tongue defines a split tongue comprising a gap.

8. The composed element of claim 7, wherein first portion of the constructional part defining the groove is offset a distance from the second portion of the constructional part defining the groove.

9. The composed element of claim 8, wherein the first and second portions of the constructional part defining the tongue are offset by the distance between the first and second portions of the constructional part defining the groove and the spacing between the first portions.

\* \* \* \* \*